US011032753B2

(12) United States Patent
Schwartz

(10) Patent No.: US 11,032,753 B2
(45) Date of Patent: Jun. 8, 2021

(54) APPARATUS AND METHODS FOR CELLULAR NETWORK COMMUNICATION BASED ON PLURAL MOBILE CORES

(71) Applicant: ELTA SYSTEMS LTD., Ashdod (IL)

(72) Inventor: Adi Schwartz, Holon (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/751,645

(22) Filed: Jan. 24, 2020

(65) Prior Publication Data

US 2020/0267624 A1 Aug. 20, 2020

Related U.S. Application Data

(63) Continuation of application No. 15/591,449, filed on May 10, 2017, now Pat. No. 10,582,439, which is a (Continued)

(30) Foreign Application Priority Data

Oct. 21, 2013 (IL) ........................................ 228998

(51) Int. Cl.
*H04W 40/36* (2009.01)
*H04W 76/12* (2018.01)
(Continued)

(52) U.S. Cl.
CPC ......... *H04W 40/36* (2013.01); *H04W 40/248* (2013.01); *H04W 76/12* (2018.02); *H04W 84/005* (2013.01); *H04W 88/08* (2013.01)

(58) Field of Classification Search
CPC ... H04W 40/36; H04W 76/12; H04W 40/248; H04W 84/005; H04W 88/08
See application file for complete search history.

(56) References Cited

U.S. PATENT DOCUMENTS 10,285,208 B2 * 5/2019 Schwartz .......... H04W 72/0406
2004/0165600 A1 * 8/2004 Lee ...................... H04L 12/462
370/395.53
(Continued)

FOREIGN PATENT DOCUMENTS

GB 2486743 A 6/2012
WO 2011/092698 A1 8/2011
(Continued)

OTHER PUBLICATIONS

"3GPP TS 23.401 V8.10.0 (Jun. 2010); 3rd Generation Partnership Project; Technical Specification Group Services and System Aspects; General Packet Radio Service (GPRS) enhancements for Evolved Universal Terrestrial Radio Access Network (E-UTRAN) access; (Release 8)", pp. 1-242.
(Continued)

*Primary Examiner* — Charles T Shedrick
(74) *Attorney, Agent, or Firm* — Oliff PLC

(57) ABSTRACT

A cellular communication system comprising a population of cellular communication network nodes comprising a stationary core, a plurality of base stations, and at least one node having mobile station functionality; and a client tunneling functionality co-located with the node having mobile station functionality which is operative to use network topology information obtained via the mobile station functionality to initiate generation of a tunnel having a first end at the node and a second far end at the stationary core.

14 Claims, 52 Drawing Sheets

Related U.S. Application Data continuation of application No. 15/029,657, filed as application No. PCT/IL2014/050905 on Oct. 19, 2014, now Pat. No. 9,801,215.

(51) Int. Cl.

*H04W 40/24* (2009.01)
*H04W 84/00* (2009.01)
*H04W 88/08* (2009.01)

(56) References Cited

U.S. PATENT DOCUMENTS

| | | | | |
|---|---|---|---|---|
| 2008/0165776 | A1 | 7/2008 | Tao et al. | |
| 2009/0029645 | A1 | 1/2009 | Leroudier | |
| 2011/0134826 | A1 | 6/2011 | Yang et al. | |
| 2011/0194483 | A1 | 8/2011 | Ji et al. | |
| 2012/0082084 | A1 | 4/2012 | Balakrishnan et al. | |
| 2013/0059585 | A1 | 3/2013 | Giloh | |
| 2013/0089022 | A1 | 4/2013 | Lu et al. | |
| 2014/0087736 | A1* | 3/2014 | Shoshan | H04W 28/0268 455/437 |
| 2015/0351116 | A1* | 12/2015 | Shoshan | H04W 72/1226 370/330 |
| 2016/0255667 | A1* | 9/2016 | Schwartz | H04W 40/248 455/445 |

FOREIGN PATENT DOCUMENTS

| | | | |
|---|---|---|---|
| WO | 2012/120510 | A2 | 9/2012 |
| WO | 2012/120515 | A2 | 9/2012 |
| WO | 2012/120519 | A1 | 9/2012 |
| WO | 2013/118129 | A1 | 8/2013 |
| WO | 2013/129866 | A1 | 9/2013 |
| WO | 2013/160892 | A1 | 10/2013 |
| WO | 2014/079486 | A1 | 5/2014 |

OTHER PUBLICATIONS

"3GPP TR 36.836 V2.0.2 (Jul. 2013); 3rd Generation Partnership Project; Technical Specification Group Radio Access Network; Study on Mobile Relay for Evolved Universal Terrestrial Radio Access (E -UTRA) (LTE-Advanced) (Release 12)" (2013), pp. 1-35.

Aronsson, et al. "Advanced Radio InTerface Technologies for 4G SysTems ART1ST4G: Relay configurations". http://www.researchgate.net/profile/Mikael_Sternad/publication/266141250_EU_FP7_INFSO-ICT-247223_ARTIST4G_Project_Deliverable_D3.4_Relay_Configurations/links/5426cdae0cf2e4ce940a23f7.pdf>; (2011) Section 7.

Joan, Ben. "Difference Between TDD and TDMA". differencebetween.net/technology/communication-technology/difference-between-tdd-and-tdma/#ixzz2hgE3X9zM. Dec. 2013, pp. 1-4.

"3GPP TS 36.300 V9.7.0 (Mar. 2011) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", pp. 1-174.

Djanatliev, Maria. "LTE TDD Technology Overview". (2009) Rohd & Schwarz, pp. 1-13.

Ogier, R. and Spagnolo, P. "Mobile Ad Hoc Network (MANET) Extension of OSPF Using Connected Dominating Set (CDS) Flooding". tools.ietf.org/html/rfc5614. (2009) Network Working Group, pp. 1-72.

"3GPP TS 36.331 V9.18.0 (Jun. 2014); 3rd Generation Partnership Project; Technical Specification Group Radio Access Network; Evolved Universal Terrestrial Radio Access (E-UTRA); Radio Resource Control (RRC); Protocol specification (Release 9)", pp. 1-265.

* cited by examiner

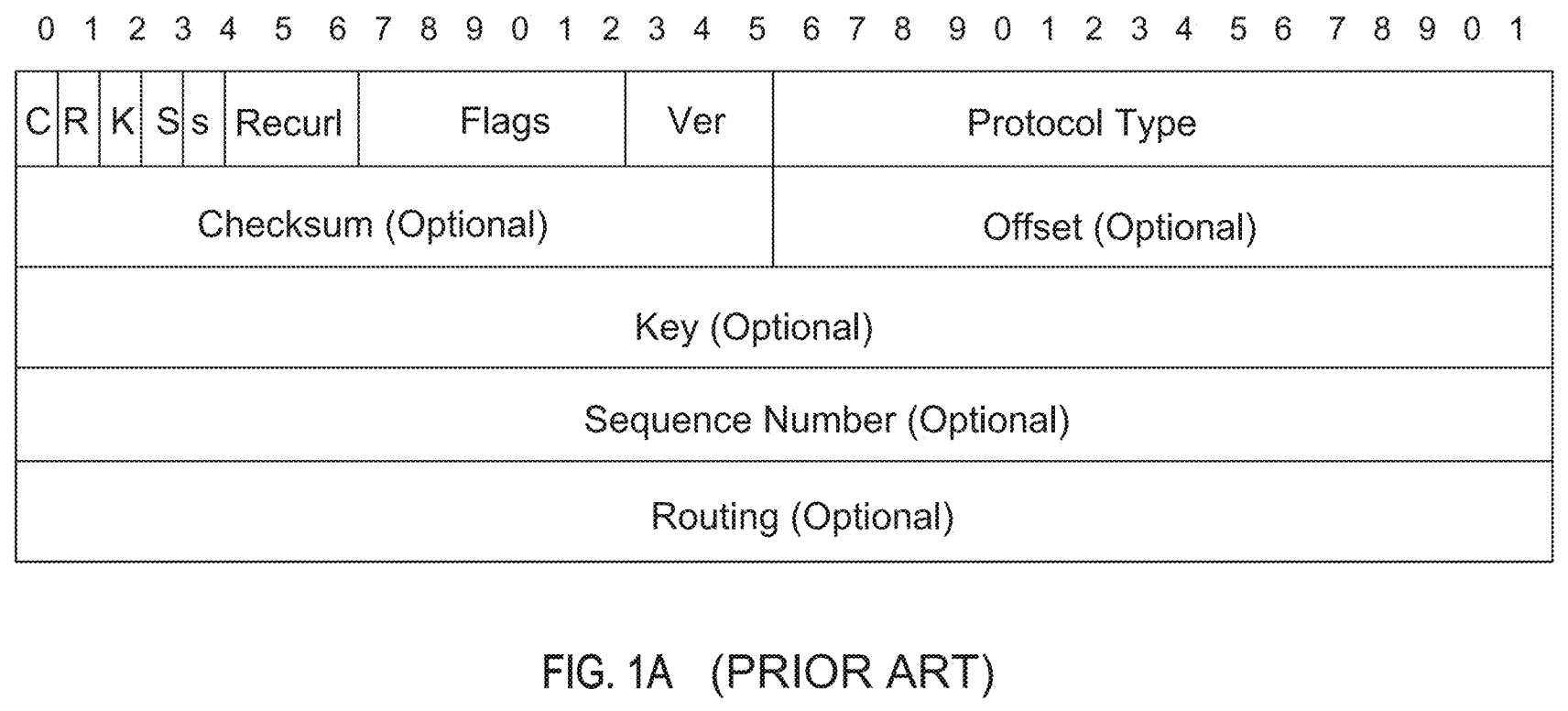

| 0 1 2 3 4 | 5 6 7 | 8 9 0 1 2 | 3 4 5 | 6 7 8 9 0 1 2 3 4 5 6 7 8 9 0 1 |
|---|---|---|---|---|
| C R K S s | Recur | Flags | Ver | Protocol Type |
| Checksum (Optional) | | | | Offset (Optional) |
| Key (Optional) | | | | |
| Sequence Number (Optional) | | | | |
| Routing (Optional) | | | | |

FIG. 1A (PRIOR ART)

APPARATUS AND METHODS FOR CELLULAR NETWORK COMMUNICATION BASED ON PLURAL MOBILE CORES

CROSS-REFERENCE TO RELATED APPLICATIONS

This is a Continuation of application Ser. No. 15/591,449 filed May 10, 2017, which in turn is a Continuation of application Ser. No. 15/029,657 filed Apr. 15, 2016, which in turn is a 35 U.S.C. § 371 national stage application of PCT/IL2014/050905, filed Oct. 19, 2014, which claims the benefit and priority to IL 228998, filed Oct. 21, 2013. The disclosures of the prior applications are hereby incorporated by reference herein in their entirety.

FIELD OF THIS DISCLOSURE

The present invention relates generally to mobile communication networks and more particularly to mobile communication networks whose base stations are not stationary.

BACKGROUND FOR THIS DISCLOSURE

Published PCT Application No. WO2011092698 describes a cellular communication system with moving base stations and methods and apparatus useful in conjunction therewith.

Co-pending PCT Application No. PCT/IL2012/050082 describes a moving cellular communication system operative in an emergency mode.

In conventional cellular networks, a core functions as a server for many client base stations. The core is typically responsible for authentication, authorization, and accounting, anchoring point of the user, ip address allocation, handling addresses from an external interface point of view, idle state and mobility handler. Some application servers, for example video servers and SIP servers, may also reside in the core. In gsm/GERAN the core is termed CN (core network) and includes GGSN, SGSN, HLR and MSC. in UMTS/UTRAN the core is also termed CN.

Methods for linking stationery cores are known.

GRE (Generic Routing Encapsulation) is a known tunneling protocol operative to encapsulate various network layer protocols inside virtual point-to-point links over an Internet Protocol internetwork.

A GRE packet header structure is represented in FIG. 1A (prior art).

Tunnels are operative to transmit a first computer network protocol encapsulated inside a second network protocol. Use of tunneling to carry a payload over an incompatible delivery-network, or to provide secure delivery via a non-secure network, is known. GRE tunnels are used e.g. to carry IP packets with private addresses over the Internet using delivery packets with public IP addresses.

The disclosures of all publications and patent documents mentioned in the specification and materials appended thereto, and of the publications and patent documents cited therein directly or indirectly, are hereby incorporated by reference.

SUMMARY OF CERTAIN EMBODIMENTS

Certain embodiments of the present invention seek to provide plural mobile cores in conjunction with a cellular communication system with moving base stations such as that described in Published PCT Application No. WO2011092698.

Certain embodiments of the present invention seek to provide a cellular communication system comprising:

a population of cellular communication network nodes comprising a stationary core, a plurality of base stations, and at least one node having mobile station functionality; and a client tunneling functionality co-located with the node having mobile station functionality which is operative to use network topology information obtained via the mobile station functionality or via or other mobile stations to initiate generation of a tunnel having a first end at the node and a second end at the stationary core.

Also, typically a server tunneling functionality is provided which is operative to respond to tunnel generation initiation by said client tunneling functionality by cooperating with said node having mobile station functionality in generation of said tunnel including establishing said second far end of said tunnel.

The mobile station functionality typically comprises a modem and the server tunneling functionality may for example comprise a software application residing on the operating system associated with the modem.

Optionally, as shown in FIGS. 19A-G and 20A, at least one node having mobile station functionality functions as a mobile core including employing said tunnel to carry out at least one core functionality. The mobile core employs a tunnel to carry out authentication and/or other typically compulsory core functionalities.

Certain embodiments of the present invention seek to provide at least two cores, not just one, in a network, and to connect the 2 cores by generating a GRE tunnel between them.

This has various advantages: for example: each core may have specific applications or functionalities useful just for a particular organization. Also, cores a and b in locations a and b may physically link via a proprietary external cell network but each serve a whole campus without resorting to use of the proprietary external cell network which may be more cost effective from the campus's viewpoint. Also, people in an organization or campus may communicate with each other in the clear using the system shown and described herein which utilizes "per-campus" cores, whereas these cores communicate with each other encrypted. The result is a system for encrypted communication in which individual communicators do not need to bother to encrypt and the system does not need to distribute keys to them.

A particular advantage of certain embodiments is that several cores providing flexibility and/or added capacity and/or redundancy, may be provided. Also, backhauling is conserved. For example, if one or several (n) cellular end user populations, which communicate heavily with one another, are ultimately served (via base stations and, typically, relays) by a very far removed stationary core, considerable backhauling is required. Much less backhauling is required if the same population/s are each served by a relatively adjacent mobile core, and the resulting n mobile cores communicate with one another directly, rather than via the stationary core, to provide communication between their respective node populations without having to involve the very far removed stationary core in each exchange of communication between nodes. Also, if high-volume content such as maps or video footage is to be delivered to the above population/s and also to populations served only by the stationary core, it may still be most economical to store the high-volume content locally and communicate same to the mobile-core-served populations via the relatively adjacent mobile core rather than via the very far removed stationary core.

According to some embodiments, one mobile core communicates with another mobile core, and each has a mobile station functionality (rUE).

In a first case: one core has co-located base station functionality. Mobile station functionality in core1 connects to base station functionality of core2 over the air. So each of the 2 cores may have only mobile station functionality or only base station functionality respectively.

In a second case, cores do not have co-located base station functionality. Both have Mobile station functionality. They are mobile only within a cell of a certain base station and that base station, since the Mobile station functionality knows how to talk to base station, connects both. Both cores have Mobile station functionality and both are in the same cell so a base station which may not have a core has management functionality like that of a core but is not physically connected via base stations and may instead be a stand-alone subsystem which may not authenticate but is able to assign a time-slice to each user.

In a $3^{rd}$ case, both cores have Mobile station functionality, mobile beyond extent of one cell. They communicate over an external physical link e.g. In different cities or in a separate mobile network.

Certain embodiments of the present invention seek to provide a method for building a backhauling network which employs MBSFN channels.

Certain embodiments of the present invention seek to utilize a method based on a DFS algorithm for MBSFN MAC.

Certain embodiments of the present invention seek to provide a method based on a Time Division algorithm for MESH MBSFN MAC.

Certain embodiments of the present invention seek to ensure continuity of a session even when a backhauling link is dropped, by reconnecting to another base station when a backhauling link is dropped.

Certain embodiments of the present invention seek to provide a method for building a topology e.g. as per FIG. 18A herein.

At least the following embodiments are included within the scope of the present invention:

Embodiment 1

A cellular communication system comprising:

a population of cellular communication network nodes comprising a stationary core, a plurality of base stations, and at least one node having mobile station functionality; and a client tunneling functionality co-located with the node having mobile station functionality which is operative to use network topology information obtained via the mobile station functionality to initiate generation of a tunnel having a first end at the node and a second far end at the stationary core.

Embodiment 2

A system according to Embodiment 1 and also comprising a server tunneling functionality which is operative to respond to tunnel generation initiation by said client tunneling functionality by cooperating with said node having mobile station functionality in generation of said tunnel including establishing said second far end of said tunnel.

Embodiment 3

A system according to Embodiment 1 wherein said at least one node having mobile station functionality functions as a mobile core including employing said tunnel to carry out at least one core functionality.

Typically, the mobile core employs a tunnel to carry out the AUTHENTICATION core functionality as well as, optionally, other core functionalities e.g. as described in the authentication embodiment of FIG. 20A and with reference to FIGS. 19A and 19B in which authentication is effected over tunnels in a visited network and invite messages are typically sent (FIGS. 19A, 19B, 19D).

Embodiment 4

A system according to Embodiment 3 wherein said at least one node having mobile station functionality comprises a plurality of mobile cores being operative for communicating with one another and for simultaneously serving the population of nodes including providing communication links between each pair of nodes within the population of nodes wherein at least one communication link, between a first pair of nodes, is provided by a first core from among the plurality of mobile cores and wherein at least one communication link, between a second pair of nodes from among the plurality of mobile cores, is provided by a second core from among the plurality of mobile cores.

Embodiment 5

A system according to Embodiment 1 wherein said network topology information obtained via the mobile station functionality comprises at least one routing table obtained from an attach message sent to said node having mobile station functionality upon attachment of said node to said stationary core via one of said plurality of base stations.

Embodiment 6

A system according to Embodiment 1 wherein said at least one node having mobile station functionality is operative to inform at least one neighboring node that said tunnel currently exists and also to inform at least one neighboring node when said tunnel no longer exists.

Embodiment 7

A system according to Embodiment 1 wherein said at least one node having mobile station functionality is operative, when informed by at least one neighboring node that an individual tunnel currently exists, to inform at least one additional neighboring node that said individual tunnel currently exists, and when informed by at least one neighboring node that an individual tunnel no longer exists, to inform at least one additional neighboring node that said individual tunnel no longer exists.

Embodiment 8

A system according to Embodiment 4 wherein at least one pair of first and second mobile cores within the plurality of mobile cores communicate via existing base stations served by an existing core and wherein at least one node served by the first core communicates with at least one node served by the second core via a route including at least one hop between base stations served by the first mobile core, followed by at least one hop between base stations linking the first and second mobile cores and served by the existing core, followed by at least one hop between base stations served by the second mobile core.

Embodiment 9

A system according to Embodiment 8 wherein at least said first mobile core possesses a functionality which the existing core does not possess thereby to allow said functionality to be applied at least to internal sessions between nodes in said population of nodes linked only by base stations served by said first mobile core.

Embodiment 10

A system according to Embodiment 8 wherein said at least one node served by the first core communicates a message, to at least one node served by the second core, which is encoded while travelling between base stations linking the first and second mobile cores and served by the existing core, wherein said message is sent between base stations served by the first mobile core in the clear and is then encoded by an encoding functionality within the first mobile core and sent encoded through said at least one hop between base stations linking the first and second mobile cores and served by the existing core, thereby relieving the nodes served by the first mobile core of the task of obtaining encryption keys and of encoding messages which must travel encoded between base stations linking the first and second mobile cores and served by the existing core.

Embodiment 11

A system according to Embodiment 10 and wherein said message is decoded by the second mobile core, and is sent in the clear between base stations served by the second mobile core, thereby relieving the nodes served by the second mobile core of the task of obtaining decryption keys and of decoding messages which must travel encoded between base stations linking the first and second mobile cores and served by the existing core.

Embodiment 12

A system according to Embodiment 4 wherein each said mobile core includes co-located mobile station functionality.

Embodiment 13

A system according to Embodiment 4 wherein at least one pair of mobile cores within the plurality of mobile cores communicate via a GRE tunnel.

Embodiment 14

A system according to Embodiment 4 wherein said plurality of mobile cores comprises at least three mobile cores and wherein at least two pairs of mobile cores within the plurality of mobile cores communicate via at least two GRE tunnels respectively, and wherein at least one pair of mobile cores within the plurality of mobile cores are not directly interconnected via a GRE tunnel but said at least two GRE tunnels form a path of GRE tunnels indirectly interconnecting said pair of mobile cores not directly interconnected.

Embodiment 15

A system according to Embodiment 1 wherein at least some of the nodes are base stations defining cells and wherein the cores have only inter-cell mobility.

Embodiment 16

A system according to Embodiment 1 wherein at least some of the nodes are base stations defining cells and wherein at least one of the cores also has intra-cell mobility.

Embodiment 17

A system according to Embodiment 4 wherein at least one pair of mobile cores within the plurality of mobile cores communicate via an IP tunnel.

A core having Mobile station functionality is termed herein a regular mobile core whereas a core having Mobile station functionality and co-located base station functionality is termed herein an upgraded mobile core.

The mobile station functionality typically comprises a modem and the server tunneling functionality may for example comprise a software application residing on the operating system associated with the modem.

The term "mobile (communication) device" as used herein is intended to include but not be limited to any of the following: mobile telephone, smart phone, playstation, iPad, TV, remote desktop computer, game console, tablet, mobile e.g. laptop or other computer terminal, embedded remote unit.

The term "physical" link between nodes is used herein to denote notes which are directly connected as opposed to via other node or nodes. The physical link may be achieved via copper wire, optical fiber, over-the-air and so forth. The term "physical link" is unrelated to OSI's layer 1 which is also termed a "physical layer".

rBS and enB both refer to base station functionality.

mobile station functionality or rUE: functionality, typically software implemented, residing on a relay or inverse relay (iRelay) Proxy which communicates with an antenna, transmitter and receiver to enable the relay or inverse relay (iRelay) Proxy to function as a mobile communication device. The mobile station functionality typically includes antenna, RF front-end, Modem (communications processor) but does not necessarily include an application processor nor appliances such as keyboard, screen, microphone, and speaker which serve a conventional mobile station.

Inverse relays (iRelays) are described in co-pending WIPO Patent Application WO/2013/118129 entitled "A Multi-Directional Relay Architecture And Apparatus And Methods Of Operation Useful In Conjunction Therewith", inter alia.

Radio bearer, bearer: e.g. as per 3GPP terminology.

RE resource block: e.g. as per LTE standard or an adaptation thereof suitable for operation within communication standards other than LTE.

Other definitions of terminology herein may be in accordance with the literature including co-pending patent applications such as PCT Application No. PCT/IL2012/050082 "Moving cellular communication system operative in an emergency mode", and co-owned patents.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIGS. 1A, 1B, 2, 3A-D, 4A-C, 5A-C, 6A-C, 7, 8A-D, 9-16, 17, 18A-D, 19A-G, 20A-C, 21, 22, 23-25, 26A-D, 27, 28, 29, and 30 describe certain embodiments of the present invention. In particular:

FIG. 1A is a prior art diagram of a GRE packet header structure.

FIG. 1B is a prior art example of Intra-MME/Serving GW handover taken from 3GPP TS 36.300 V9.7.0 FIG. 10.1.2.1.1-1.

FIG. 2 is a prior art of subframes that can handle for MBSFN transmission as specified by the 3GPP 36.331 V9.7.0 in the MBSFN-SubframeConfig information element.

FIGS. 3A-D are examples of using MBSFN subframes in order to enable downstream data.

FIGS. 4A-C are examples of using MBSFN subframes in order to enable upstream data.

FIGS. 5A-C are examples of using MBSFN subframes in order to exchange X2 messages.

FIGS. 6A-C are other examples of using MBSFN subframes in order to exchange X2 messages.

FIG. 7 is a prior art example of MESH routing protocol over Ethernet by using MESH routing table.

FIGS. 8A-D are examples of using MESH routing protocol in mobile relay network by using both routing table and cellular anchoring table.

FIG. 9 is an example of using MESH routing protocol in mobile relay network using MBSFN subframes in order to enable downstream and upstream data by using Routing table, anchoring table and channeling table.

FIGS. 10-29 illustrate various components of the present invention which, like the elements of FIGS. 1-9, may be provided together or separately, according to certain embodiments. In particular:

FIG. 10 is a diagram of a method by which to build iRelay network (using MBSFN) according to an embodiment.

FIG. 11 is a diagram of an iRelay internal view.

FIG. 12 is a block diagram of a prior art EPC core according to an embodiment.

FIG. 13 is a block diagram of a functional split between E-UTRAN eNB and EPC according to an embodiment.

FIG. 14 is a diagram of deployment of upgraded eNB in rural areas according to an embodiment.

FIG. 15 is a block diagram of a management layer (rRM) which resides in the iRelay according to an embodiment.

FIG. 16 is a block diagram of a tunneling subsystem according to an embodiment.

FIG. 17 is a flowchart of a method for building an iRelay network according to an embodiment.

FIGS. 18A-D are diagrams of a method of building the iRelay network according to an embodiment.

FIGS. 19A-G are diagrams showing communication among UE1, UE2, and UE3 according an embodiment.

FIGS. 20A-C are diagrams showing prior art authentication and verification using the LTE standard.

FIG. 21 is a diagram of a method for synchronization of an iRelay to the network according to an embodiment.

FIG. 22 is a flowchart of a Distribute Coordination Function (DCF) like algorithm according to an embodiment.

FIG. 23 is a flowchart of a flitting management Break Before Make (BBM) scheme according to an embodiment.

FIG. 24 is a flowchart of a flitting management Make Before Break (MBB) scheme according to an embodiment.

FIG. 25 is a flowchart of a method for Dynamic generation of IP e.g. GRE tunnels between mobile cores according to an embodiment.

FIG. 26A-D are flowcharts of switch event methods according to an embodiment.

FIG. 27 is a flowchart of a method of dynamically building and distributing an expanded routing table according to an embodiment.

FIG. 28 is a diagram of using mbsfn channels in order to build cellular mesh network, over ip tunnels according to an embodiment.

FIG. 29 is a diagram of using ip tunnels in order to build cellular mesh network, over ip tunnels according to an embodiment.

FIG. 30 is a diagram showing a multiple key creation method for LTE according to an embodiment.

Figure 1B:
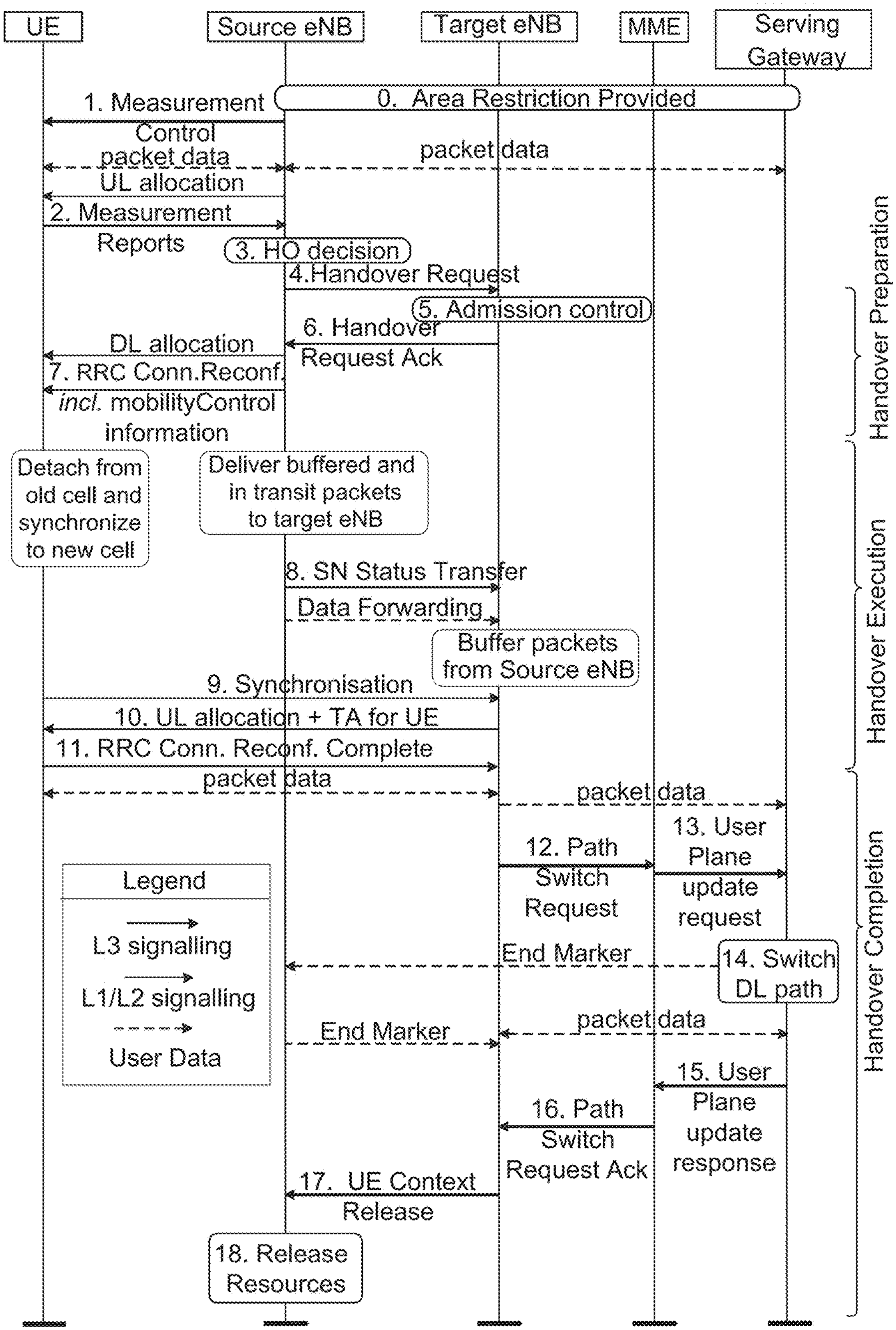

Reference is made to PCT/IL2013/050345 published as WO2013160892 on 31 Oct. 2013 and entitled "Apparatus and methods for moving relay interference mitigation in mobile e.g. cellular communication networks" and a description including drawings and claims of a TDD-based embodiment.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Published PCT Application No. WO2011092698 describes a cellular communication system with moving base stations and methods and apparatus useful in conjunction therewith. It is appreciated that mutatis mutandis, any suitable mobile or cellular communication protocol may be employed. This technology, or other known technologies in which the base station or access point is mobile, optionally in conjunction with the teachings herein, is also termed herein MAN (Moving Access Network) technology. A moving relay according to such technology, except as described herein, including the following co-located components: base station and mobile device functionalities and a relay resource manager (rRM) including a radio resource subsystem having a radio resource manager, is also termed herein a MAN, or a MAN node. The term "co-located" is intended to include any apparatus in which the above components all move together such that their relative locations remain constant or that are all physically connected.

Techniques, methods and examples described herein can be implemented in a network in which some or all relays are static.

Figure 10:
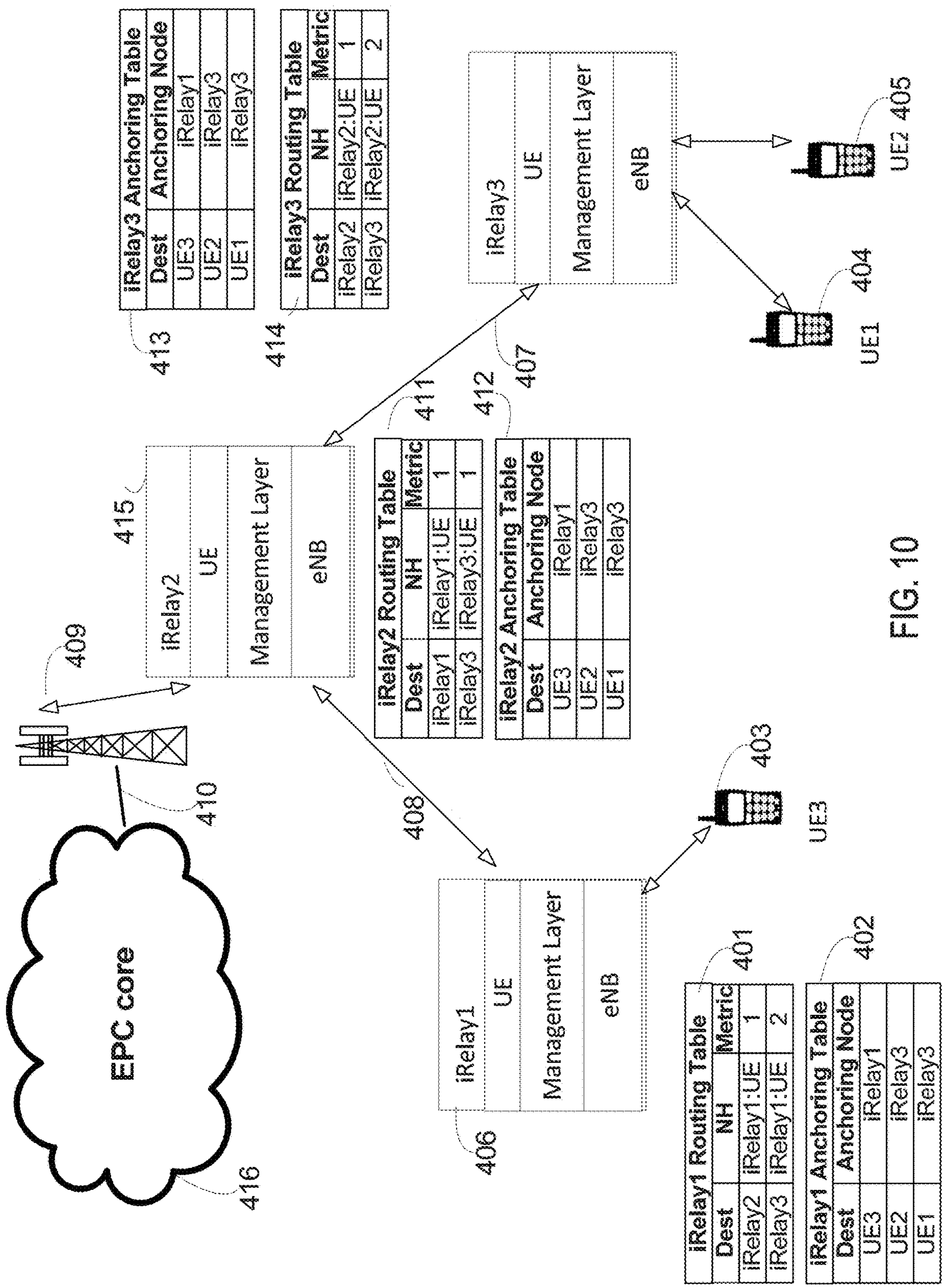

FIG. 1B is a prior art example of Intra-MME/Serving GW handover taken from 3GPP TS 36.300 V9.7.0 FIG. 10.1.2.1.1-1.

Figure 2:
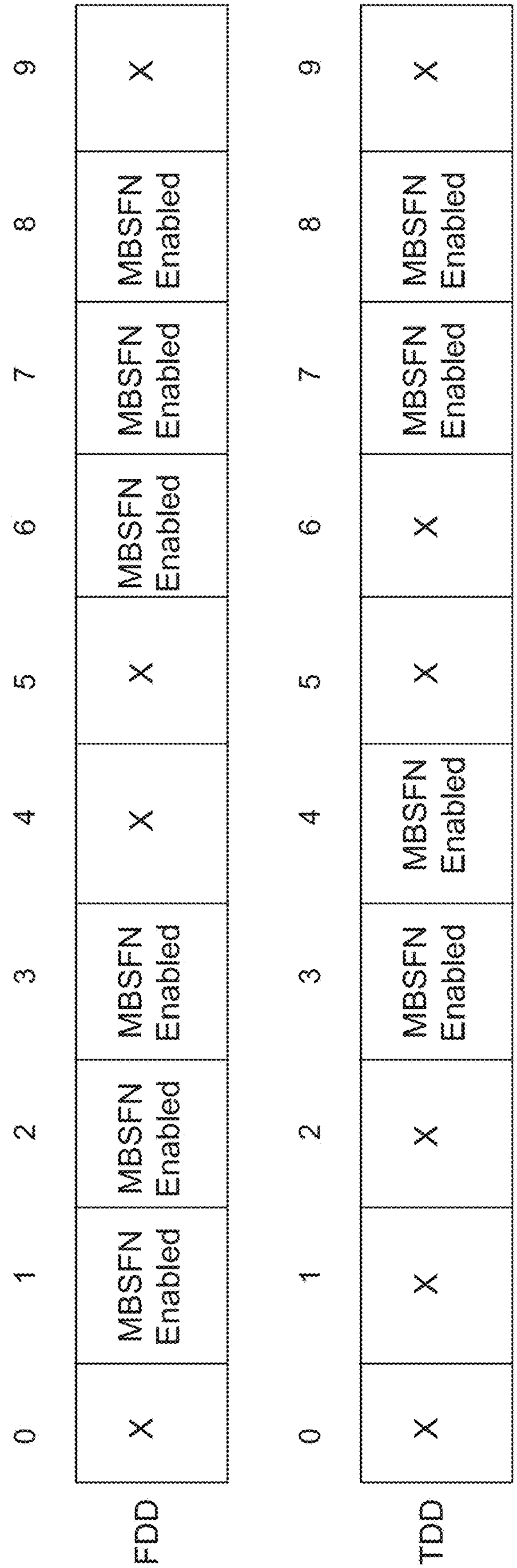

FIG. 2 is a prior art of subframes that can handle for MBSFN transmission as specified by the 3GPP 36.331 V9.7.0 in the MBSFN-SubframeConfig information element.

FIG. 3 is an example of using MBSFN subframes in order to enable downstream data.

FIG. 1B is a timing diagram of a conventional handover protocol which can be used in conjunction with embodiments of the present invention although alternatively, any other suitable handover protocol may be employed e.g. any suitably timed combination or permutation of any or all of the elements of the protocol of FIG. 1B.

FIG. 2 is an example of channels which may be employed by embodiments of the present invention.

FIGS. 3A-D are examples of an inverse relay scheme, e.g. as described in WIPO Patent Application WO/2013/118129, entitled “A Multi-Directional Relay Architecture And Apparatus And Methods Of Operation Useful In Conjunction Therewith”, which may be used to communicate downlink data between moving base stations e.g. base station functionalities of relays such as those described in the published PCT application by B. Gilo et al referenced herein In the illustrated embodiment, the UE of the top iRelay is physically linked to the stationary base station which is physically linked to the stationary core (e.g. the EPC core shown in prior art FIG. 12). Also, the eNB of the top iRelay is physically linked, e.g. over the air, to the UE of the bottom iRelay. Each mobile communication device is physically linked to the eNB of its serving iRelay. The iRelay routing manager is physically linked to the core e.g. by copper or optical fiber. The iRelay routing manager may or may not reside in the stationary network. Alternatively, some or all iRelay routing managing functionalities described herein may be performed locally, by a distributed plurality of iRelay routing managers, e.g. one per mobile core. Each downlink channel (or uplink channel—FIGS. 4A-C) may for example comprise an MBSFN channel.

Figure 3A:
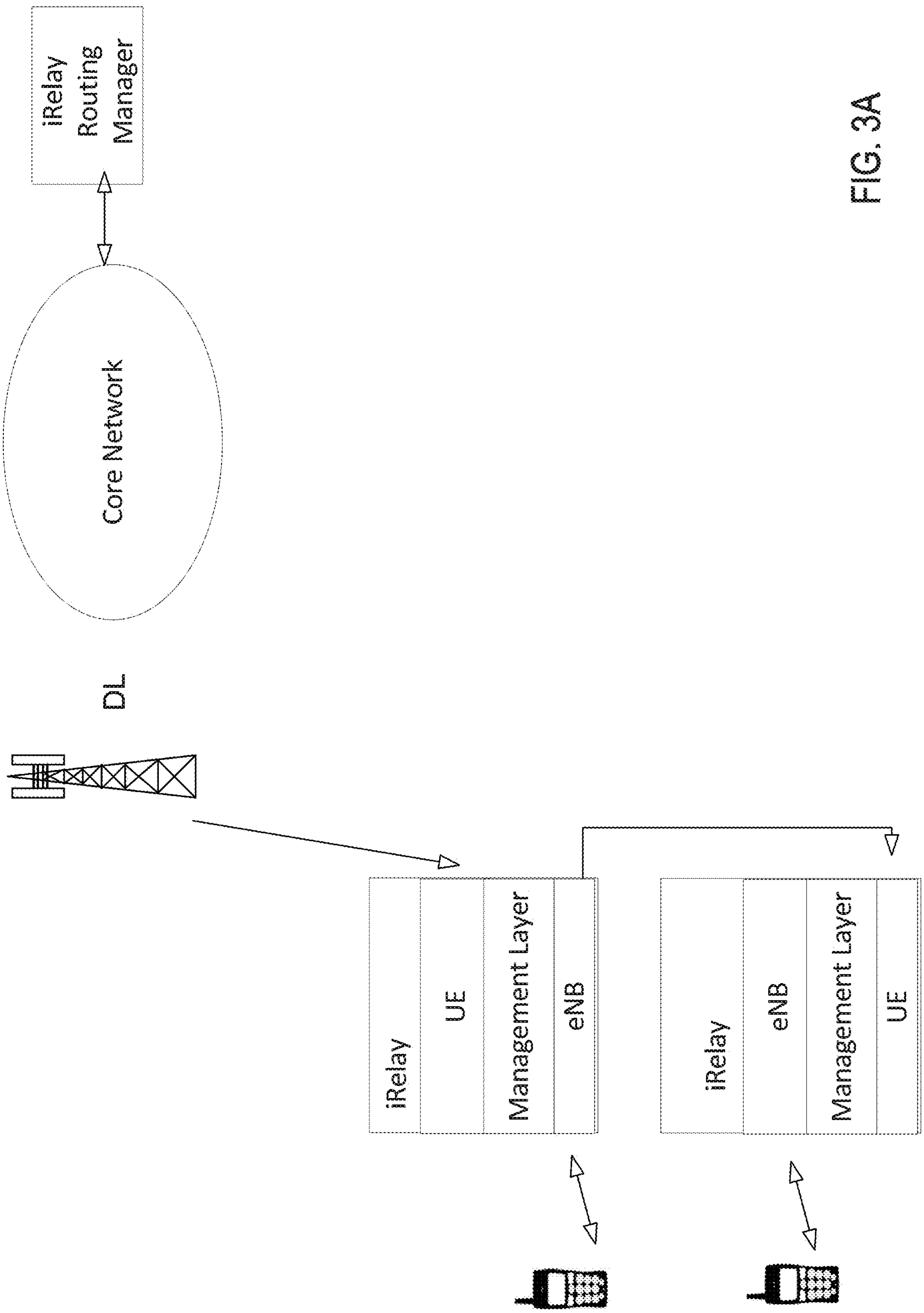
Figure 3B:
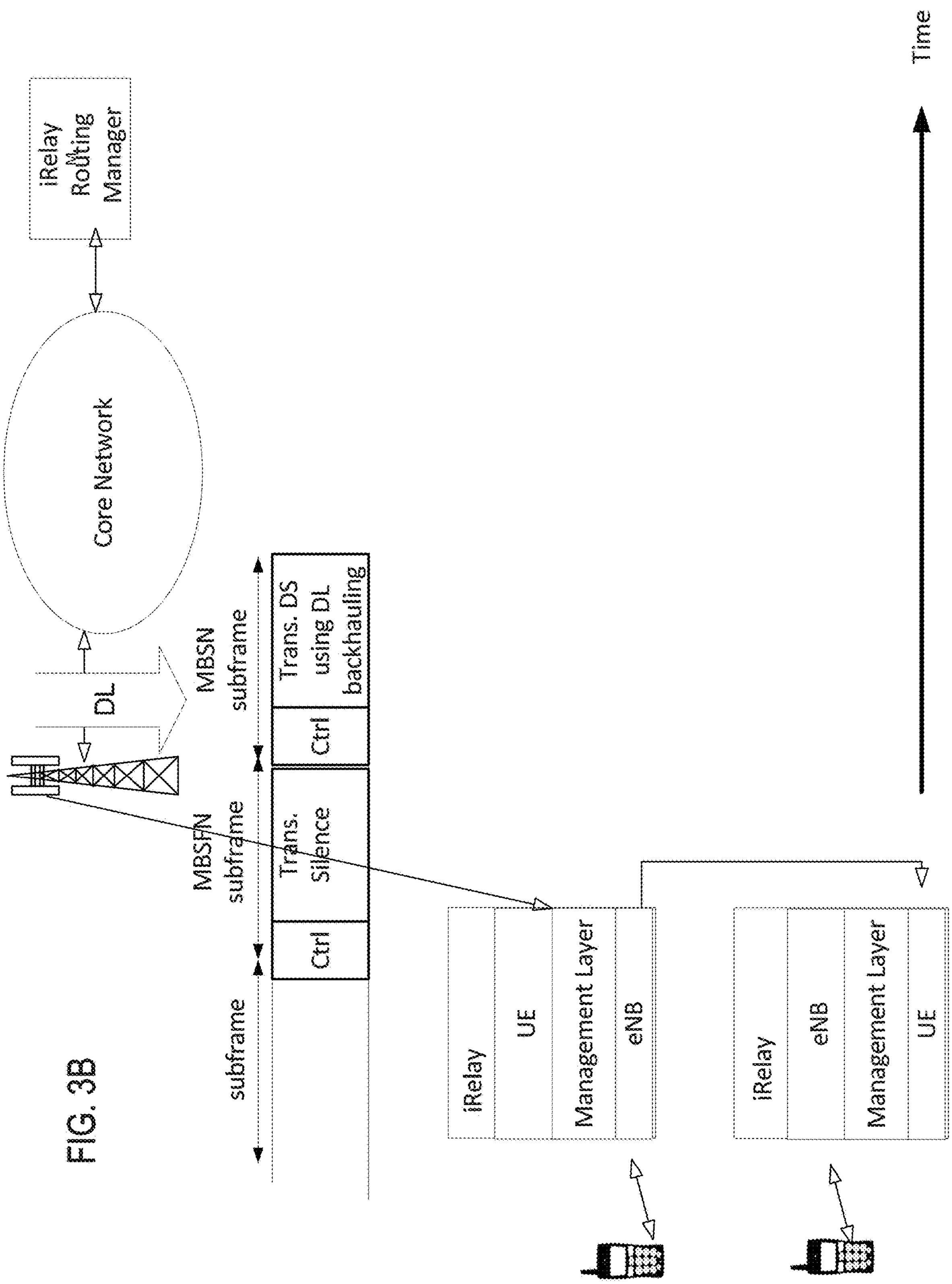

FIG. 3B illustrates an example use of MBSFN protocol, for the transmission of the top iRelay of FIG. 3A.

Figure 3C:
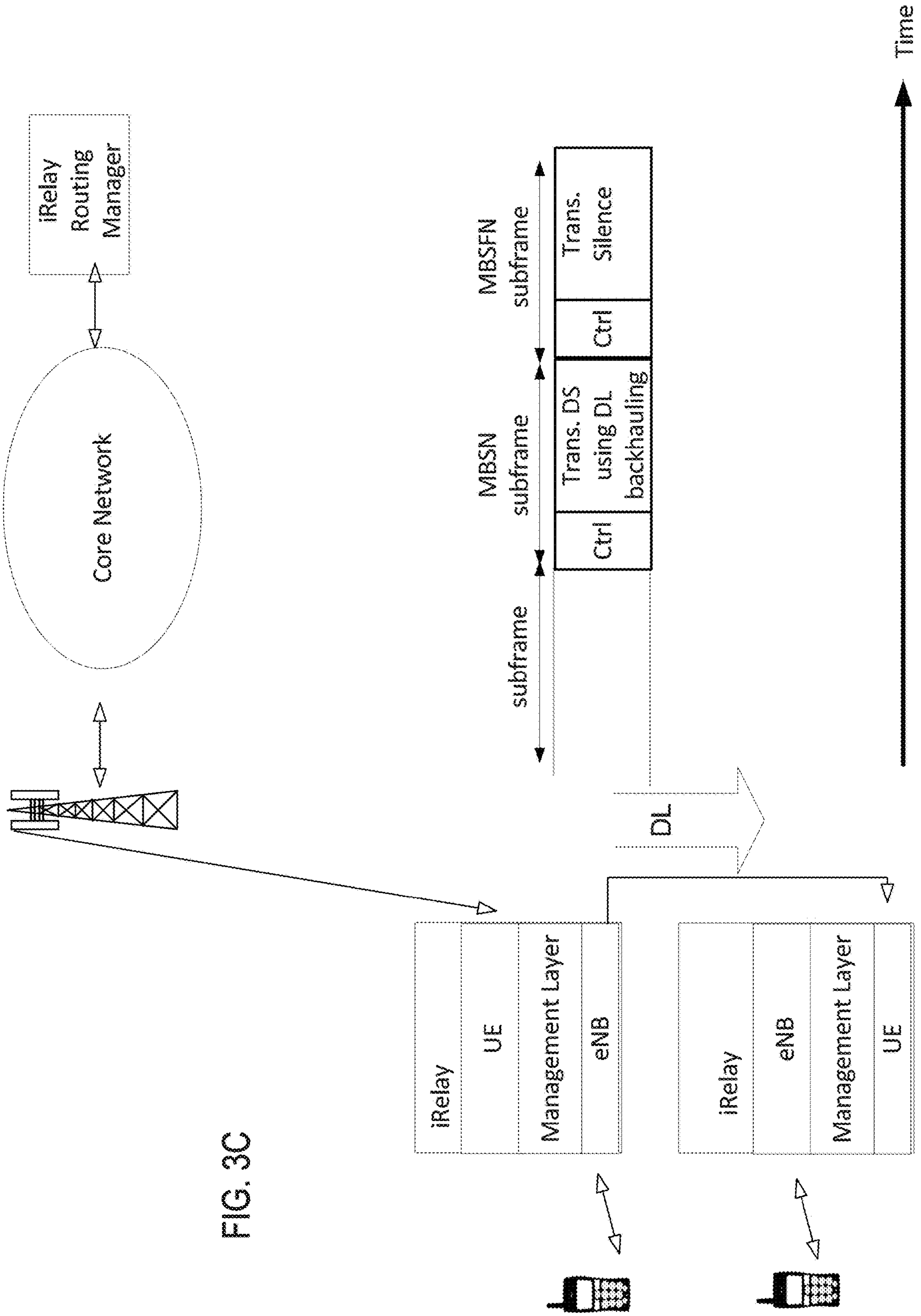

FIG. 3C illustrates an example use of MBSFN protocol, for the transmission of the: middle iRelay of FIG. 3A.

Figure 3D:
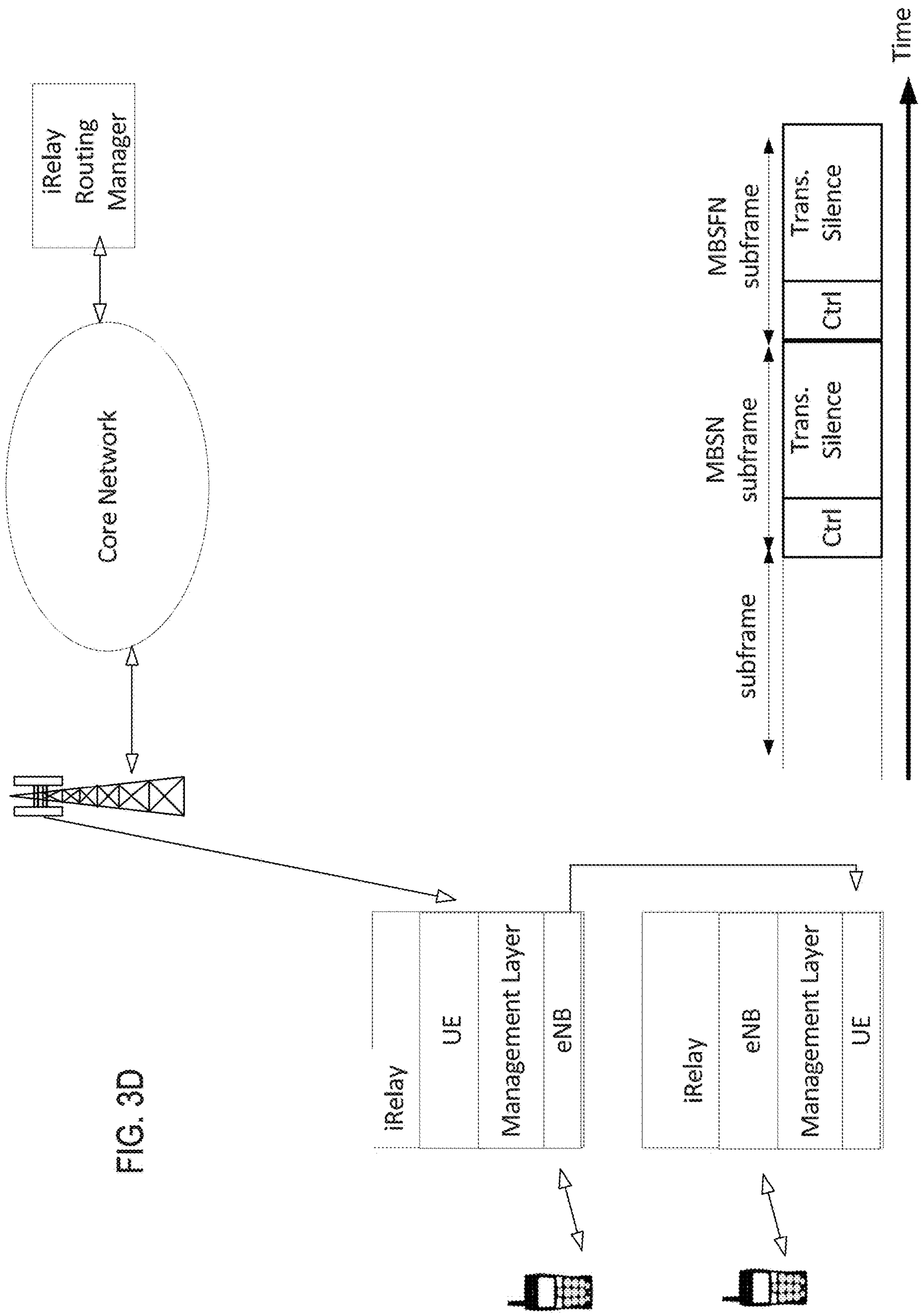

FIG. 3D illustrates an example use of MBSFN protocol, for the reception of the bottom iRelay of FIG. 3A.

Figure 4A:
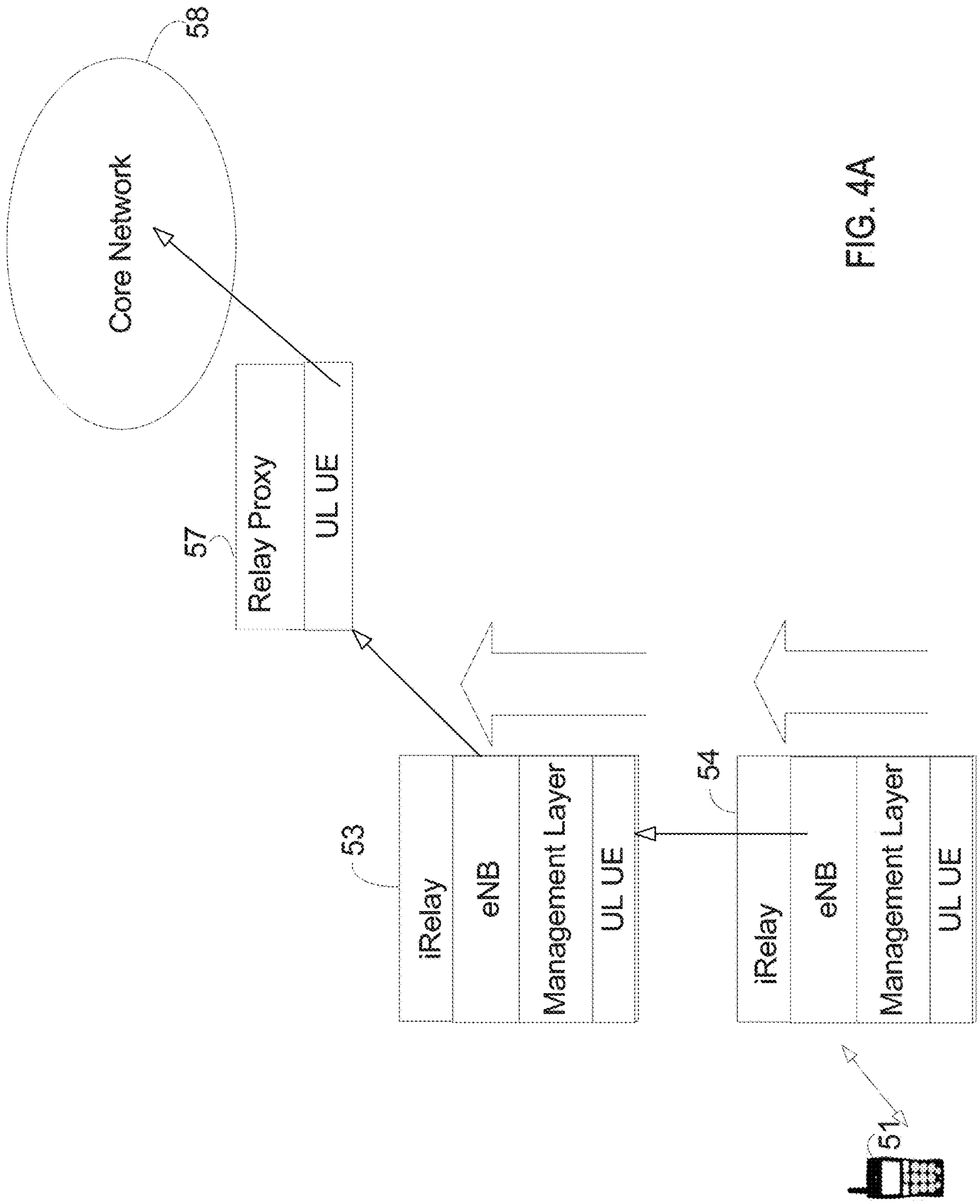
Figure 4B:
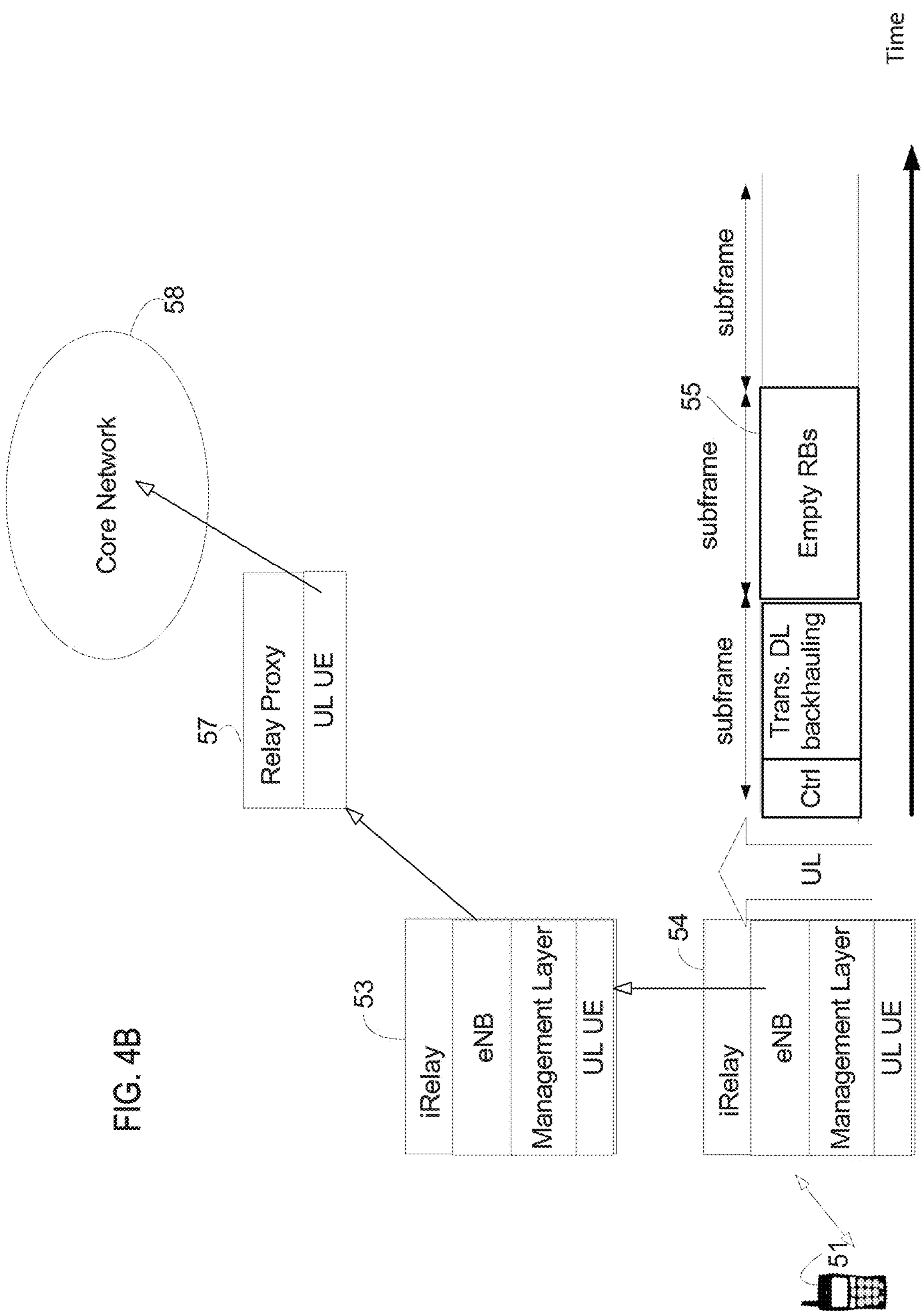
Figure 4C:
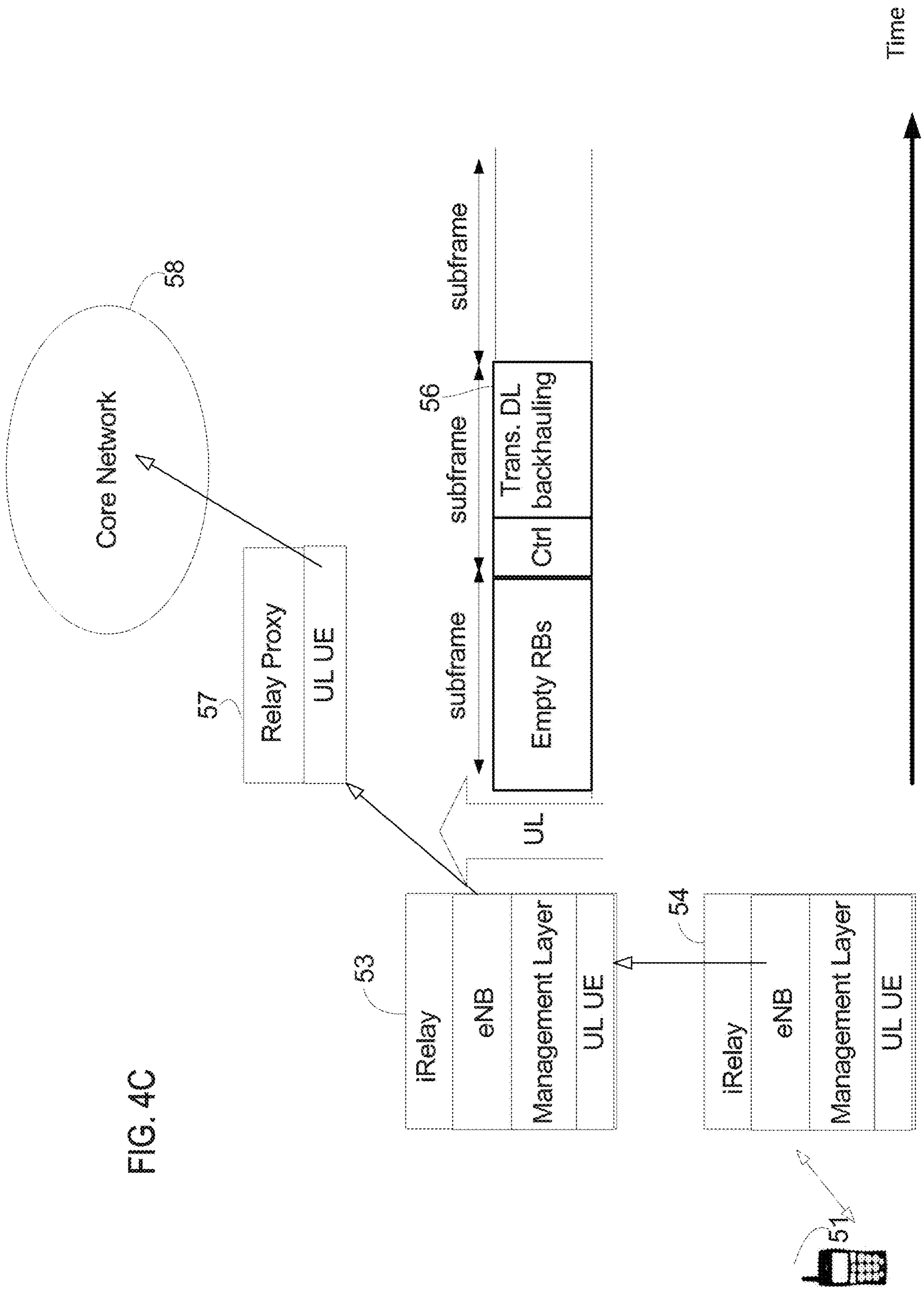

FIGS. 4A-C are examples of using MBSFN subframes in order to enable upstream data.

FIG. 4B illustrates an example protocol, for transmissions by the top iRelay 53 of FIG. 4A.

FIG. 4C illustrates an example protocol, for transmissions by bottom iRelay 54 of FIG. 4A.

Figure 5A:
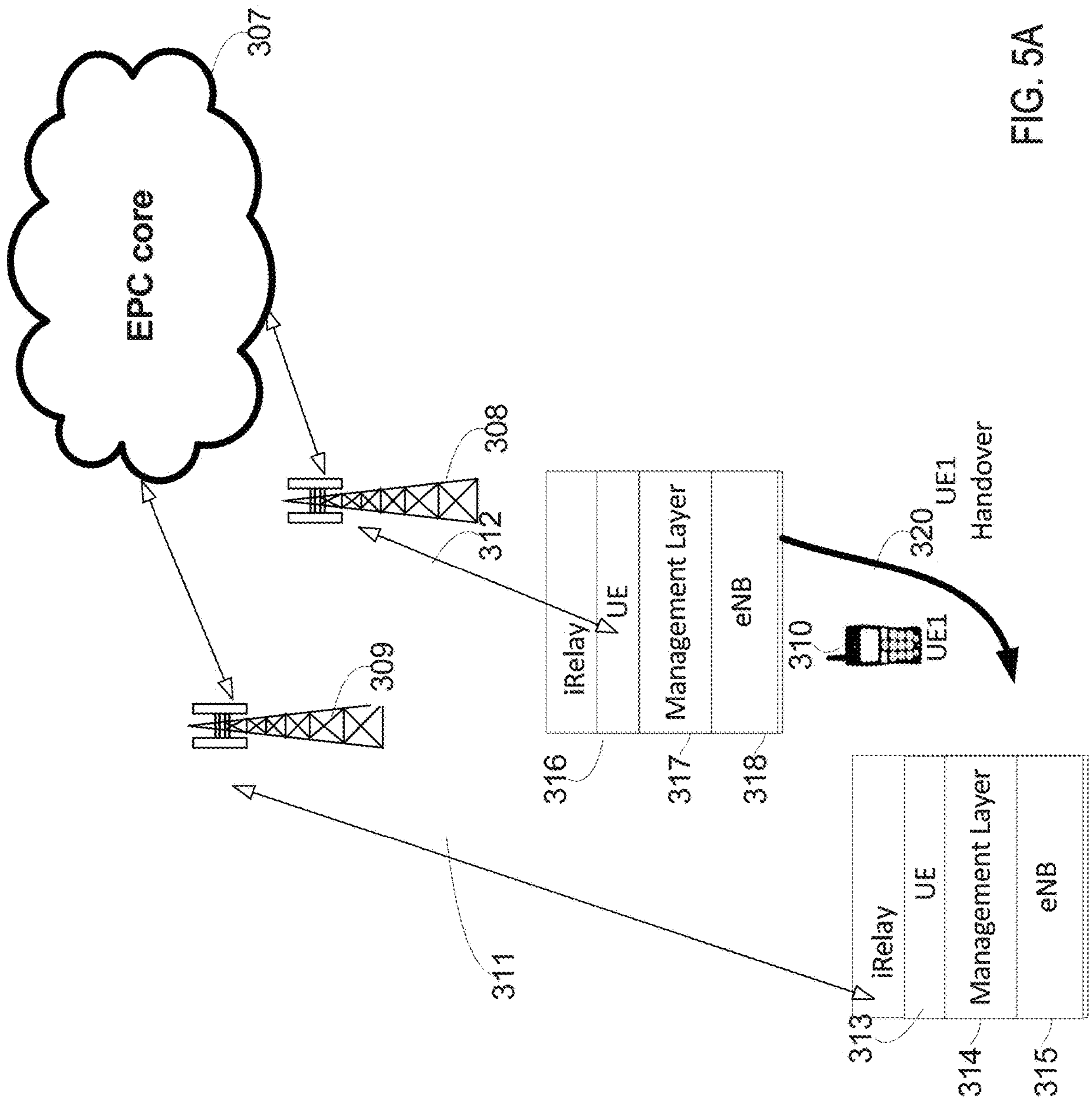
Figure 5B:
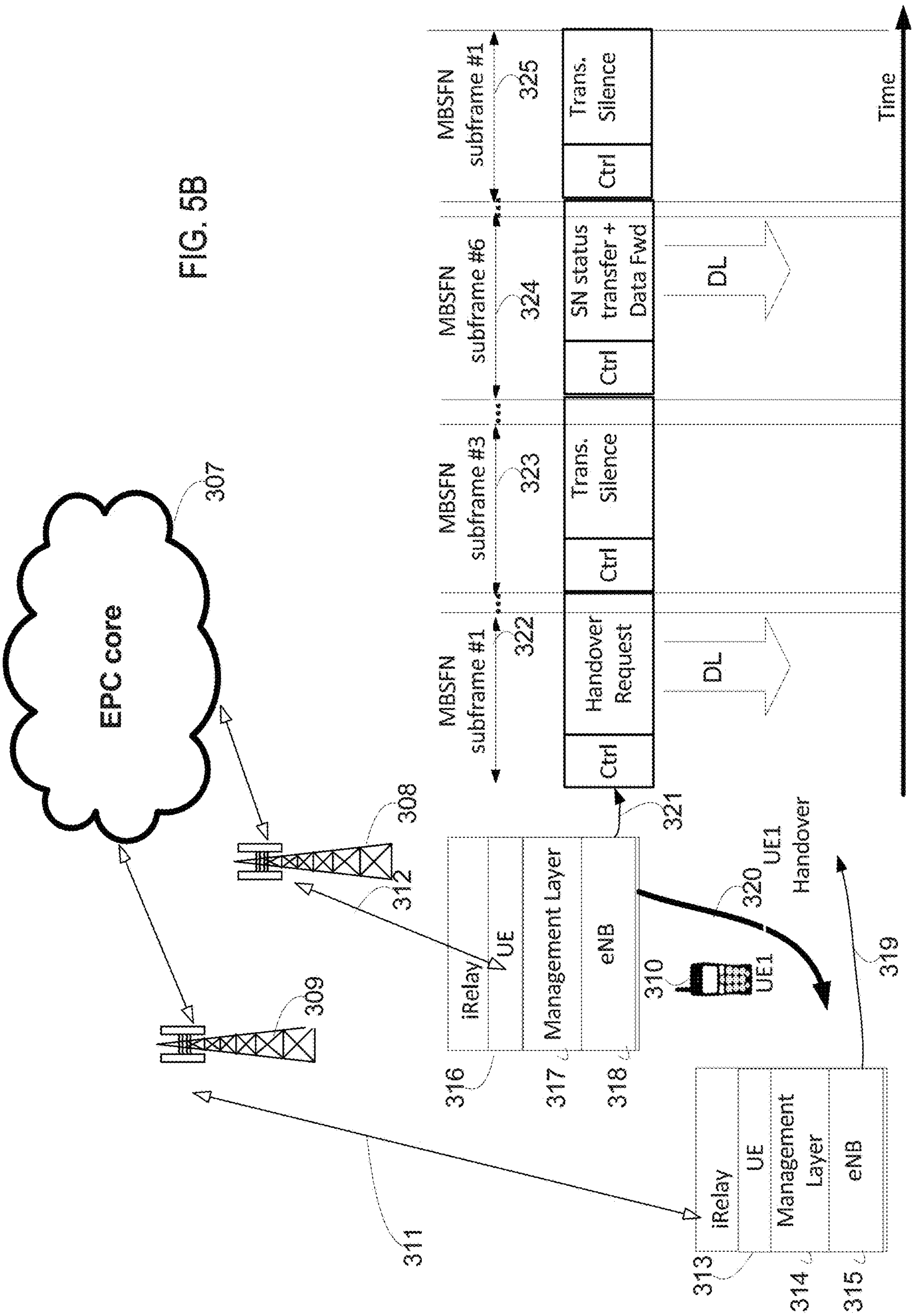

FIG. 5A illustrates a handover of mobile communication device 310 from iRelay 316 to iRelay 313. It is appreciated that handover is time-critical since it is desirable that the handover be rapid enough (e.g. a few dozen millisec or less) not to disturb the user-experience for the user of mobile device 310. But if each exchange between the serving base stations (in this case iRelays 316, 313) needs to pass through the base station and core of the handing-over base station and then through the base station of the new base station and vice versa, clearly handover will be slow. According to certain embodiments, therefore, the handing over base station functionality (e.g. iRelay 316) utilizes available time-slots in the MBSFN channel to “shout to” the neighboring base station functionality 313 thereby obviating the time-consuming involvement of the stationary base stations 308, 309 and the stationary core 307. Any suitable dialogue (sequence of messages inviting new serving base station to accept the device 310, accepting this invitation, etc. e.g.) may be used to actually effect the handover such as but not limited to that shown in FIG. 1B and any suitable scheme may be employed to fit the elements of this dialogue into the available time-slots in the MBSFN channel, such as but not limited to the scheme shown in FIGS. 5B and 5C. Specifically:

FIG. 5B illustrates an example use of MBSFN protocol, for transmissions by the eNB 318 of the top iRelay of FIG. 5A, as indicated by arrow 321.

Figure 5C:
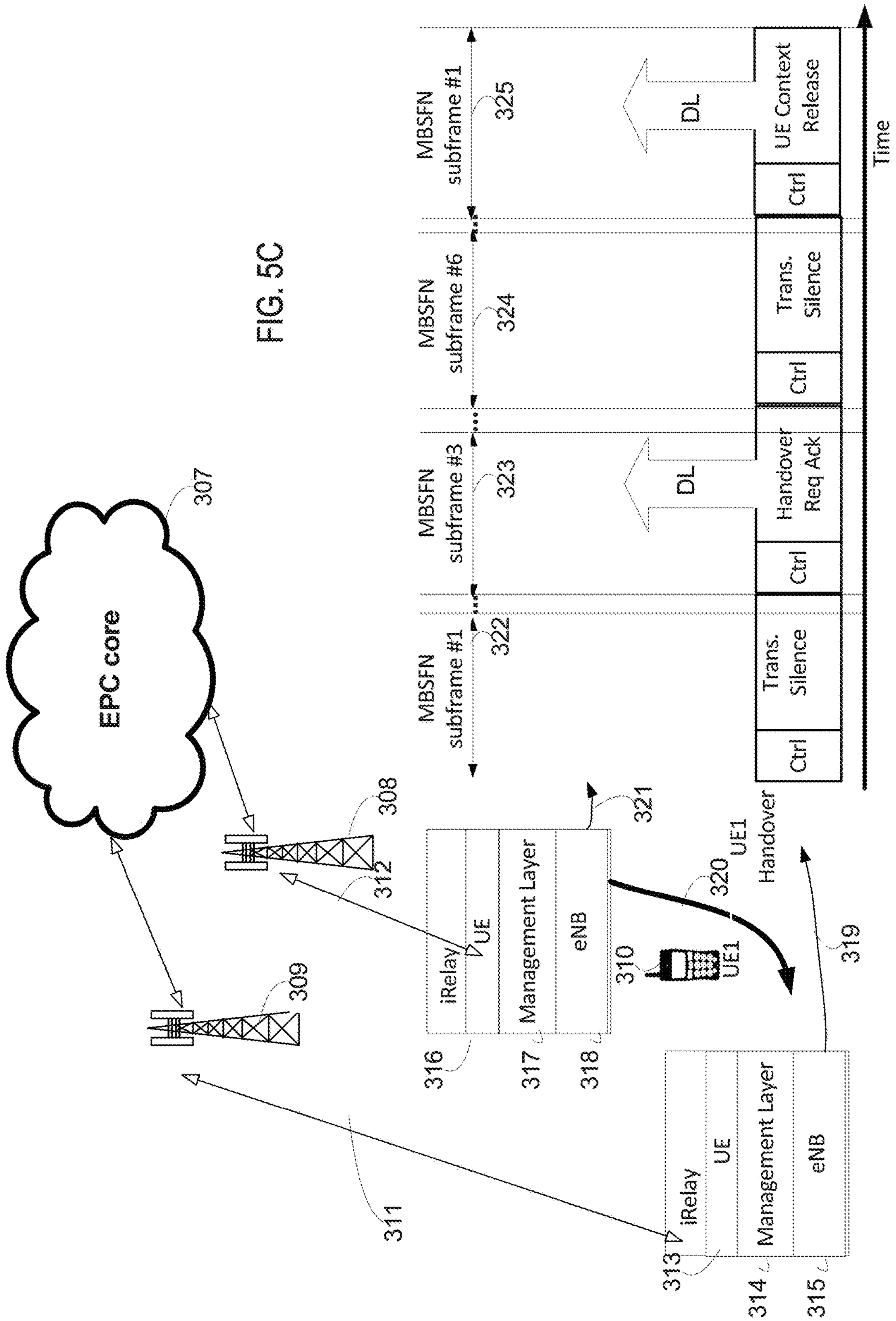
Figure 22:
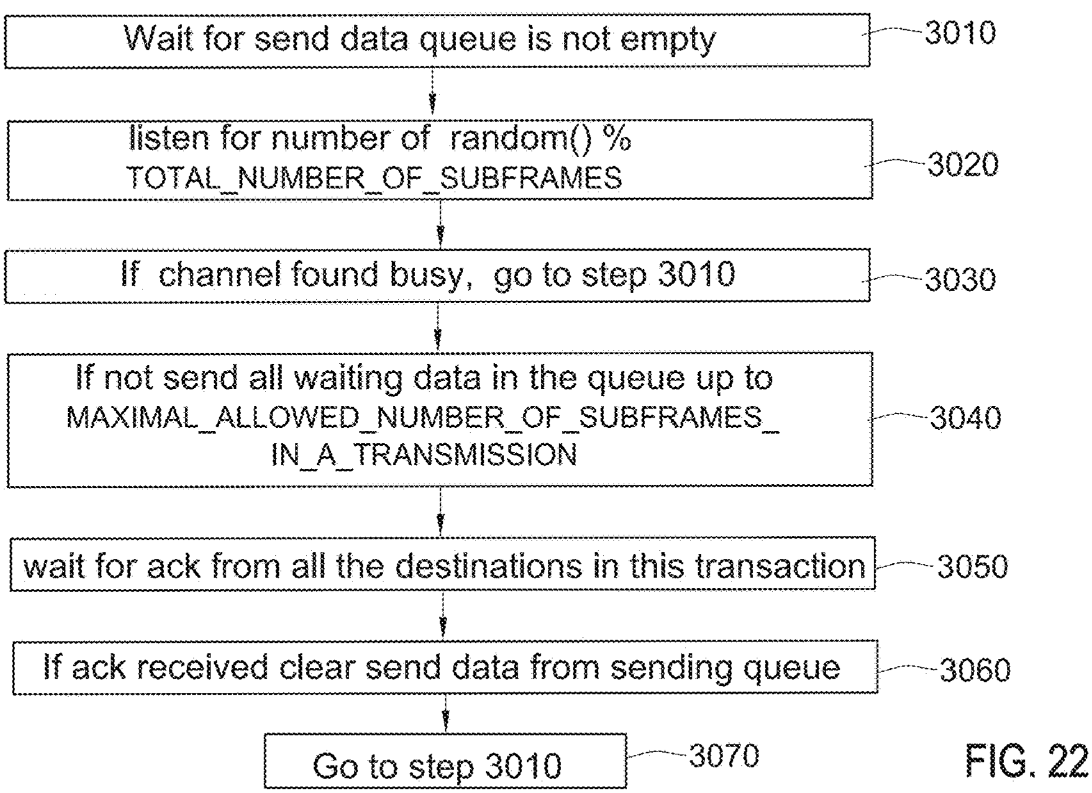

FIG. 5C illustrates an example use of MBSFN protocol, for transmissions by the eNB 315 of the bottom iRelay of FIG. 5A, as indicated by arrow 319; TDMA may be used both here and in FIG. 5B, e.g. as shown in prior art FIG. 2. As shown, subframes 1, 3, 6, 1 . . . may be used, assuming there are 10 subframes as shown in FIG. 2. However, this is merely an example. One or more iRelay routing manager/s may manage the time slot allocations in the MBSFN channel such that each mobile device in the vicinity which needs to be handed over, has the time slots to effect this (some or all of the MBSFN-enabled time slots, e.g. as shown in FIG. 2), without interfering with other roles performed by the MBSFN channel. Design & management operation of iRelay routing manager may be as per FIG. 22 herein or as per the “non integrated” embodiment described herein.

Figure 6A:
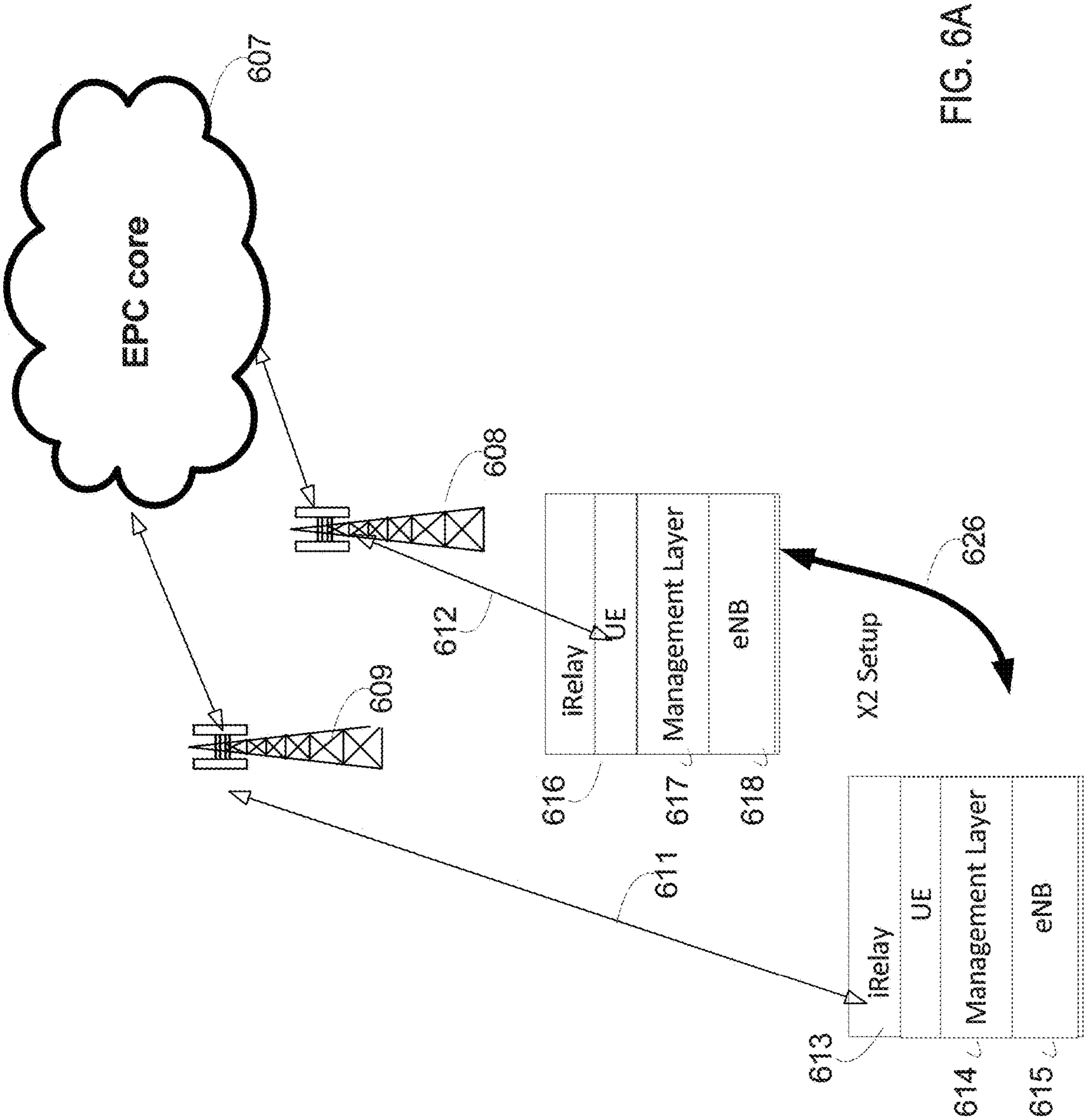

FIGS. 5A-C, taken together, form an example of using MBSFN subframes in order to exchange X2 messages and FIG. 6A is another example of using MBSFN subframes in order to exchange X2 messages. These drawings will now be described in detail.

FIGS. 5A-5C, taken together, form an example method for using MBSFN subframes in order to exchange X2 messages. In the example iRelay [316] and iRelay [313] are exchanging X2 messages in order to handover UE1 [310]. In the example subframe #1[322] and subframe #6 [324] are preserved for the use of iRelay [316] meaning that all other neighboring eNBs are silence in these subframes and subframe #3 is preserved for iRelay [313] use. At the beginning UE1[310] is attached to iRelay [316], as depicts in the prior art FIG. 1B, UE1 [310] sends measurement reports, that are used by the serving eNB[318], the eNB[318] part of iRelay [316] in order to decide on a handover [FIG. 1B, 3.]. when the eNB[318] part of iRelay[316] decides on a handover procedure that will handover UE1[310] from its serving eNB[318] to the target eNB[315]. eNB[318] will send handover request over X2 interface, the management layer [317] receives the X2 interfaces stream and sends it over the next mbsfn subframe through the eNB [318] that is preserved for iRelay[316] use, MBSFN subframe #1 [322]. The handover request is received by the UE portion of iRelay [313], the UE sends the request to the management layer [314] which transmits it over the X2 interface of the target eNB[315]. According to the standard depicts in FIG. 1B The eNB[315] replays with Handover Req. Ack, the handover Req. Ack is sent over X2 interface through the management layer [314] back to the eNB over the preserved MBSFN subframe #3[323]. The request is received by the UE portion of iRelay [316], the UE sends the request to the management layer [317] which transmit it over the X2 interface to the target eNB[318]. According the X2 handover procedure depicts in FIG. 1B step 7, eNB[318] continues by detaching UE1 [310] and commands it to handover to eNB[315] part of iRelay[313] while eNB[318] continues with the X2 handover procedure by sending the SN status transfer and data forwarding packets over the X2 stream to the target eNB[315] over the next preserved MBSFN subframe, subframe #6[324]. After UE1[310] finishes the handover procedure it sends RRC Conn. Reconf. Complete. Then the target eNB [315] will continue and update the MME resides in the EPC core [307] by sending path switch request message through the UE portion of iRelay [313], the UU air interface [311] and the static base station [309].

The MME that resides in the EPC core [307] replays Path Switch Ack back to the eNB[315] part of iRelay[313] using the same path; the static base station [309], the air interface [311], UE portion of iRelay [313]. The target eNB [315] then sends UE context release message over the next preserved MBSFN, MBSFN subframe #3 [325] to the source eNB [318]. The message is being received by the UE portion of iRelay[316] which sends it to the Management layer [314]. The Management layer sends it over the X2 interface to the source eNB [318] and this concludes the handover procedure.

At reference numerals 321 and 319, note X2 signals being transmitted over MBSFN subframe in a time division multiple access like method in order to signal a handover method[320] of UE1 from source eNB [318] to target eNB [315]

In the method [322], the messages are taken from the LTE standard depicts in the prior art FIG. 1B, e.g. as per some or all of the following steps, suitably ordered e.g. as shown:

a. Source eNB[318] sends Handover request message to Target eNB[315] over MBSFN subframe #1, while the Target eNB is having a silent subframe
b. The message is being received by the MBSFN receiver resides in the UE adjacent to the Target eNB and then being transmitted to the target eNB as a backhauling link to the Source eNB
c. Target eNB[315] sends Handover Req Ack to Source eNB[318] over MBSFN subframe #3, while the Source eNB is having a silent subframe.
d. The message is being received by the MBSFN receiver resides in the UE adjacent to the Source eNB and then being transmitted to the Source eNB as a backhauling link to the Target eNB
e. The sequence follows as in the standard, for those bearers for which requires in sequence delivery of packets is required, those packets including the sequence number are being forward by the Source eNB over MBSFN subframe in a similar manner until
f. The handover is completed and the target eNB sends UE context release message [325], in our example it is in subframe #1, but can be in any consecutive free subframe.

Lines 308 and 309 etc. are backhauling physical lines. iRelay 313 may comprise a UE plus elements 314 and 315 as shown.

Figure 6B:
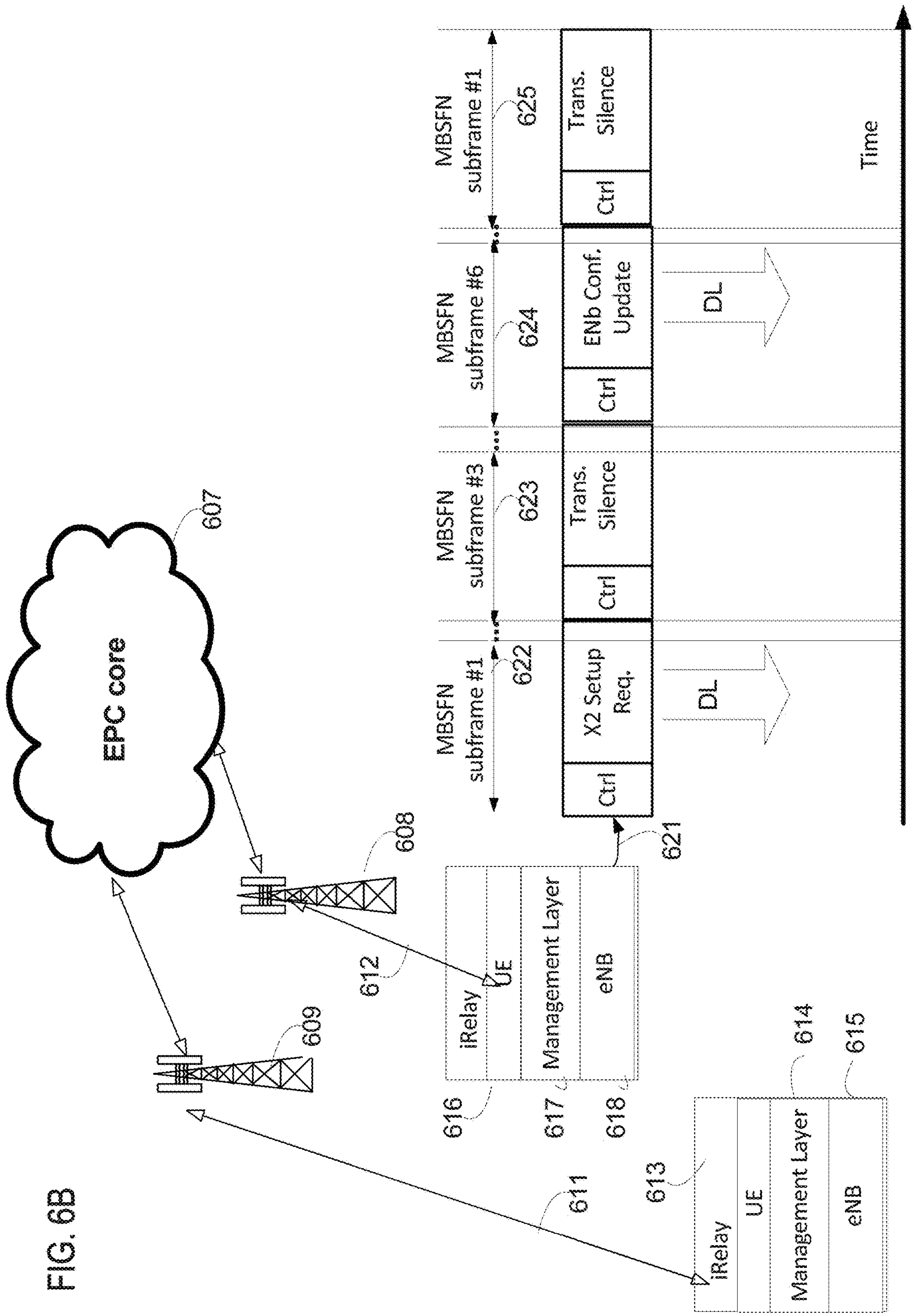
Figure 6C:
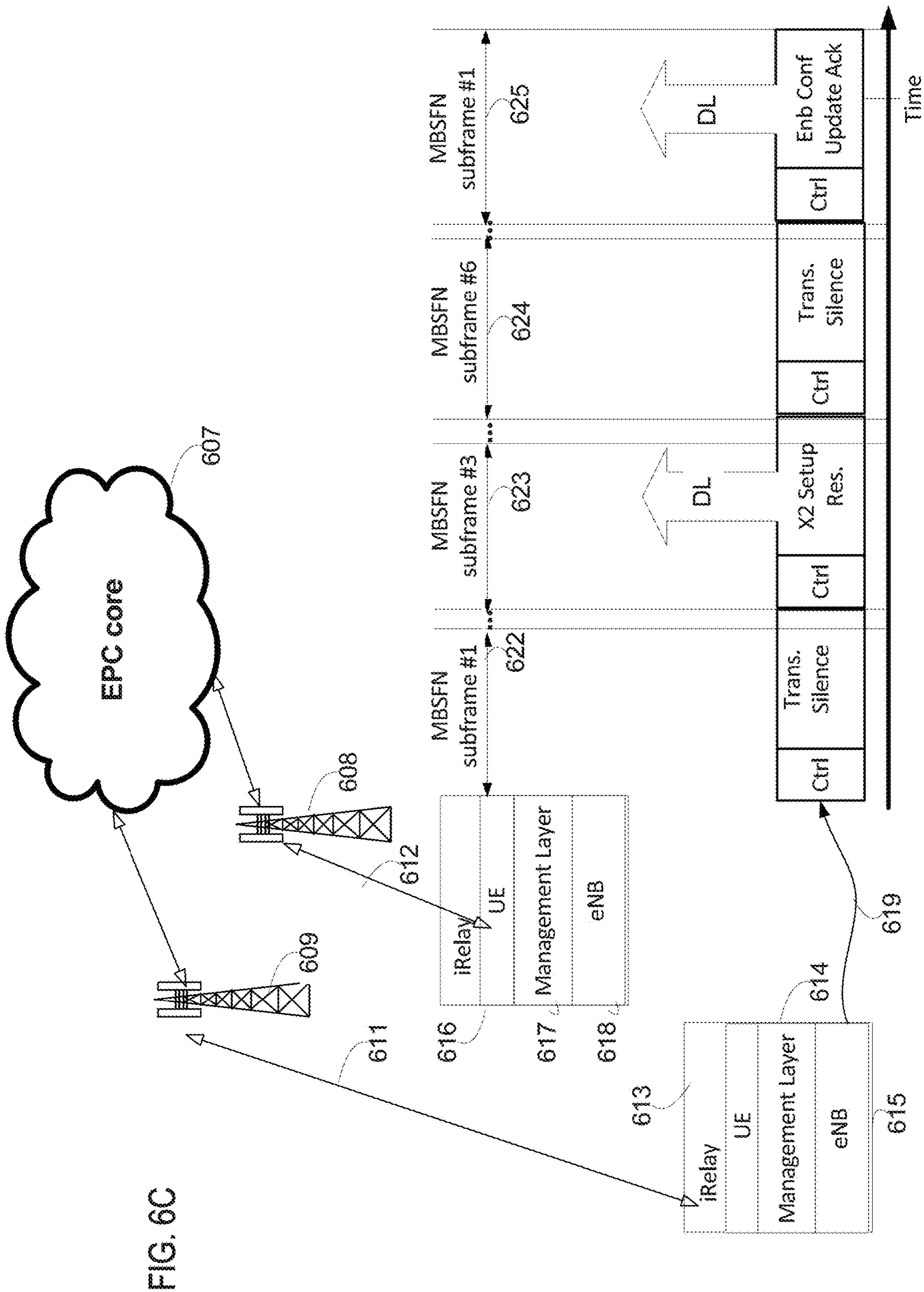

FIGS. 6A-C, taken together, form an example of using MBSFN subframes in order to exchange X2 messages. FIG. 6B illustrates an example use of MBSFN protocol, for the transmission of the top iRelay of FIG. 6A.

FIG. 6C illustrates an example use of MBSFN protocol, for the transmission of the lower iRelay of FIG. 6A.

In the example iRelay [616] and iRelay [613] are exchanging X2 messages in order to Setup X2 connection and exchange ENB configuration update message. In the example shown in FIG. 6B, subframe #1[622] and subframe #6 [624] are preserved for the use of iRelay [616] meaning that all other neighboring eNBs are silence in these subframes and as illustrated in FIG. 6C, subframe #3 is preserved for iRelay [613] use. When the eNB[618] part of iRelay[316] sends X2 setup request over X2 interface, the management layer[617] receives the X2 interfaces stream and sends it over the next mbsfn subframe through the eNB[618] that is preserved for iRelay[616] use, MBSFN subframe #1 [622]. The X2 setup is received by the UE portion of iRelay[613], the UE sends the request to the management layer[614] which transmits it over the X2 interface of the target eNB[615]. According to the standard 3GPP TS 36.423 The eNB[615] replays with X2 Setup. Ack message. Ack is sent over X2 interface through the management layer [614] back to the eNB over the preserved MBSFN subframe #3[623]. The request is received by the UE portion of iRelay [616], the UE sends the request to the management layer [617] which transmit it over the X2 interface to the target eNB[618]. In case the eNB[618] will want to send ENB configuration update the procedure will be similar it will send it over the X2 interface, the management layer[617] receives the X2 interfaces stream and sends it over the next mbsfn subframe through the eNB[618] that is preserved for iRelay[616] use, MBSFN subframe #6[624], for example. The X2 setup is received by the UE portion of iRelay[613], the UE sends the request to the management layer[614] which transmits it over the X2 interface of the target eNB[615]. According to the standard 3GPP TS 36.423 The eNB[615] replays with ENB configuration Ack message. Ack is sent over X2 interface through the management layer [614] back to the eNB over the preserved MBSFN subframe #3[625]. The request is received by the UE portion of iRelay [616], the UE sends the request to the management layer [617] which transmit it over the X2 interface to the target eNB[618].

Figure 7:
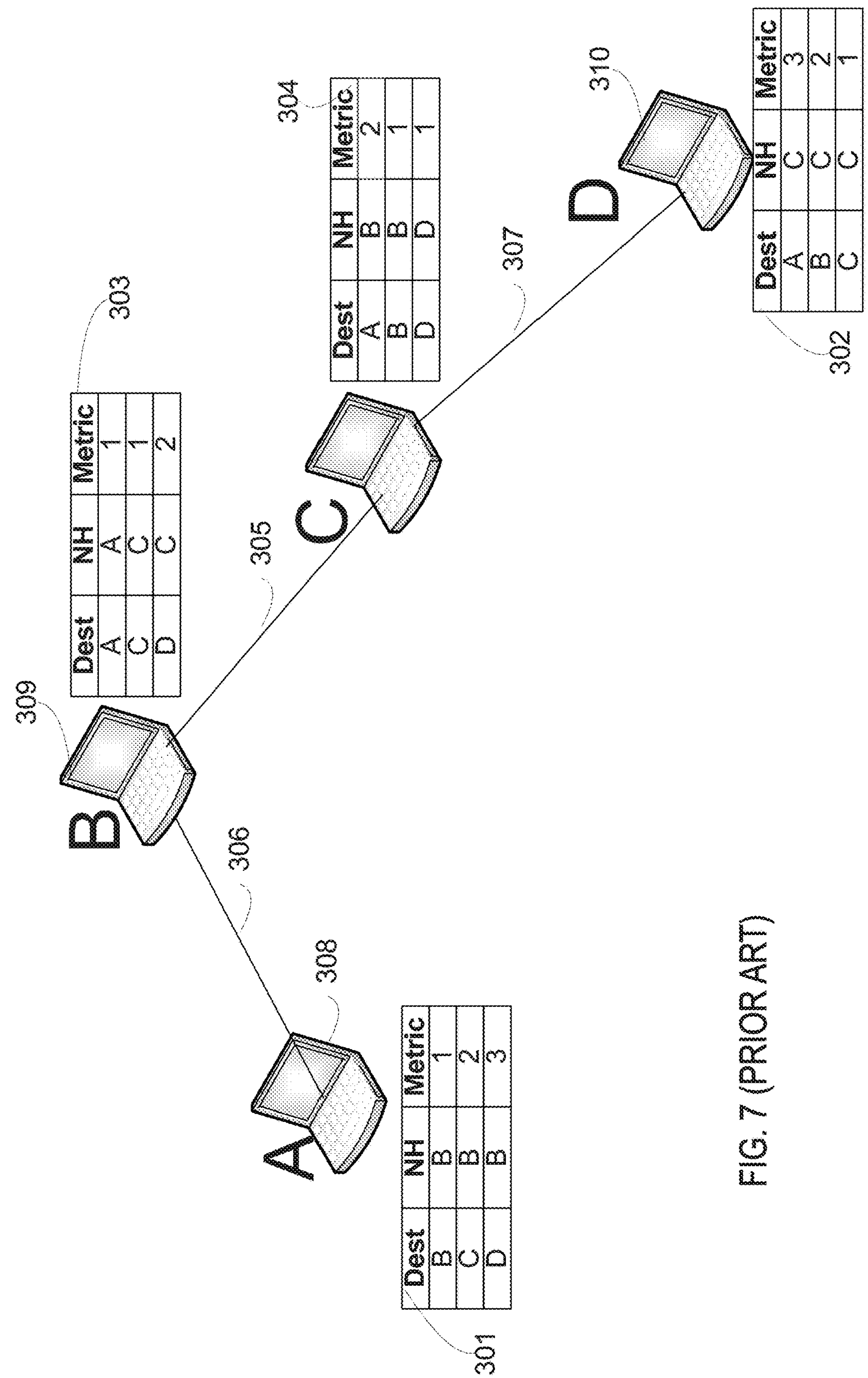
Figure 8A:
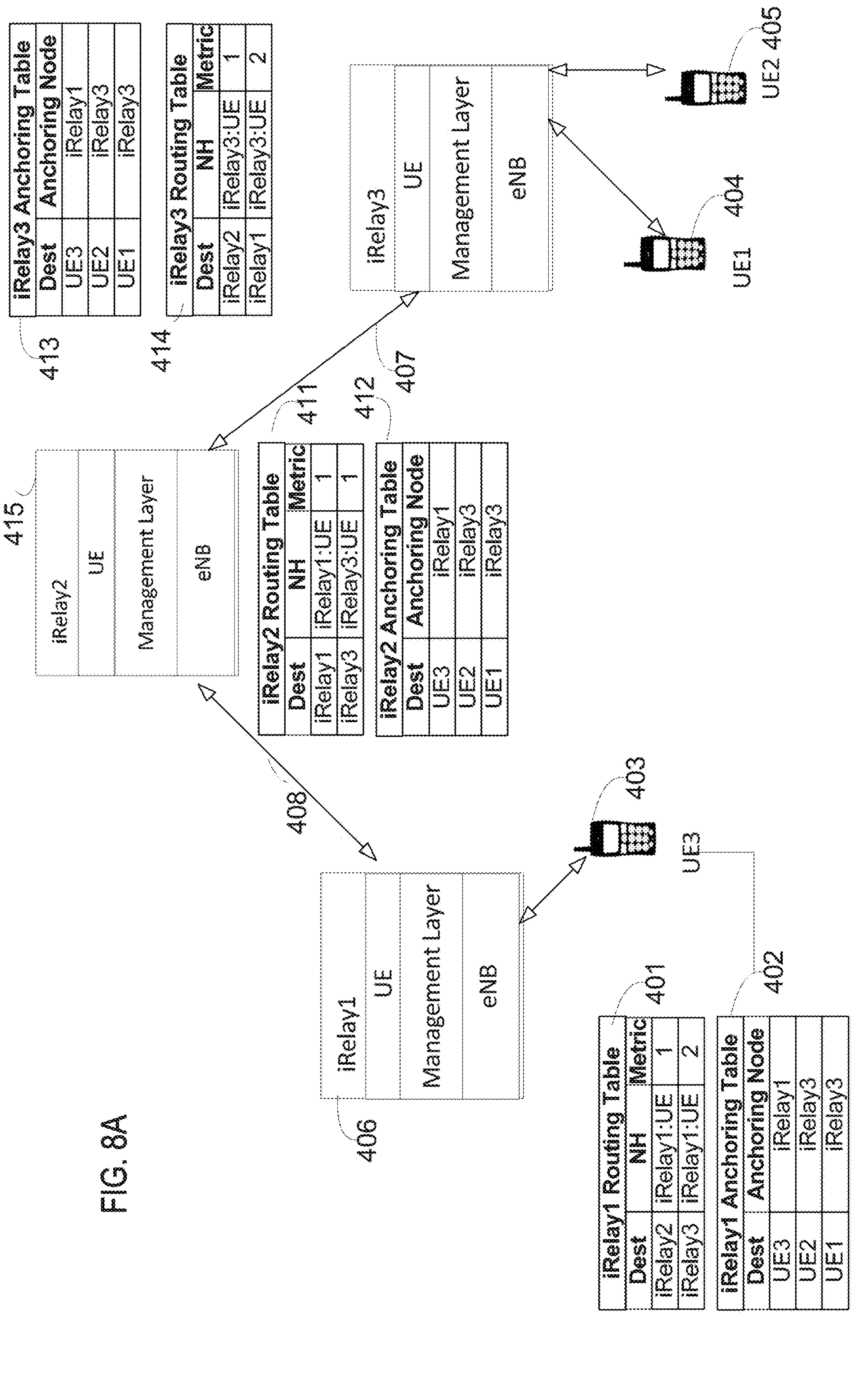

FIG. 7 is a prior art example of MESH routing protocol over Ethernet by using MESH routing table. FIG. 8A is an example of using MESH routing protocol in mobile relay network by using both routing table and cellular anchoring table.

Specifically, FIG. 7 shows conventional use of routing tables. For example, a network of computers includes a chain of physically linked units, A linked to B which is linked to C which is linked to D. Each computer (say, A) may have a routing table as shown, showing the next hop (NH), to enable communication between that computer and a destination computer (say B, C or D) and typically also the metric (e.g. distance in terms of number of hops), e.g. such that if a graph is available, it is possible to select from among a plurality of possible routes, e.g. selecting the route with the lowest metric.

FIG. 8A shows use of routing tables and anchoring tables in communication between iRelays, according to certain embodiments. As shown, the routing tables store data indicating how to go from one iRelay to another. For example, in the illustrated example, to pass from iRelay1 to iRelay 2 or 3, pass through the UE of Relay1. This would be the case even if the actual destination is another component of Relay1 such as the base station functionality thereof. Then, to pass from the UE to the base station functionality, utilize a GRE tunnel whose dynamic generation is described herein in detail herein with reference to FIGS. 25-27 inter alia. The GRE tunnel in effect serves as a "next hop". The GRE tunnel typically maps the addresses of internal entities in the iRelay as described herein, assigning a "tunnel address" to each entity, although one IP address in fact serves all such entities.

The anchoring tables in the embodiment of FIG. 8A indicate which mobile core (e.g. 406, 407, 415) is serving each mobile communication device (UE). For example the mobile core which is serving UE3 (403) is iRelay1. When UE3 (say) wishes to communicate with, say, UE1, UE3 approaches the mobile core serving it and that mobile core routes it accordingly.

Figure 25:
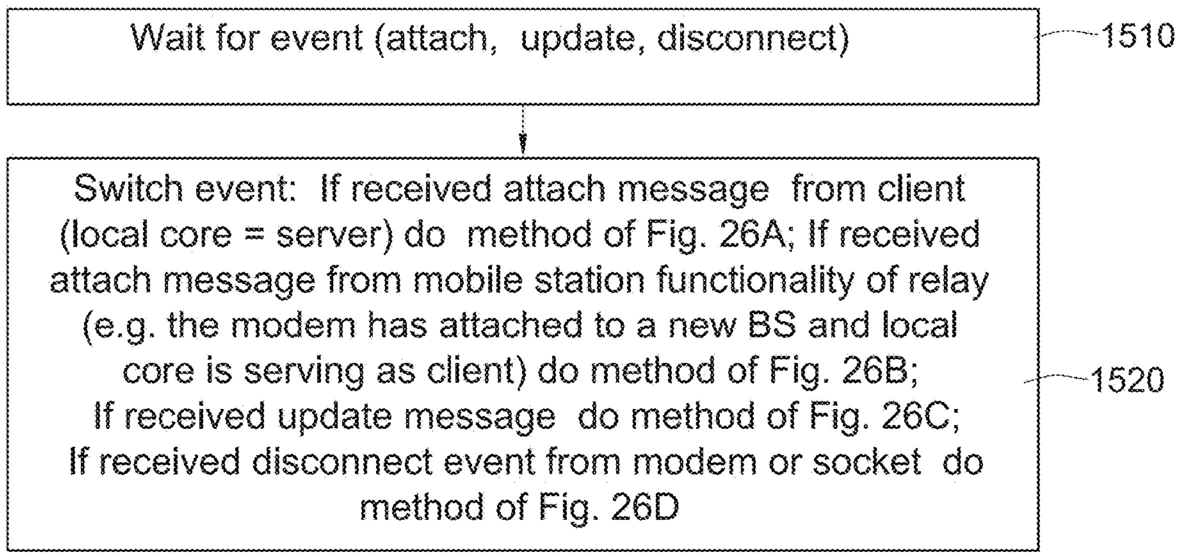
Figure 26A:
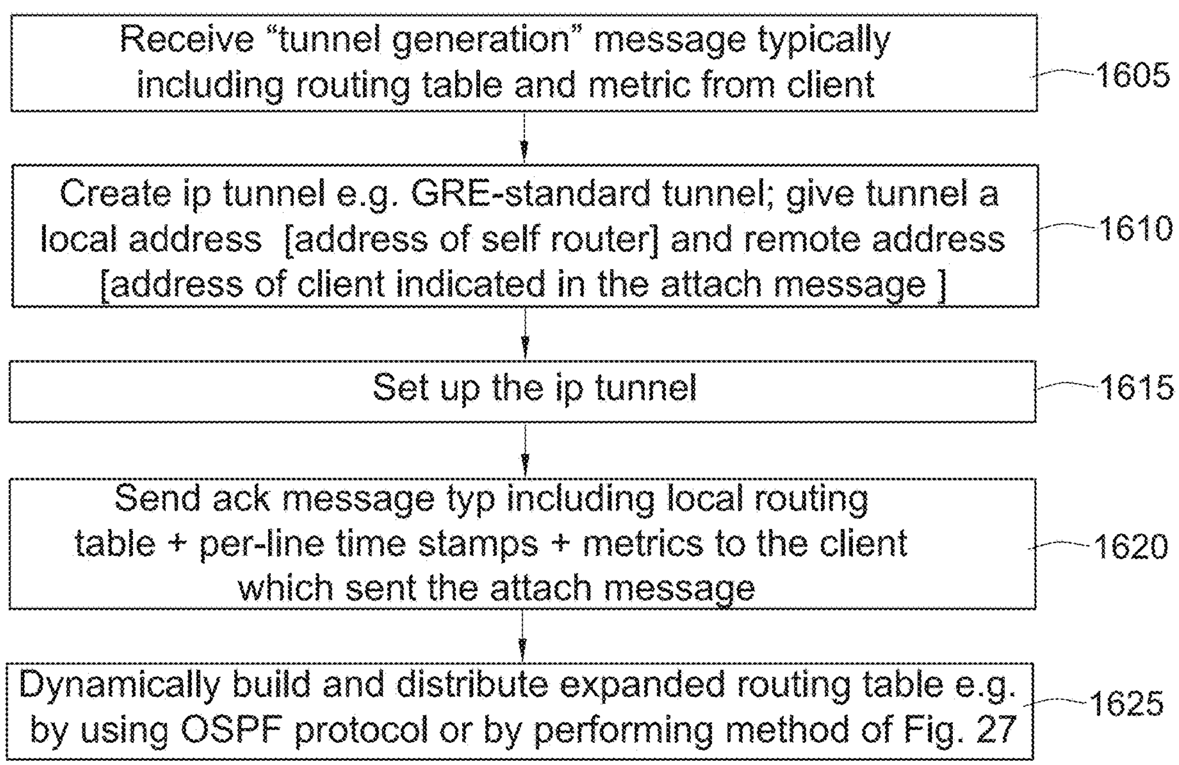
Figure 26B:
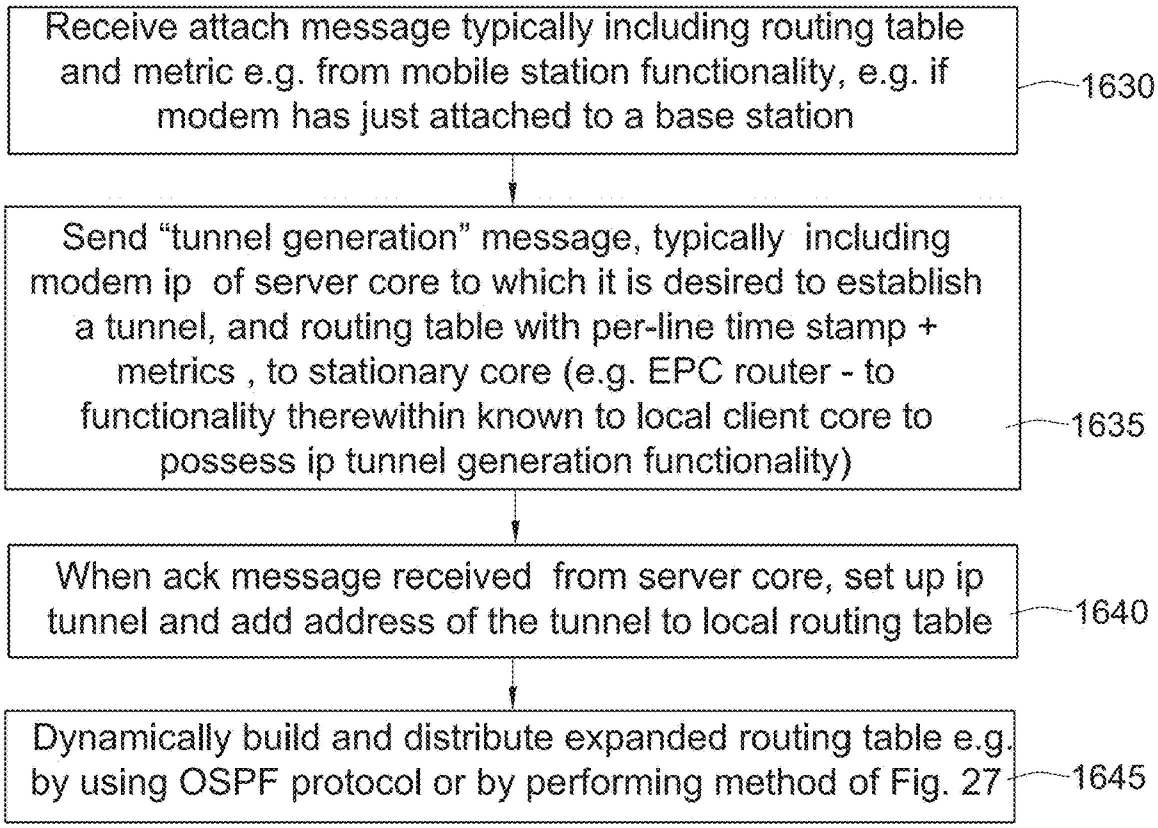
Figure 26C:
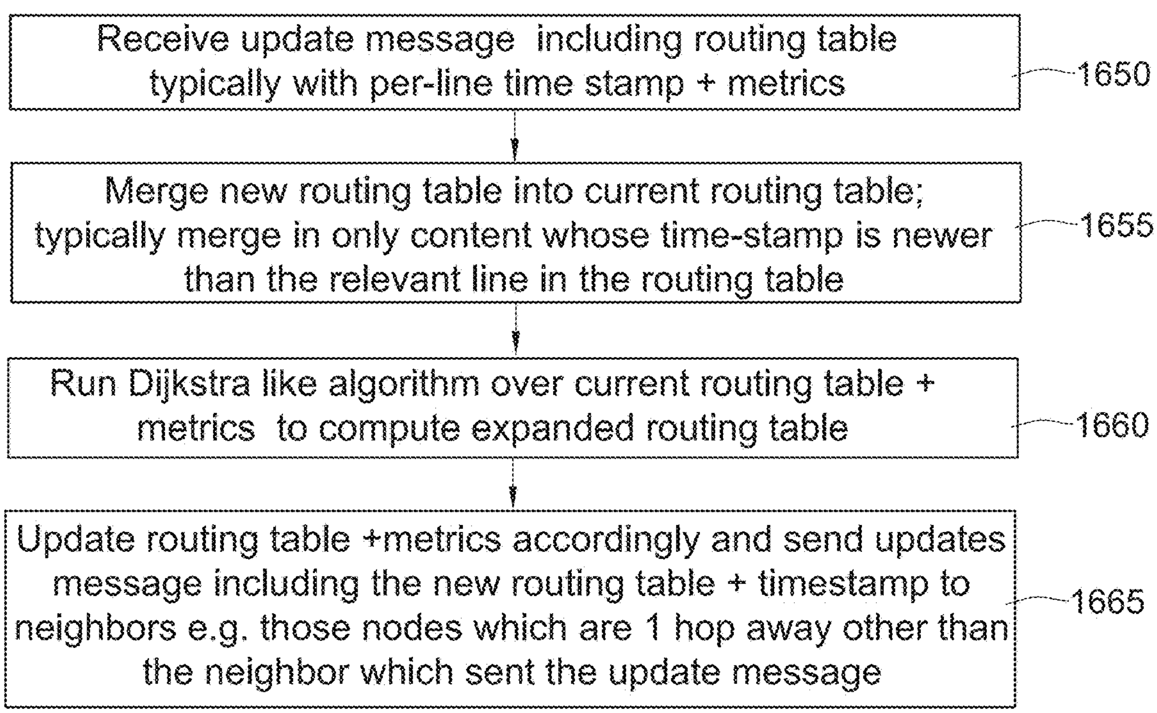
Figure 26D:
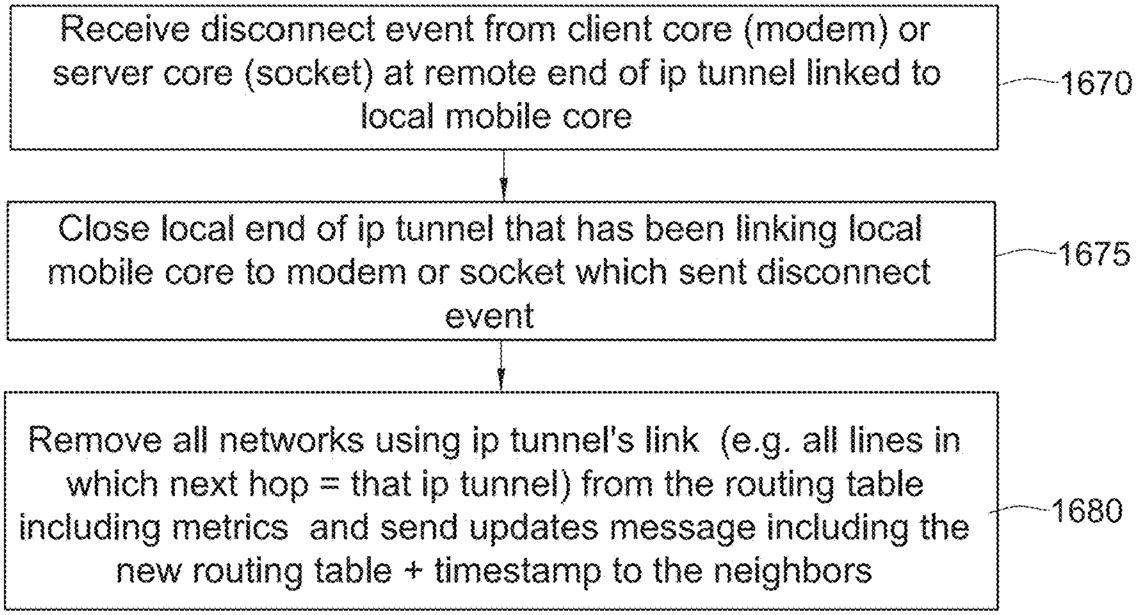
Figure 27:
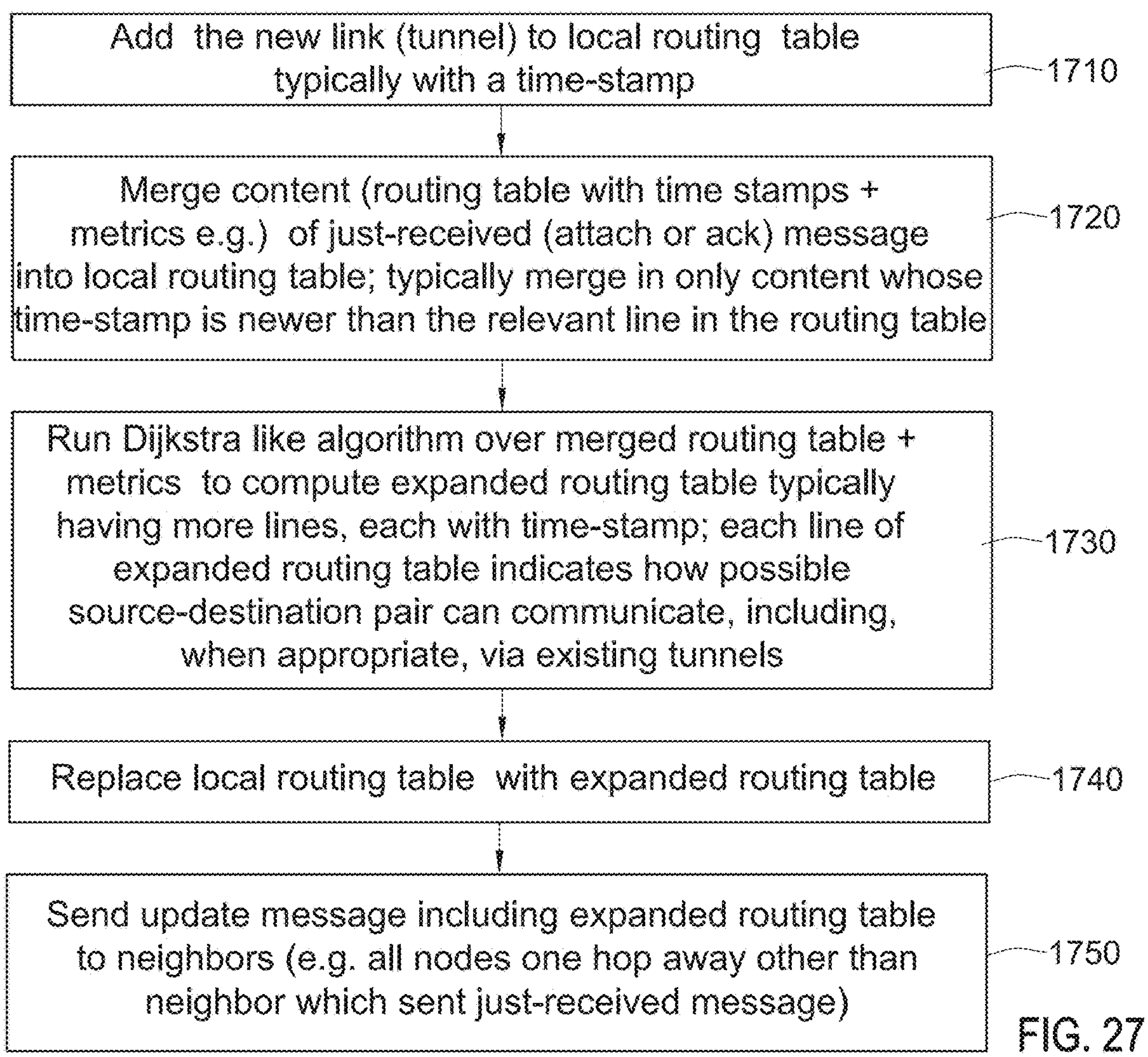

A particular advantage of certain embodiments is that 2 campuses can communicate with one another via a $3^{rd}$ campus e.g. as described herein with reference to FIGS. 25-27.

An example sequence useful for these embodiments is now described with reference to FIG. 8A. Some or all of the following operations may be performed, in any suitable order e.g. as follows:

1. UE2 is sending packet P1 to UE3,
2. The packet P1 is sent to the eNB having source ip address of UE2 and destination ip address of UE3
3. The packet P1 is being forwarded to the routing subsystem of iRelay3
4. The iRelay3 routing subsystem looks at the P1 destination address. The destination address is in the subnet of iRelay1 so the routing subsystem sends the packet P1 to iRelay2, iRelay3 tunnel interface.
5. The tunneling subsystem receives the packet P1 that is sent over the tunneling interface and adds another ip header with source address iRelay3:UE and destination address iRelay2:Tunneling subsystem and send it back to the routing subsystem as packet P2 which has packet p1 as a payload
6. The routing subsystem receives the packet P2, looks at the destination address, The destination address is in the subnet of iRelay2 so the routing subsystem sends the packet P2 to UE tunnel interface.
7. P2 is being forward by iRelay3:UE to the iRelay2: Tunneling subsystem, over the air through iRelay2: eNB
8. iRelay2 tunneling subsystem decapsulates P2 ip header and sends P1 to iRelay2 routing subsystem
9. The iRelay2 routing subsystem looks at the P1 destination address. The destination address is in the subnet of iRelay1 so the routing subsystem sends the packet P1 to iRelay3, iRelay1 tunnel interface.
10. The iRelay2 tunneling subsystem receives the packet P1 that is sent over the tunneling interface and adds another ip header with source address iRelay2:Tunneling subsystem and destination iRelay1:UE and send it back to the routing subsystem as packet P3 which has packet p1 as a payload
11. The routing subsystem receives the packet P3, looks at the destination address, The destination address is in the subnet of iRelay2:UEs so the routing subsystem sends the packet P3 to eNB interface.
12. P3 is being forward by iRelay2:eNB to the iRelay1: Tunneling subsystem, over the air through iRelay1:UE
13. iRelay1 tunneling subsystem decapsulates P3 ip header and sends P1 to iRelay1 routing subsystem
14. The routing subsystem receives the packet P1, looks at the destination address, The destination address is in the subnet of iRelay1:UEs so the routing subsystem sends the packet P3 to eNB interface which then forwards the packet over the air to UE1.

Figure 8B:
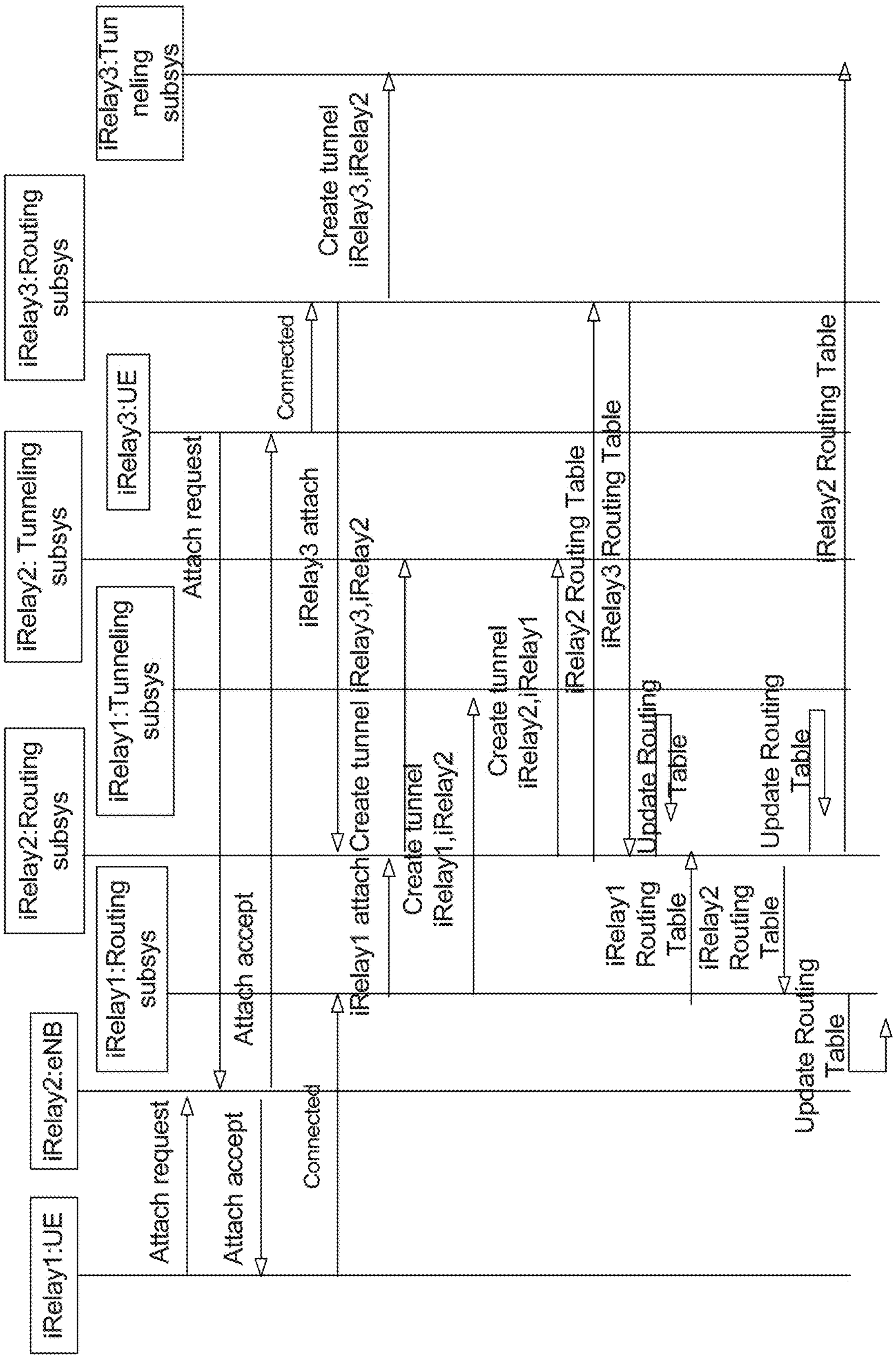
Figure 8C:
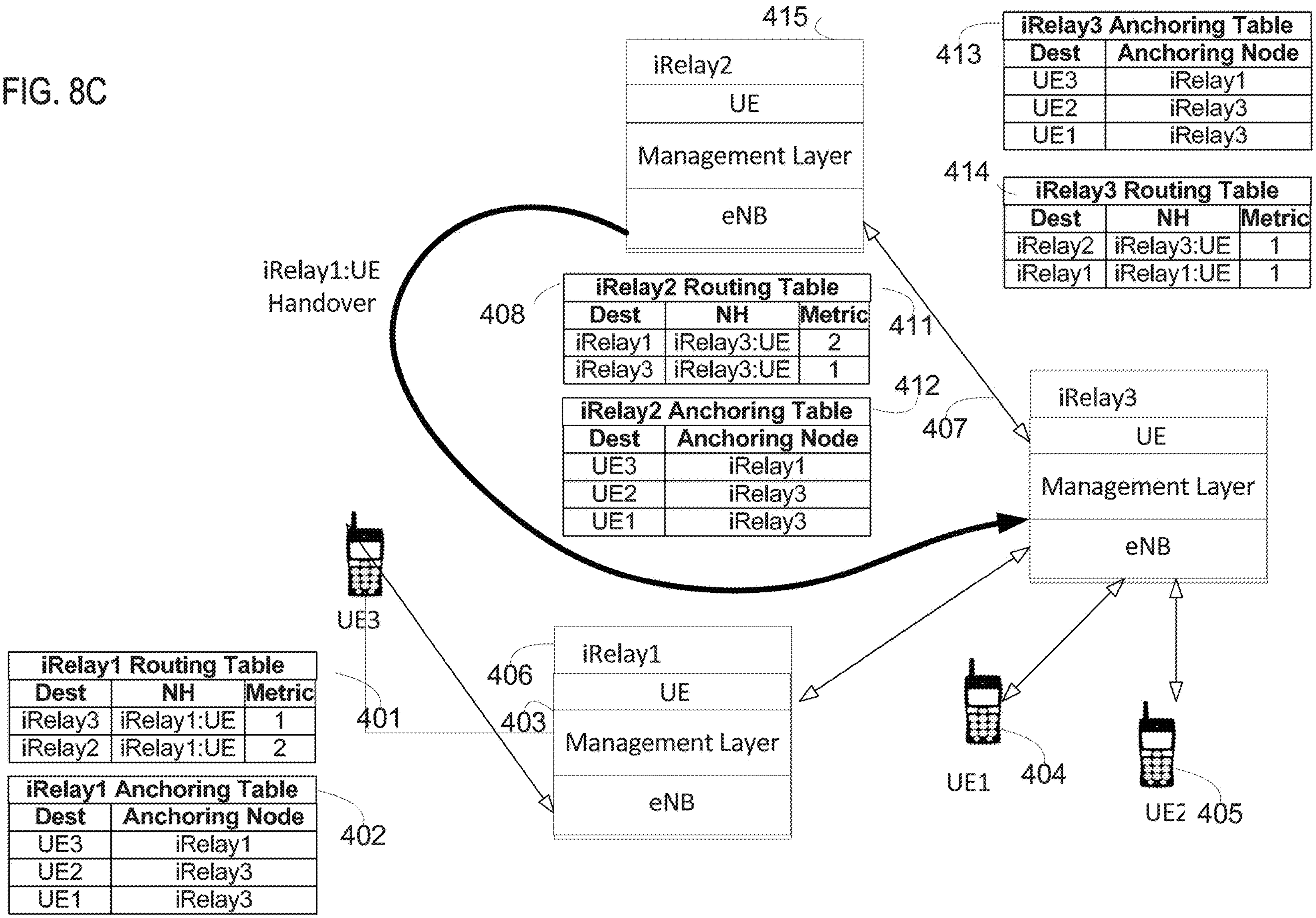

Referring now to FIG. 8C, communication tunnels are created between different relay cores, To achieve this, some or all of the following operations may be performed, in any suitable order e.g. as follows.

0. UE portion of iRelay1 attaches to eNB part of iRelay 2
1. UE portion of iRelay3 attaches to eNB part of iRelay 2
2. After normal authentication of UE portion of iRelay1, eNB part of iRelay 2 accepts attachment of UE portion of iRelay 1.
3. After normal authentication of UE portion of iRelay3, eNB part of iRelay 2 accepts attachment of UE portion of iRelay1.
4. The UE portion of iRelay1, through the hosting operating system signals the routing subsystem of iRelay1 that it is connected
5. The UE portion of iRelay3, through the hosting operating system signals the routing subsystem of iRelay3 that it is connected
6. The routing subsystem of iRelay3 then signals the routing subsystem of its connection with serving base station iRelay2 Routing Subsystem, and commands that it should open its side of the ip tunnel
7. The routing subsystem of iRelay2 signals iRelay2 Tunneling subsystem to open a Relay 2, Relay 3 ip tunnel
8. On the other side of the tunnel, iRelay3 routing subsystem signals its Tunneling subsystem to open iRelay3, iRelay2 ip tunnel
9. When both sides of the tunnel are open, the routing subsystems exchange routing table and updating local table. Now all neighboring, nested networks and UEs from both sides of the tunnel are able to communicate with each other, although iRelay1 is still not included
10. The routing subsystem of iRelay1 then signals the routing subsystem of its connection with serving base station, iRelay2 Routing Subsystem, and commands that it should open its side of the ip tunnel
11. The routing subsystem of iRelay2 signals the Tunneling subsystem to open a Relay 2, Relay 1 ip tunnel
12. On the other side of the tunnel, iRelay1 routing subsystem signals its Tunneling subsystem to open iRelay1, iRelay2 ip tunnel
13. When both sides of the tunnel are open, the routing subsystems are operative for exchanging routing table and updating local table. Now all neighboring, nested networks and UEs from both sides of the tunnel are able to communicate with each other, including iRelay3 sub network
14. iRelay2 informs by sending the new routing table that iRelay1 sub network is available In FIG. 8D, a communicator is in motion as opposed to FIG. 8A in which communicators are stationary. In this embodiment, some or all of the following operations may be performed, in any suitable order e.g. as follows:

0. UE portion of iRelay1 signals (measurement report) that it hears eNB of iRelay3 with better RF conditions than iRelay2, this may be due to mobility of the iRelay systems, when iRelay1 moves closer to iRelay3 and getting far from iRelay2.
1. Subsequently, eNB of iRelay2 sends handover request message that is being forwarded through tunnel between iRelay2 and iRelay3
2. The message is being replied by handover ack from the eNB part of iRelay3
3. Then there is a series of creation and deleting of tunnels and updating of routing table as depicts in the previous paragraph which eventually ends up with a tunnel between iRelay1 and iRelay3, deleted tunnel between iRelay2 and iRelay1 and routing table being updated as depicted in FIG. 8C [408, 401, 414] a new routing table [ ].

Now when UE1 is sending data to UE3 the packet P1' is being encapsulated to P2' using the Relay3 to Relay1 tunnel and then send over the air through eNB part of iRelay3 to the UE of iRelay1.

Figure 8D:
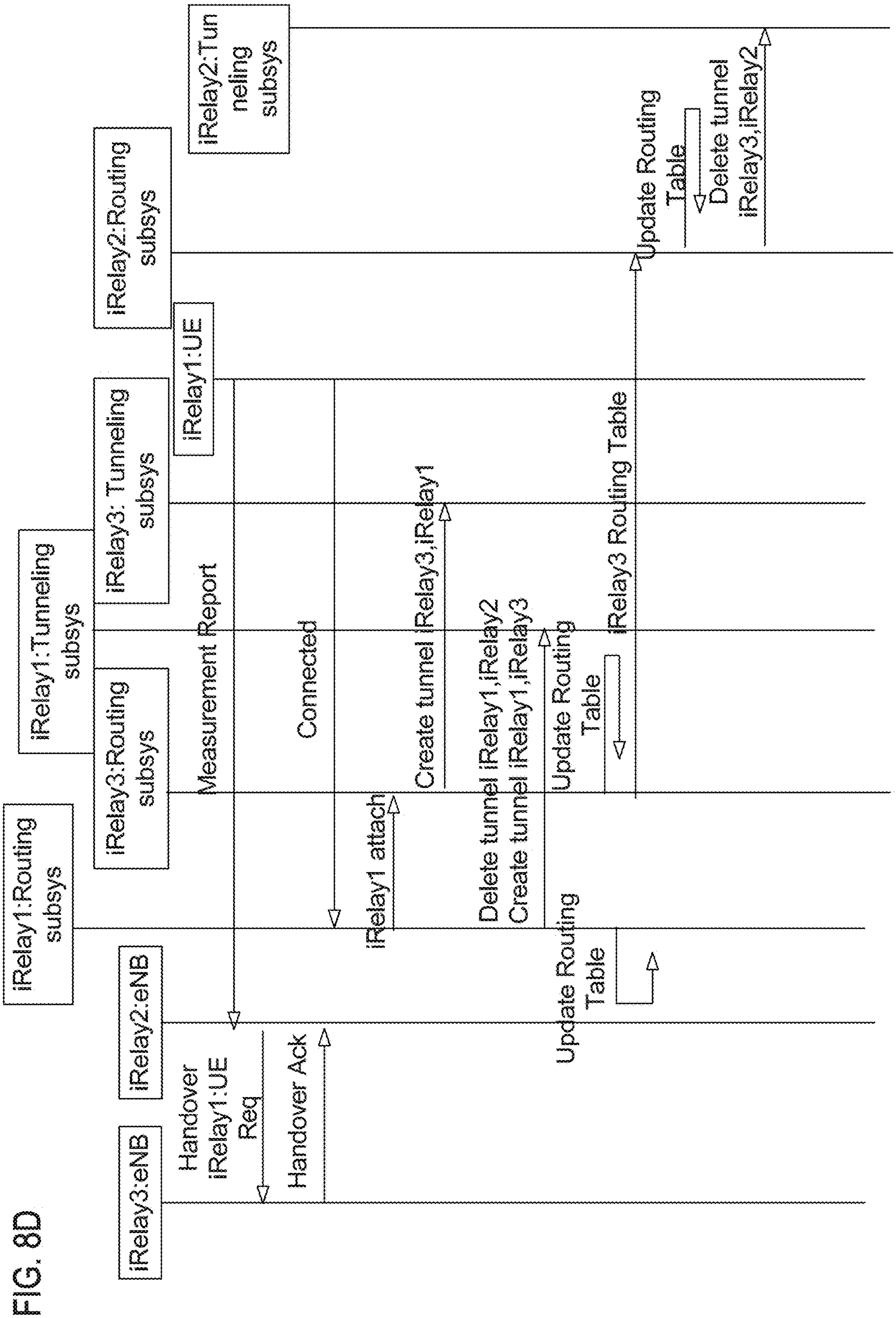
Figure 19A:
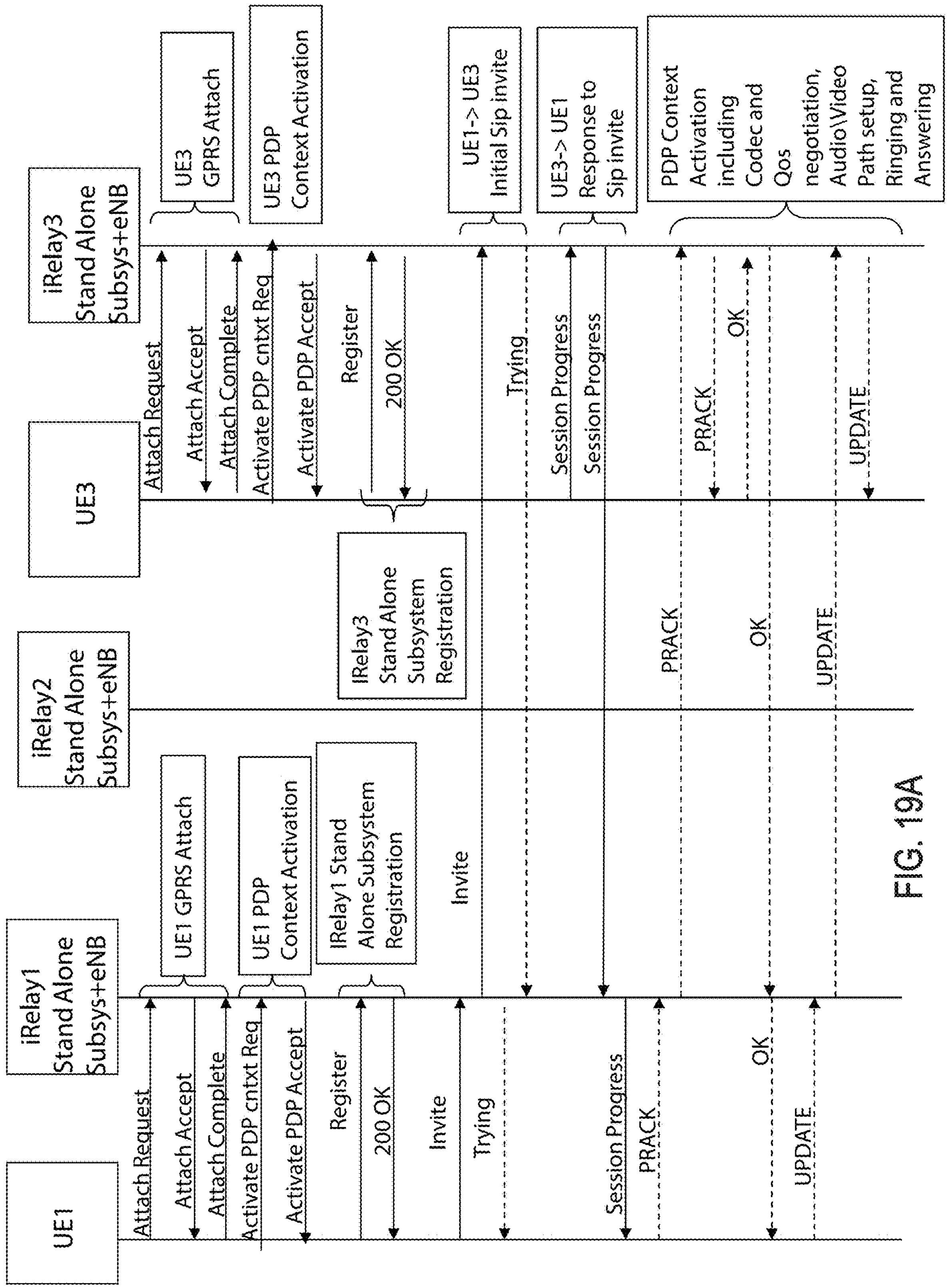
Figure 19B:
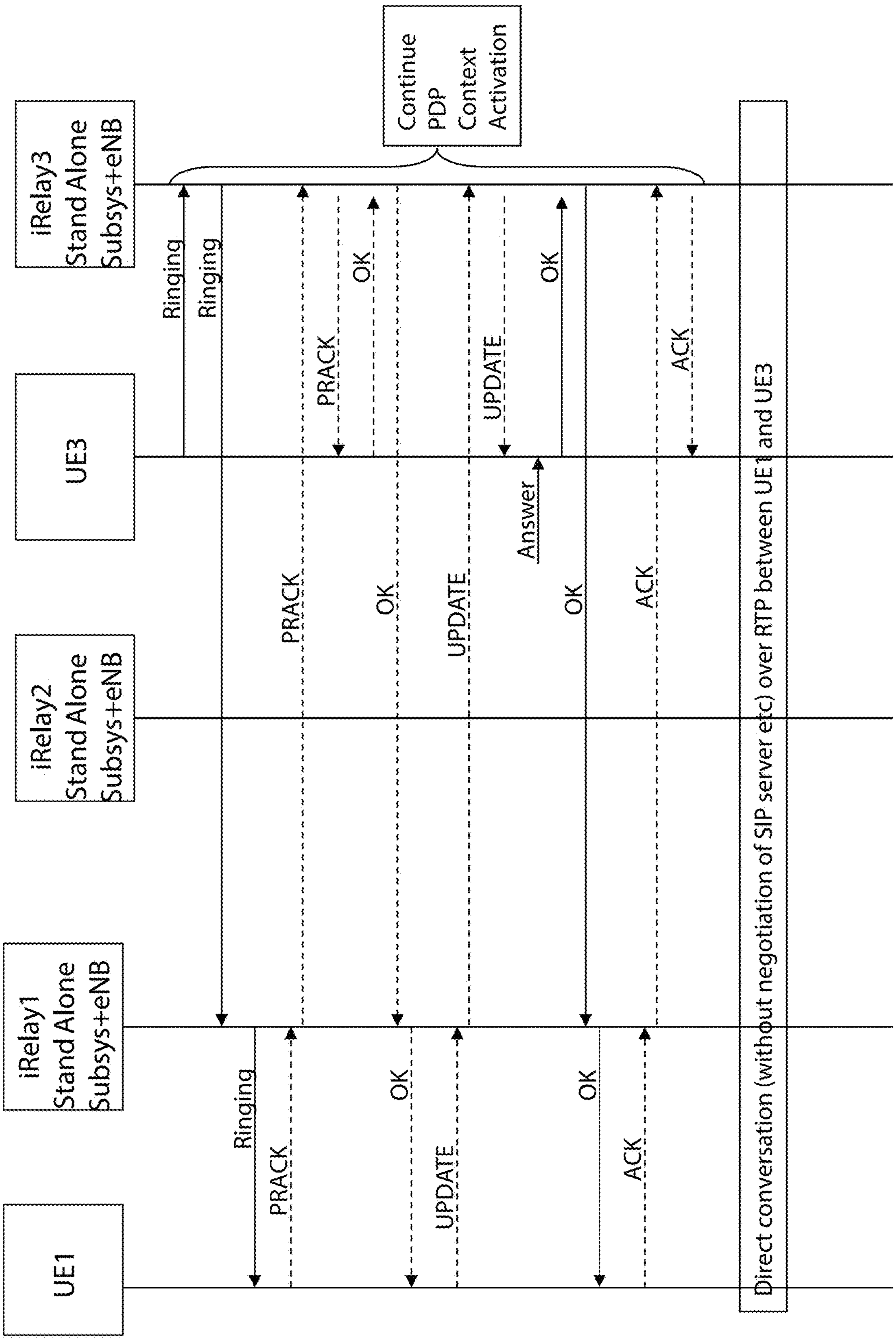

According to certain embodiments, the system of the present invention is operative to link a mobile relay e.g. as shown in the published pct application by B. Gilo et al referenced herein, typically via a tunnel, between base stations and cores e.g. as shown in FIG. 8A and FIGS. 19F and 19G, the tunnel may help a node with mobile station-functionality to function as a relay ie to serve base stations under it, e.g. as shown in FIGS. 8B and 8D.

Figure 9:
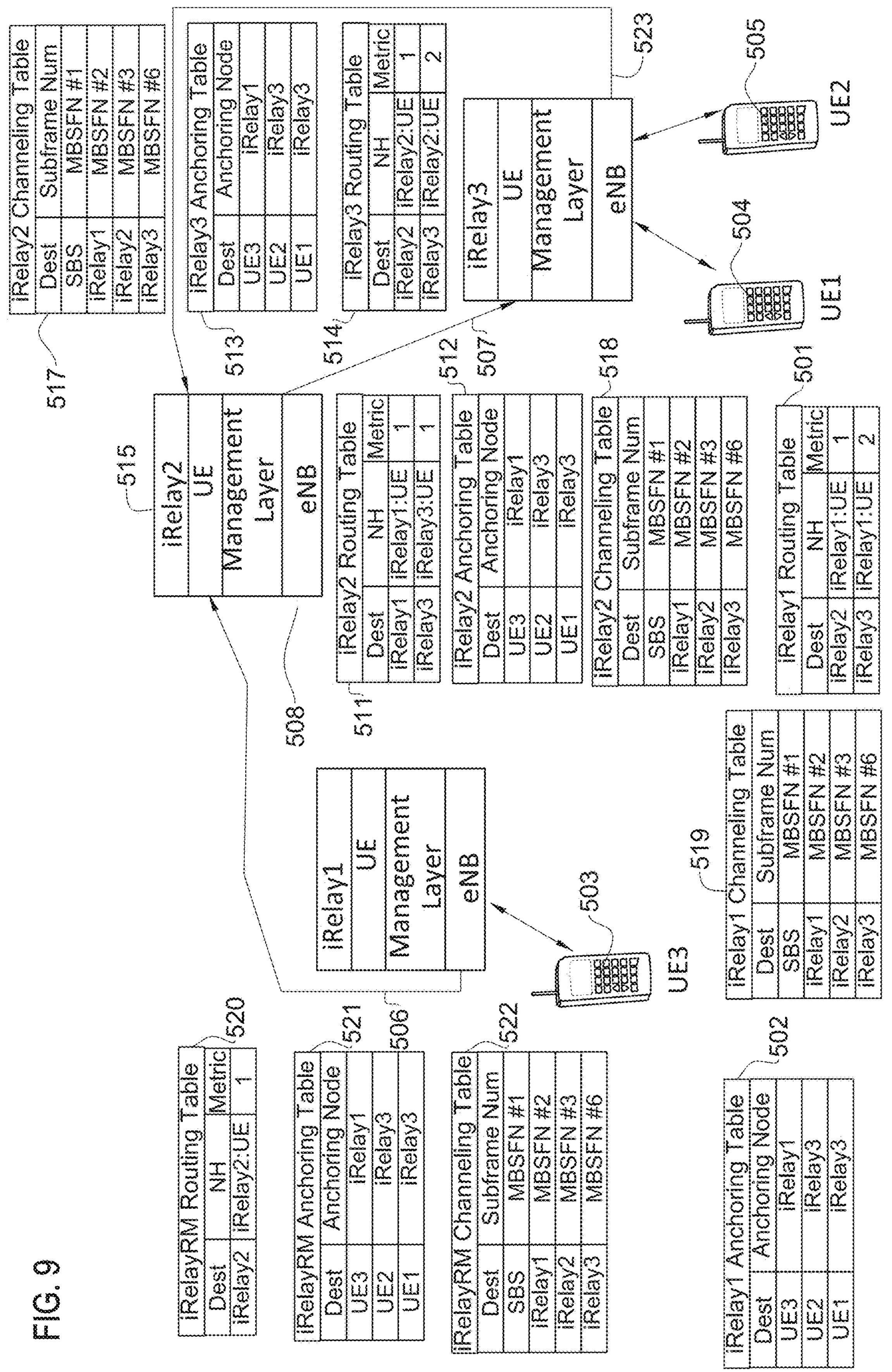

FIG. 9 is an example of using MESH routing protocol in mobile relay network using MBSFN subframes in order to enable downstream and upstream data by using Routing table, anchoring table and channeling table.

In general, the routing table stores the next hop to be used for each desired destination, and typically also a route length metric (typically, route length in hops). Channeling tables include subframe numbers useful for MBSFN based embodiments as described herein. Anchoring tables store the identities of users known to a particular relay or mobile core, and for each, the relay or mobile core thought or known to be serving that user via which the user may be communicated with.

Each mobile core stores the identities of all users thought or known to be registered with (e.g. served by) itself, and may also store identities of users thought or known to be registered with (e.g. served by) other mobile cores. Each mobile core may even store the identities of all users of the entire network, according to certain embodiments, in which case tables in certain relays may be replicated from the corresponding tables in other relays. If a particular mobile core is unsuccessful in reaching an individual user via the relay or mobile core thought or known to be serving that user, the mobile core may use "flooding" (of the entire network or of a portion thereof, e.g. of the vicinity of the mobile core thought to be serving that user) to identify the mobile core currently serving that user, and update its own tables and those of its neighboring cores, relays and/or base stations accordingly.

The data within a first mobile core's anchoring table may be obtained when a user registers and/or may be replicated from another, second, mobile core's anchoring table, e.g. if the anchoring table is sent as an update from the second mobile core to the first.

According to certain embodiments, more than one mobile core that might be serving an individual user, may be stored in an anchoring table. The plurality of mobile cores may be stored in order e.g. a first mobile core which is most likely to be serving the user, a second mobile core which is less likely to be serving the user, a third mobile core which is even less likely to be serving the user, and so on.

Some users may be designated as "guests" i.e. as belonging to a mobile core A, and only temporarily receiving service from a mobile core B due to a temporary absence for the region of coverage of mobile core A, until they return from their current location which is within the region of coverage of mobile core B, to mobile core A.

If particulars of all network users are stored in each mobile core, this is convenient at the price of lesser security. To resolve security issues, rather than storing (say) a user's name, personal password and services to which he is entitled, the personal password may be replaced by a computational function (product e.g.) of the user's personal password and a core password e.g. public key.

A method by which to Build iRelay network (using MBSFN) is shown in FIG. 10.

Two example ways to use the MBSFN in order to build cell mesh network over it are now described. According to the first, Integrated, method, backhauling data is sent over the MBSFN channel by other eNBs where it is decoded by a standard LTE modem, rUE [1041], which is used only as a data receiver. rUE forwards DL backhauling data to the core, the rUE is used only as a listener of DL data, the UL is sent over MBSFN channels through the collocated rBS [1040]. In order to share the MBSFN time frame between different base station in order to use it as a backhauling channel, a media access control protocol should be developed, it is possible to use Distributed coordination function (DCF) like algorithm such as for example some or all of the following steps of FIG. 22, suitably ordered e.g. as shown:

3010: Wait until send data queue is not empty

3020: listen for number of random( )% TOTAL_NUMBER_OF_SUBFRAMES

3030: if channel found busy, go to step 3010

3040: if not send all waiting data in the queue up to MAXIMAL_ALLOWED_NUMBER_OF_SUBFRAMES_IN_A_TRANS MISSION

3050: wait for ack from all the destinations in this transactions

3060: if ack received clear sent data from sending queue

3070: go to step 3010

The rUE listens to all incoming data, when the management layer decodes an MBSFN packet that is addressed to it, it adds ack message to the send data queue.

According to the second, non-Integrated, method, the MBSFN subframes are used only to indicate for standard UEs where there is no standard reference symbols and therefor to avoid its content, in this empty sub frames it is possible to put any other proprietary or standard waveform\protocol that support mesh, for example, traditionally wireless backhaul tdm protocols, 802.11s, 802.15 as shifted to the relevant LTE frequency and being framed to the available code rate and subframe rate. For example in tdm, all the subframes are equally divided between the number of iRelay nodes in the system and each node is sending data on its subframe and is listening to all the subframes, in case there is a redundant subframe then it will be allocated equally between the nodes in each frames For example with 2 iRelay nodes, MBSFN channels, subframe #1, subframe #3 and subframe #8, are being equally divided between them, subframe #1 for node #1, subframe #3 for node #2 and subframe #8 in the odd frames to node #1 and even frames to node #2.

Once the rUE is attached, dynamic generation of GRE tunnels as described herein may be employed.

Referring again to FIG. 10, according to certain embodiments, the system of the present invention may include some or all of the following:

a. Routing subsystem 1028
   i. Builds and distributes the routing tables described herein
b. Radioresource subsystem 1014
   i. Timing synchronization between different base stations
   ii. Changing modulation scheme to fit the channel condition between different peers
   iii. Coordinates changing and allocating subframes' channels
   iv. Tunneling subsystem 1013 creates and closes the tunnels described herein.
c. iRelay routing manager is responsible (e.g. as shown in FIG. 3C) for:
   1. coordination between different iRelay in case of a centralistic approach,
   2. rRM like functionality in the stationary core, managing and coordination between the proxy UE and different stationary base stations that send backhauling data over mbsfn channels The RRM in FIG. 10 may serve as a management layer.

Figure 11:
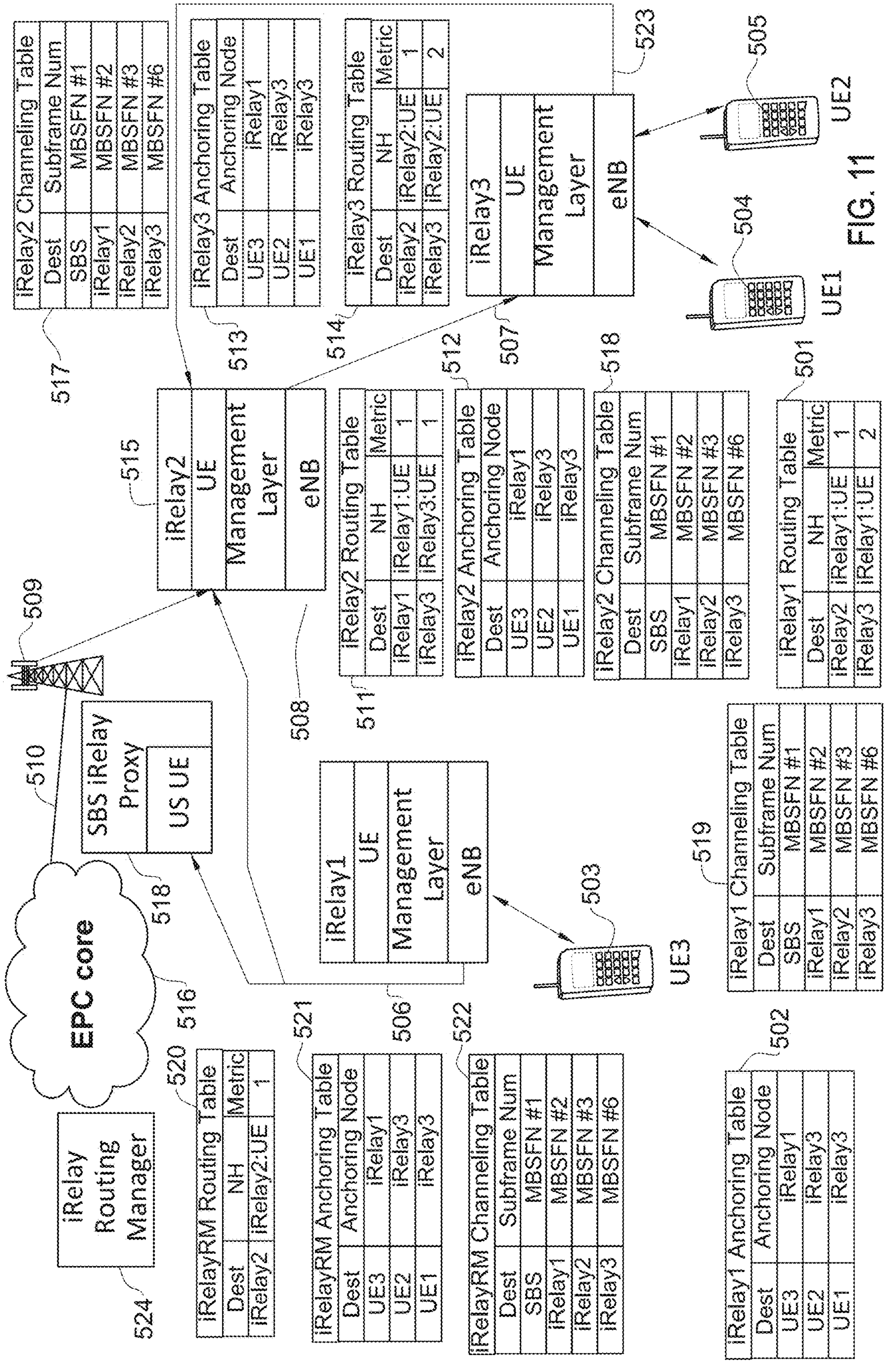
Figure 17:
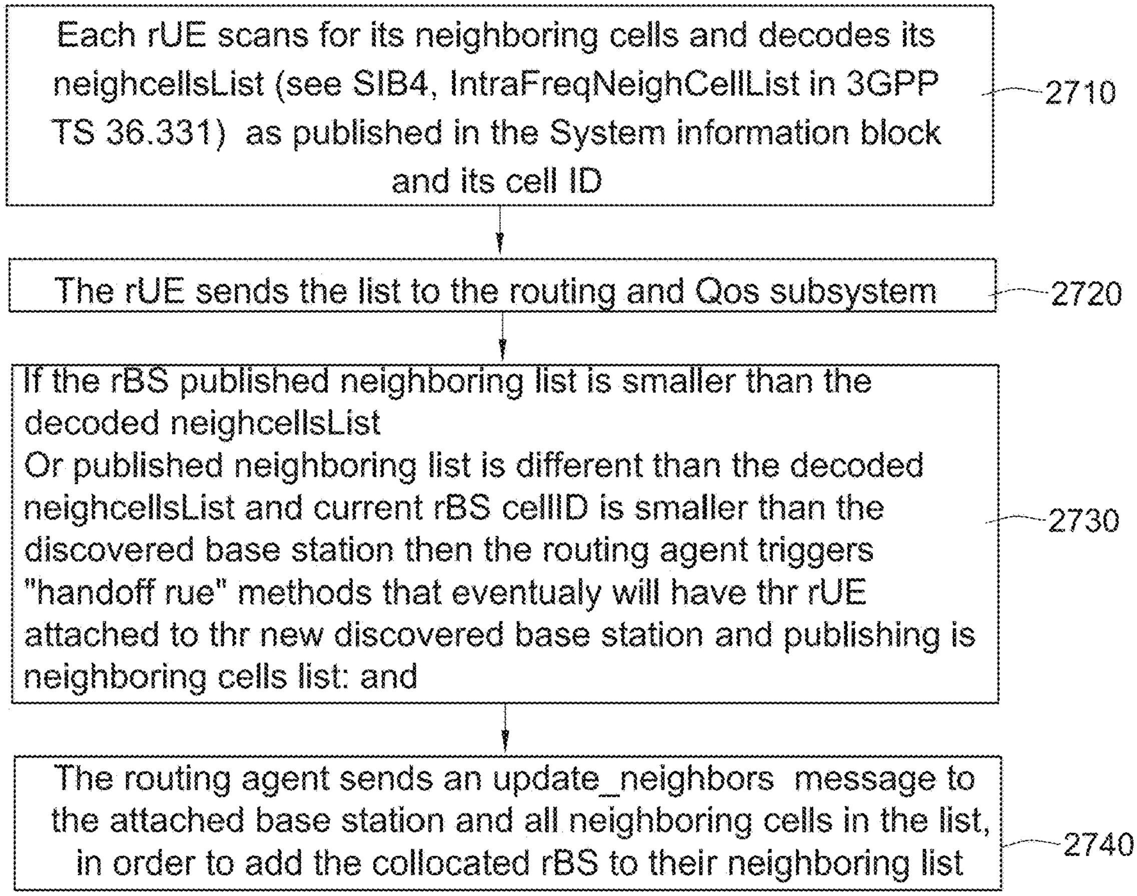

Referring now to FIG. 11, an iRelay internal view is depicted. A method for Building an iRelay network (not using MBSFN) is now described, with reference to FIG. 17. The method typically includes some or all of the following steps, suitably ordered e.g. as shown:

2710: Each rUE scans for its neighboring cells and decodes its neighcellsList (see SIB4, IntraFreqNeighCellList in 3GPP TS 36.331) as published in the System information block and its cell ID.

2720: The rUE sends the list to the routing and Qos subsystem

2730. If the rBS published neighboring list is smaller than the decoded neighcellsList, Or if the minimum of (current cellID, published neighboring list cell) Id's is larger than minimum (discovered base station ID, discovered base station neighboring list), then the routing agent triggers "handoff rue" methods that eventually will have the rUE attached to the new discovered base station and publishing its neighboring cells list; and

2740. The routing agent sends an update_neighbors message to the attached base station and all neighboring cells in the list, in order to add the collocated rBS to their neighboring list Handoff rUE may proceed as follows:

(a). Optionally, if there is an attached UE which its designated sessions \bearers are in a different Core (neighboring cell) handover it by sending a handover command through the rBS to one of the neighboring cells that he is able to hear (by triggering measurement object command).

Figure 12:
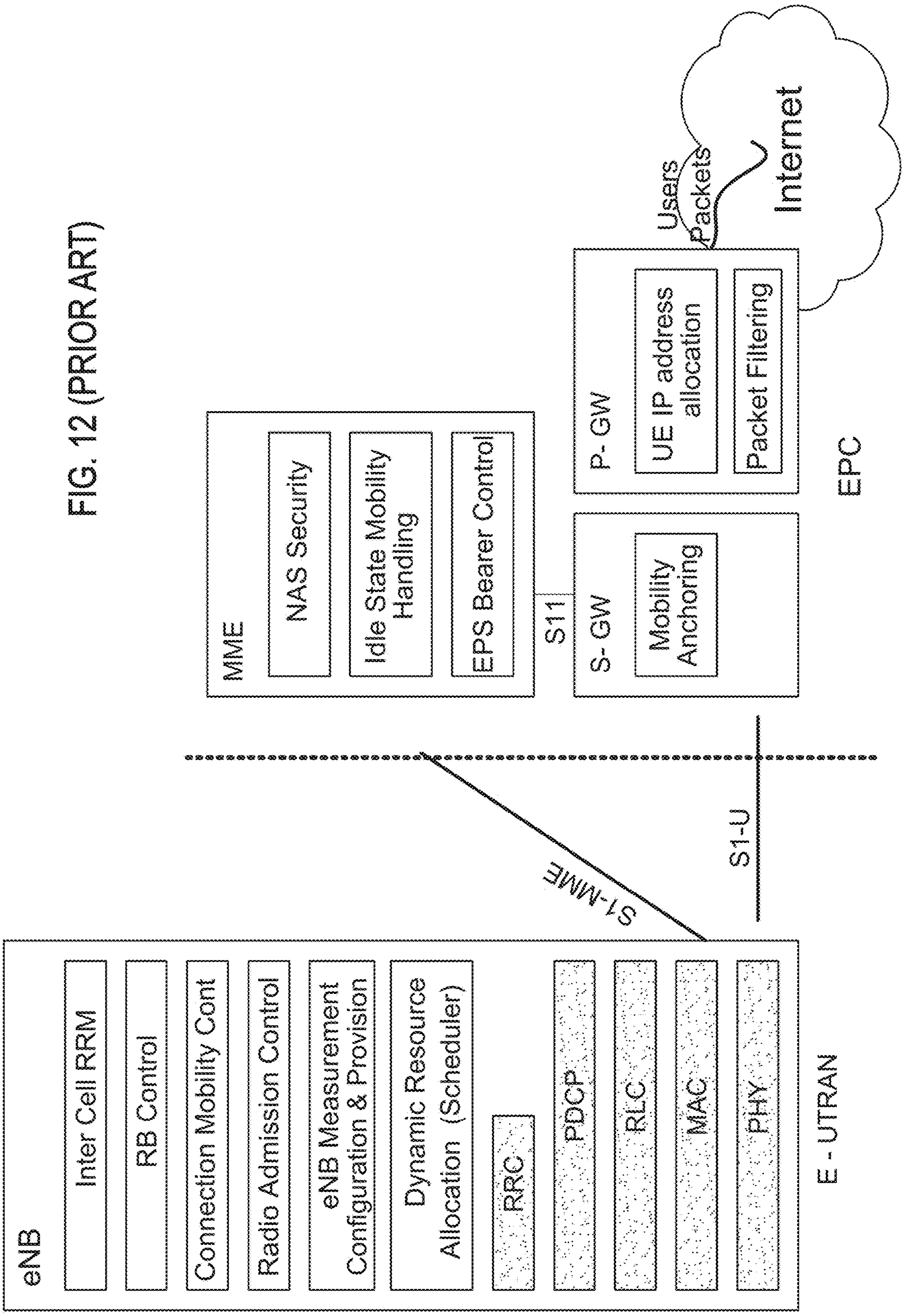

(b). Disconnect rUE from its serving Relay server and attach to the new discovered base station FIG. 12 is a prior art example of functional split between eNB (rBS) and EPC (Core) which may be taken from the 3GPP standards[TS 36.300]. The apparatus is characterized by split of control (S1-MME) plane data from the user (S1-U) plane data e.g. as merged from the 3GPP LTE standards TS 23.401 FIG. 4.2.1-1 and TS 36.300 FIGS. 4.1-1.

Figure 13:
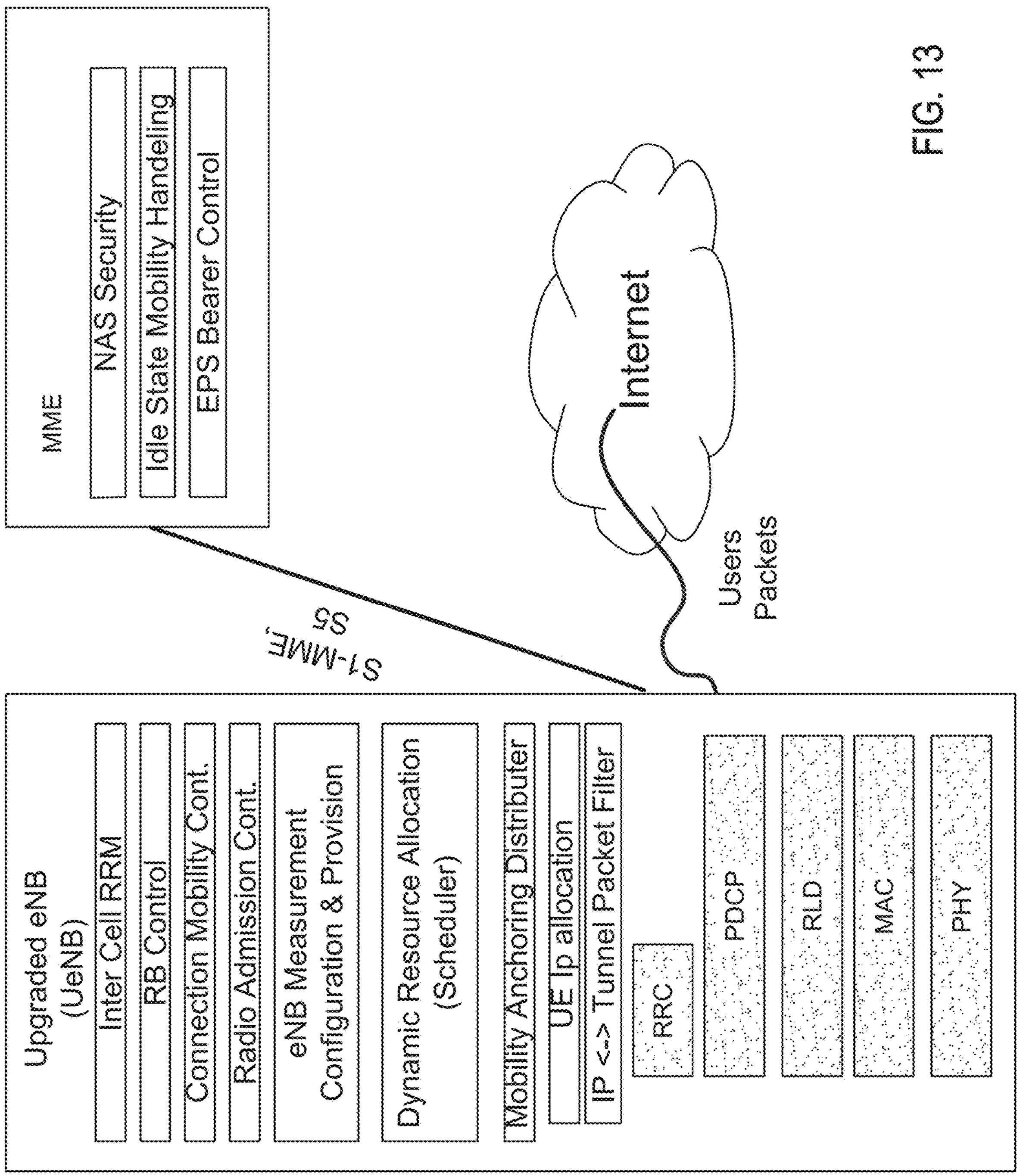

FIG. 13 illustrates a functional split between E-UTRAN eNB and EPC, in which one some or all of three additional functional blocks may be added: Mobility anchoring distributor, UE ip allocation, IP <-> tunnel packet filter. The three additional functional blocks may be taken from the EPC's S\P-GW. T heir addition to the eNB disables the centralistic approach of the 3GPP based on a central core and enables user data packets to be sent to the network without involving the EPC as a mediator, or only if deemed necessary, e.g. if authentication is desired. This embodiment is particularly suited for rural areas or for providers seeking to deploy a remote network where there is no good backhauling connection to the cellular core, but where it is possible to get satisfactory backhauling connection to applications, media, VoIP or internet servers. In order to find the anchoring point of a specific user a suitable flooding approach may be used e.g. similar to FIG. 19F, 19G or 25-27 herein. UE ip allocation may be achieved by giving different network address to each eNB to allocate, in that case a packet to an address having the designated address that belong to the specific eNB network it will be routed to that eNB To effect a IP <-> tunnel packet filter, the eNB maps radio bearer to a packet bearer e.g. may just send to packet without the tunnelID on the UL, on the DL. This is because the eNB knows the ip address of its subscribers such that the eNB can just map the ip address to the relevant UE radio bearer.

Figure 14:
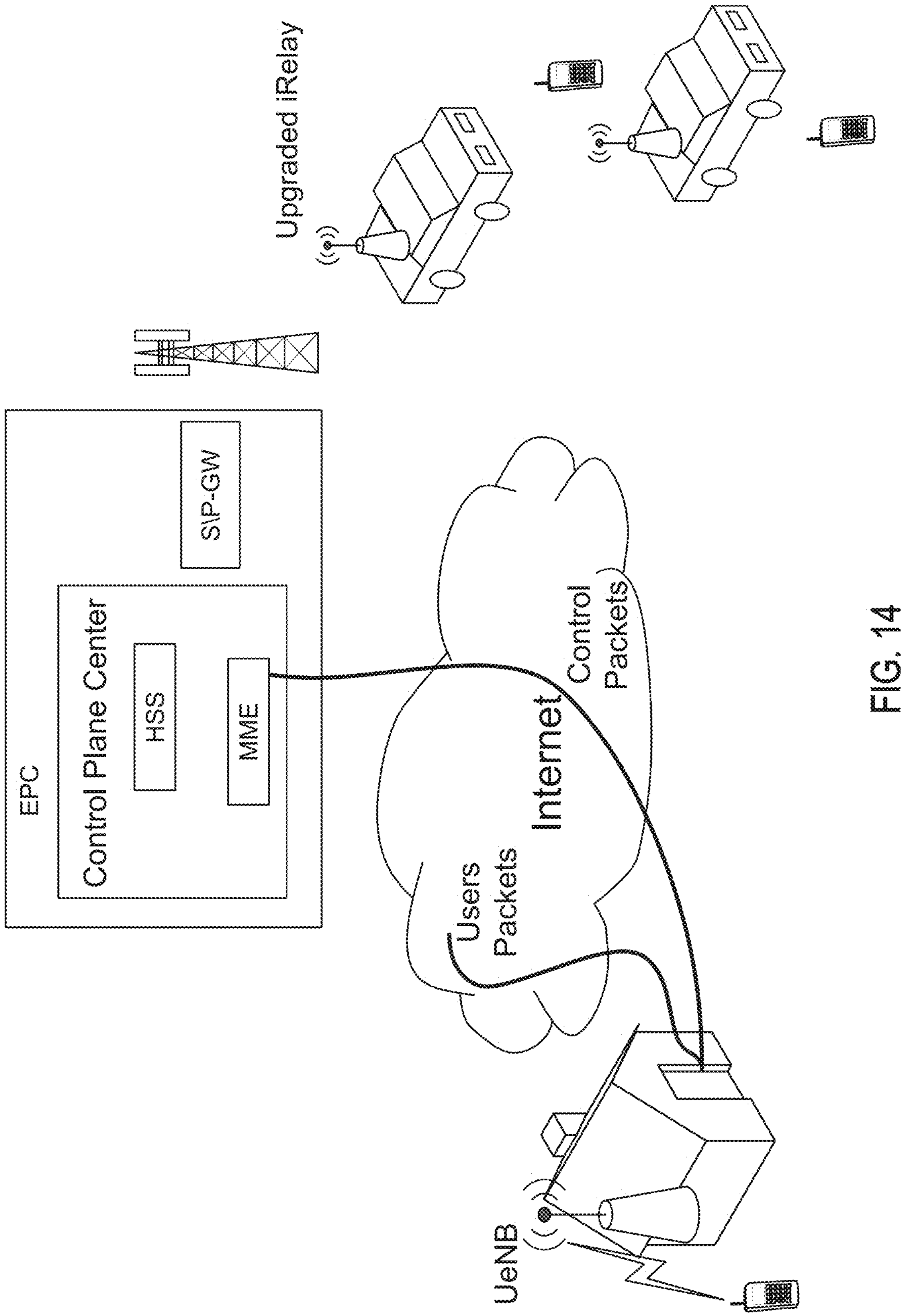

FIG. 14 is an example of deployment of upgraded eNB, in rural areas or for providers who seek to deploy a remote network where there is no good backhauling connection to the cellular core, but where it is possible to get satisfactory backhauling connection to the applications, media, VoIP or internet servers. In the example the upgraded eNB is deployed in rural areas\homes, network on the move.

Figure 15:
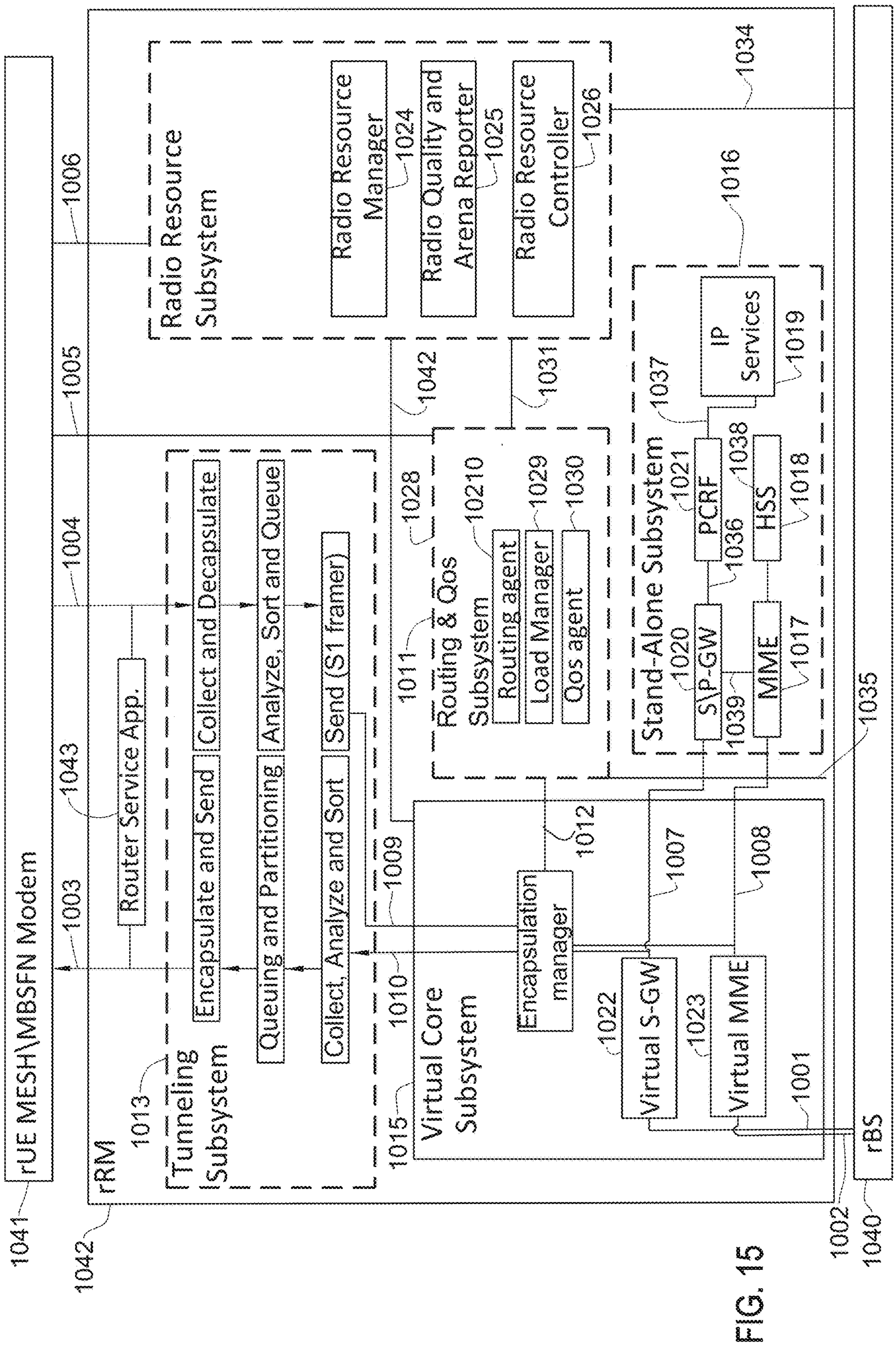

FIG. 15 is a simplified functional block diagram of a management layer (rRM) which resides in the iRelay. Re the rRM, the rUE is used as a passive receiver (MBSFN receiver option) or as standard UE.

Figure 16:
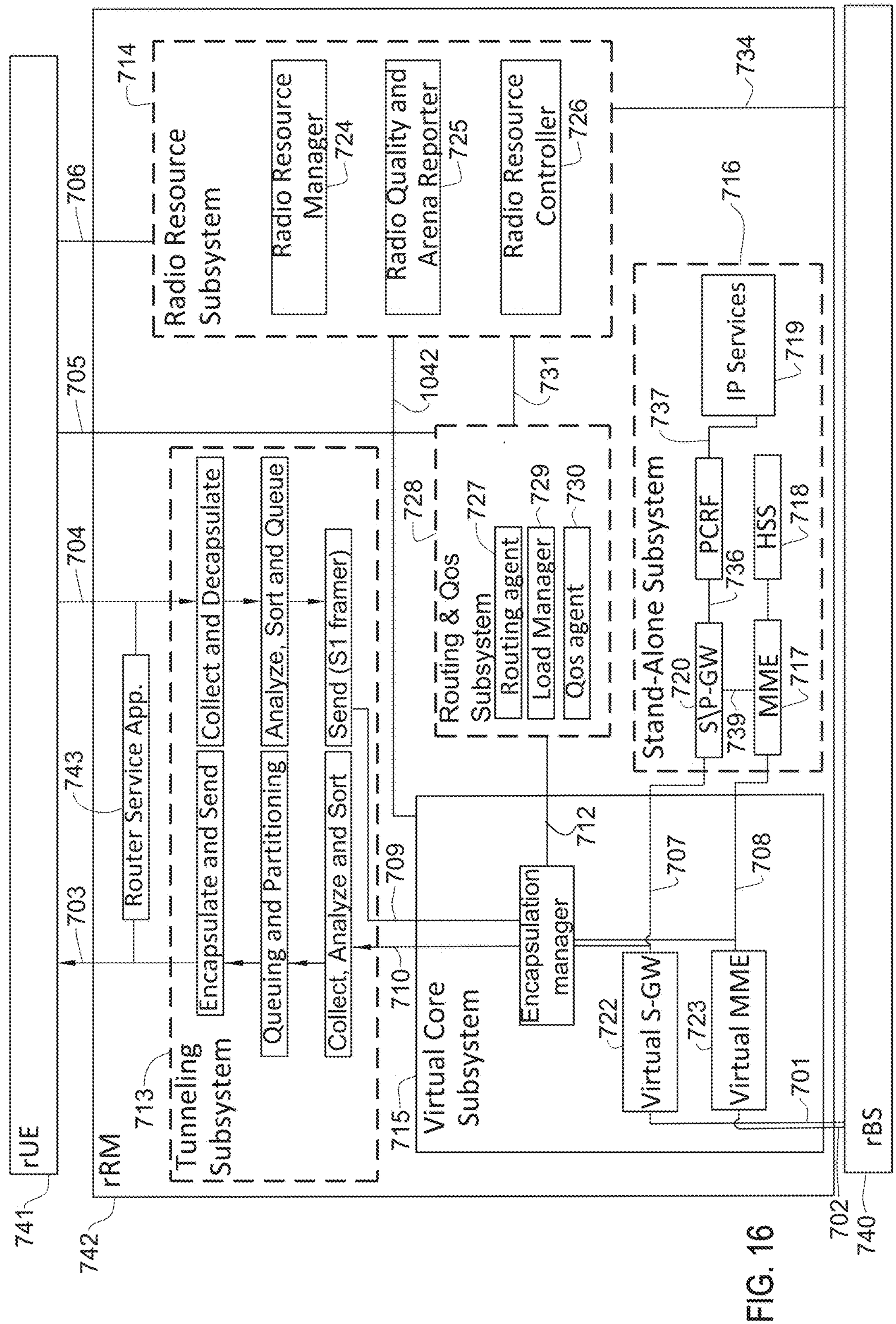

FIG. 16 includes a tunneling subsystem useful as described herein. According to certain embodiments, functionality or applications as described herein are added to some or all of: the core, and the upper layer (13, radio resource manager) of the base station, as well as (optionally even in hardware) functionality to synchronize between the rUE \ mbsfn receiver and the base station.

Generally, FIG. 16 is a simplified block diagram of a possible internal architecture for a relay resource manager (rRM). The terms "stand-alone subsystem", "simulated stationary network", "core functionality", mini-core and simulated core are used herein interchangeably.

As shown, the relay resource manager comprises some or all of: a Tunneling subsystem [713], Radio Resource subsystem [714] Virtual core subsystem [715] and Routing and QoS Subsystem [728], suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces [703, 704] with the mobile station functionality rUE [741] e.g. over a standard IP stack.

The Virtual core subsystem typically constitutes the gateway between the core (stationary) on the one hand, and various resource management subsystems and the base station functionality rBS [740] on the other hand. The Virtual core subsystem may communicate with the base station functionality rBS [740] or core (of the static network) e.g. using standard S1-MME [702,708*b*,709,710] and S1-U [701,707*b*,709,710] or proprietary management and control (M&C) over IP interface [701,707*b*,709,710] with the base station functionality rBS [740] and remote core. The Virtual core subsystem may send all or any of the S1-MME, S1-U, M&C messages to the core optionally through the Tunneling Subsystem [713].

The Encapsulation manager function of the Virtual core subsystem [715] implements a Network event listener e.g. as illustrated in FIG. 6A at reference numeral 1304 and a Network event handler e.g. as illustrated in FIG. 6A at reference numeral 1305]. The handler may use deep packet inspection techniques in order to maintain suitable statistics (such as but not limited to any or all of: all active bearers including source and destination addresses, ports, and priorities) The handler may also raise events (for example in case of a disconnection from the core). The encapsulation manager is also operative for handling (send/receive) different messages that are sent/received [712] by the Routing and QoS Subsystem to/from the core being used, for example messages to create or delete a bearer.

In addition, the Encapsulation manager function of the Virtual core subsystem [715] may optionally include functionality for exchanging information between the relay resource manager rRM that the Virtual core subsystem resides within [742] and: (1) another relay resource manager located inside another relay, and/or (2) Relay/s Server located as part of the static network. The Virtual S-GW [722] and Virtual MME [723] may have corresponding standard S-GW and MME interfaces with the base station functionality rBS [740] accordingly. If a remote core is used by the relay, the Virtual S-GW [722] and Virtual MME [723] may emulate these core functions as proxies so that the base station functionality rBS [740] works smoothly and seamlessly despite remoteness of the core.

The Routing & QoS subsystem [728] may comprise some or all of a routing agent [727], Load manager [729] and QoS Agent [730]. Routing & QoS subsystem [728] communicates with the mobile station functionality (rMS) [741] e.g. using AT Commands or any suitable proprietary interface [705]. Routing & QoS subsystem [728] communicates with the base station functionality rBS e.g. using the M&C interface [735]. Using the M&C interface the Routing and QOS subsystem may command a change in various parameters in the base station functionality rBS [740] such as PLMN, and/or may command the base station functionality rBS [740] to initiate a handover mechanism of an attached mobile station. Using the mobile station functionality (rMS) [741] interface [705] the Routing and QoS subsystem [728] may receive radio measurements of served base stations or neighboring base stations, and may send fake radio measurements to the mobile station functionality (rMS) [741] that the mobile station functionality may send to its serving base station in order to intervene with the handover mechanism. Routing and QoS subsystem [728] may register to specific access point names (APN) and/or create additional bearers.

The Load manager [729] is operative for balancing traffic loads between different relays. Load manager [729] may perform actions such as but not limited to: indicating other relay resource manager elements such as but not limited to any or all of: Radio Resource Subsystem [714], Routing agent [727], QoS agent [730] or Encapsulation manager (block of the Virtual Core Subsystem [715]) or mobile station functionality [741] or base station functionality rBS [740] or mobility management entity MME of remote core (of the static network or) that which current site loaded. Load manager [729] may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent [730] is operative for creating bearers according to the current attached mobile stations and their bandwidth requests in case there is a need for a additional bearer due to the multi-hop mechanism.

The Radio Resource Subsystem [714] may comprise some or all of: Radio resource manager [724], Radio Quality and Arena Reporter [725] and Radio Resource Controller [726]. The radio resource subsystem [714] is operative for reducing interference between: (1) relay's access links which may be sent and received by the base station functionality rBS [740]) and relay's backhauling links which may be sent and received by the rUE (rMS) [740]; (2) relay's access links and other relays' access links; and (3) relay backhauling links and other relays' backhauling links. The Radio resource controller [726] is operative for controlling different radio resources of the mobile station functionality rUE [741] and of base station functionality rBS [740] e.g some or all of: lower base station functionality transmission power, blanking particular base station functionality resource blocks/subframe/s, request for mobile station functionality uplink grant, changing center frequency, changing bandwidth.

The Radio Quality and Arena Reporter [725] may be operative for gathering a radio measurement report indicating received power reports of the base station functionality rBS [740] and base station functionality rBS's neighboring base stations from the connected mobile stations reporting to the base station functionality rBS [740] and from the mobile station functionality rUE [741]. The radio measurement report may indicate one or more of: the mobile station functionality's serving base station's radio measurements; and/or radio measurements of mobile station functionality rUE [741]'s active set, e.g. list of neighboring base stations that mobile station functionality rUE [741] is operative to measure periodically. The Radio Resource Subsystem sends the measurement report through the interface to the Virtual Core subsystem [742], typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter [725] and from neighboring relays' Radio quality and arena reporters. The radio resource manager may compute the level of interference between the various stations, e.g. of relays and optionally of the static network. The radio resource manager may also provide radio resource configuration recommendations to its local radio resource controller [726] and/or to its neighboring relays' radio resource controller/s through interface [742] and using the encapsulation manager of the Virtual core subsystem [715].

The Radio resource manager [714] can optionally communicate in interface [706] e.g. using AT Commands or other proprietary protocol with the mobile station functionality rUE [741]. The Radio resource manager can further optionally communicate in interface [734] e.g. using M&C protocol with the base station functionality rBS [740]. The Radio resource manager can further optionally communicate with other relays' radio resource subsystems through interface [742] e.g. using the virtual core subsystem [715] Encapsulation manager.

The Stand-alone subsystem [716], also termed herein the Simulated core network, is responsible for core packet switching & handling and for IP services. The Stand-alone subsystem [716] may serve as a local core also termed herein a mini-core since it may have less functionality than the static core does. Stand-alone subsystem [716] may also be operative for giving local services, such as local storage of maps and/or being a voice call server or/and SIP server and/or video server and/or gaming server, e.g. through the IP services function [719], in the event of handoff e.g. when the relay disconnects from the remote core (either static or part of other relay rRM) from the serving core. If such handoff occurs, the virtual core subsystem [715] may recreate all relevant PDP contexts and bearers according to the information stored on the virtual core subsystem's [715] encapsulation manager and switch the packet data to the local stand-alone subsystem [716]. When the local Stand-alone subsystem is used as an active core, and there is a need in a given situation, to re-use the remote core instead of the local core, a reverse process performed.

Tunneling Subsystem [713], Routing & QoS Subsystem [728] and Radio Resource Subsystem [714] are optional subsystems of the relay resource manager (rRM). All or any subset of these subsystems can be added to the relay resource manager (rRM) by need.

According to certain embodiments, one mobile station is connected to a core functionality of the relay resource manager and another mobile station is connected to the core element of the static network, and there is a link between these cores.

If a mobile station that is attached to a stationary base station or even a standard phone communicates with a mobile station that is attached to the core through several relays, the mobile station attached to a stationary base station may connect e.g. using conventional interfaces to the P-GW and from there by hopping through [164] the static base station SeNB [167], the first relay node TUE[155], relay resource manager rRM [163] and base station functionality TeNB [156]. The second relay's mobile station functionality TUE [157], the relay resource manager rRM [159] and the base station functionality TeNB [158] are typically able to communicate with the mobile station [150].

Any suitable IP connectivity gateway may be used herein, not being limited to what is specifically shown and described herein, such as but not limited to one of: an IP-connectivity GW in LTE; one of a P-Gateway, S-Gateway, P/S-Gateway and Access-Gateway; in 3G GGSN, an SGSN, in WiMAX, an ASN-Gateway in CSN;

Any suitable mobility management entity may be used herein, not being limited to what is specifically shown and described herein, such as but not limited to one of: an LTE MME, a 3G RNC, and a WiMAX ASN.

An internal router service application used for multi-hop encapsulation may be provided. The addition of a router service application to the rRM enables a relay to do extended tunnels for multi-hop encapsulation. The router service application [743] can be implemented as a software application, or alternatively as a hardware router.

Figure 18A:
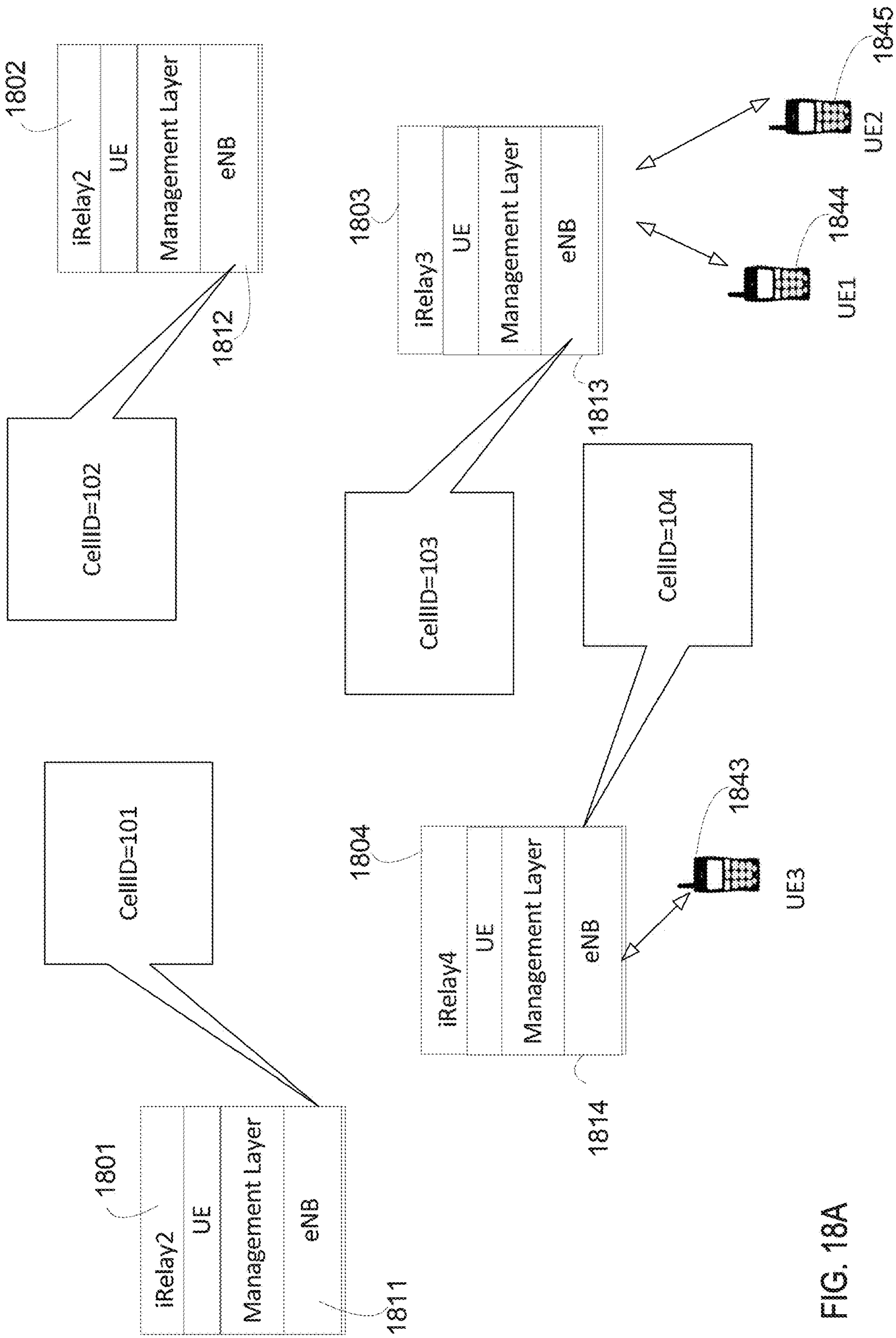

FIG. 18A describes a method for Building an iRelay network without using MBSFN.

FIGS. 18A-D depict an example method of building the iRelay network.

Figure 18B:
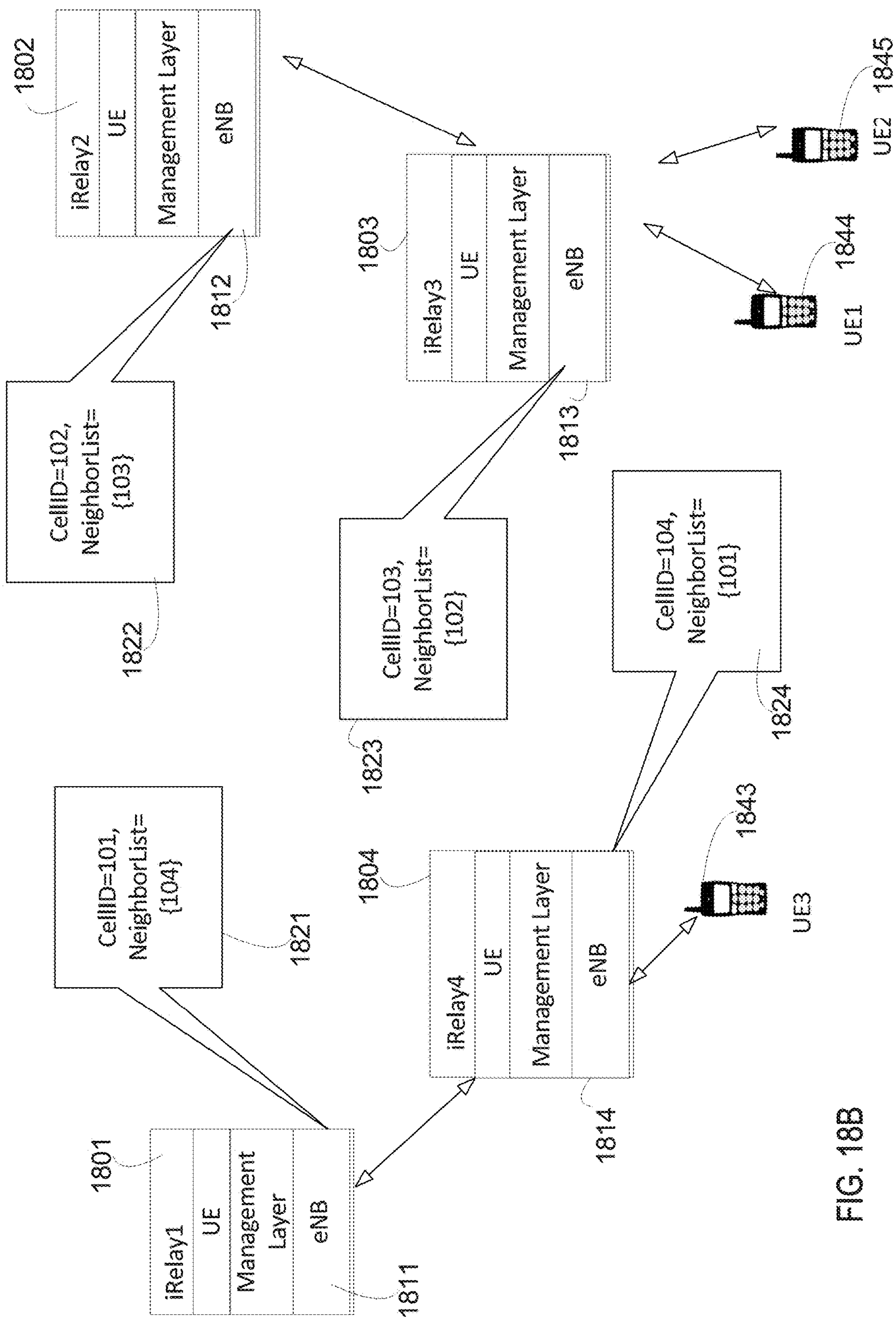

At FIG. 18A the relays are not aware of their neighboring cells and each one is broadcasting its Physical cell Id as part of the standard, At FIG. 18B:

UE portion of iRelay3 decoded iRelay2 and iRelay4 broadcast channel, because iRelay2 has a smaller physical cellID the UE portion of iRelay 3 connects to the eNB part of iRelay2.

After UE portion of iRelay 3 successfully connected to the eNB part of iRelay2, eNB part of iRelay2 broadcasts the cellID of eNB part of iRelay3 (103) [1822] as a neighboring cell and eNB part of iRelay3 broadcasts the cellID of eNB part of iRelay2 (102) [1823] as a neighboring cell.

iRelay4 decoded iRelay1 and iRelay3 broadcast channel, because iRelay1 has a smaller physical cellID the UE portion of iRelay 4 connects to the eNB part of iRelay1.

Figure 18C:
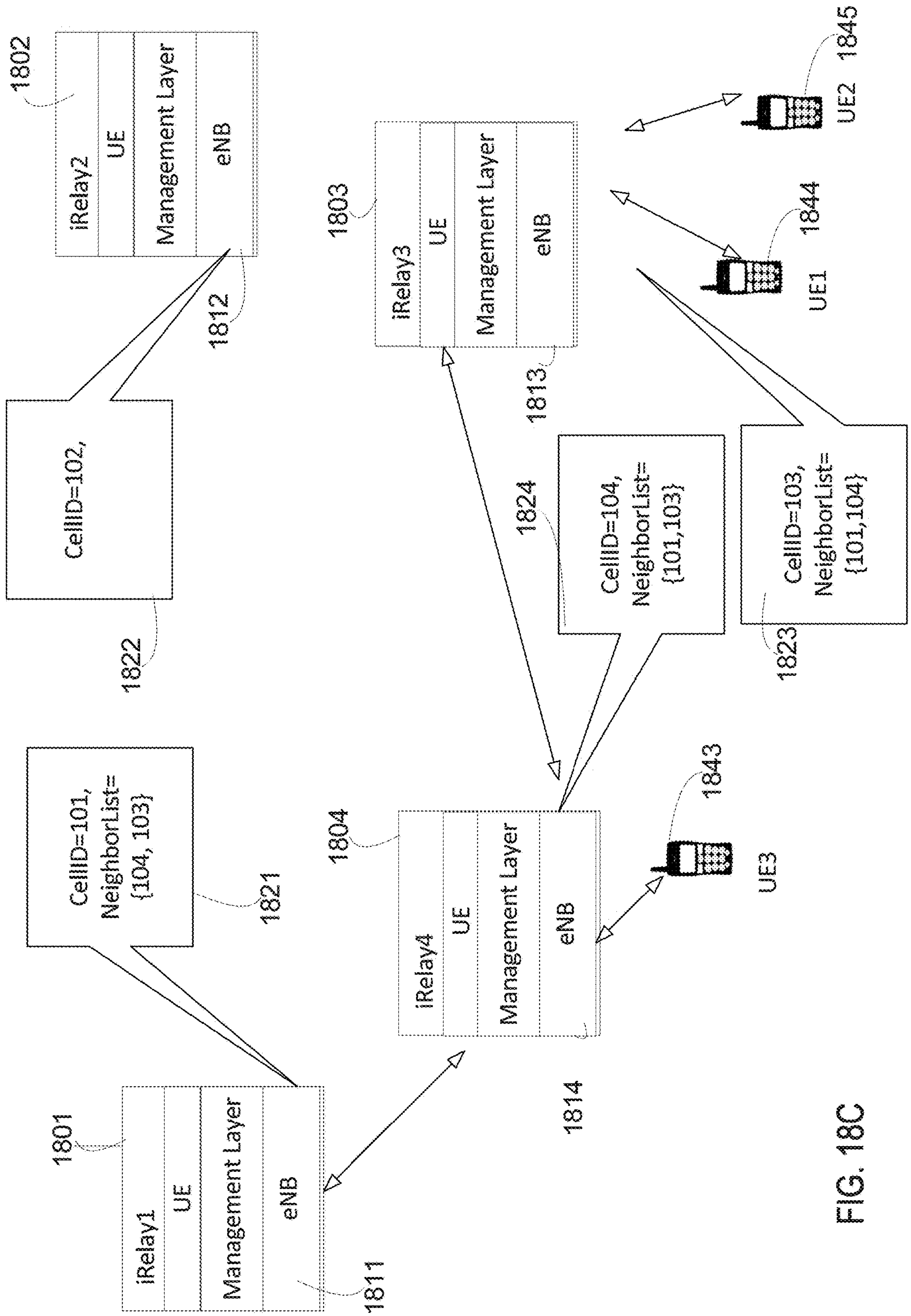

After UE portion of iRelay 4 successfully connected to the eNB part of iRelay1, eNB part of iRelay1 broadcasts the cellID of eNB part of iRelay4 (104) [1821] as a neighboring cell and eNB part of iRelay4 broadcasts the cellID of eNB part of iRelay1 (101) [1824] as a neighboring cell.

iRelay2 decoded iRelay3 broadcast channel, because iRelay2 has a smaller physical cellID than iRelay3, UE portion of iRelay4 doesn't handoff.

iRelay1 decoded iRelay4 broadcast channel, because iRelay1 has a smaller physical cellID than iRelay4, UE portion of iRelay1 doesn't handoff At FIG. 18C:

iRelay3 decoded iRelay2 and iRelay4 broadcast channel, because iRelay4 has a smaller physical cellID in its neighboring list the UE portion of iRelay 3 is being handoff to the eNB part of iRelay4.

After UE portion of iRelay 3 successfully connected to the eNB part of iRelay4, eNB part of iRelay2 removes the cellID of eNB part of iRelay3 (103) from the neighboring cell list [1822], eNB part of iRelay3 broadcasts the cellID of eNB part of iRelay1 and iRelay4 (101,104) [1823] as a neighboring cell, eNB part of iRelay4 broadcasts the cellID of eNB part of iRelay3 and iRelay1 (103,101) [1824] as a neighboring cell and eNB part of iRelay1 broadcasts the cellID of eNB part of iRelay3 and iRelay4 (103,104) [1821] as a neighboring cell.

iRelay2 decoded iRelay3 broadcast channel, because iRelay3 has cellID bigger than iRelay2 cellID and the neighboring list didn't contained cellID smaller than the cellID of eNB part of iRelay 2 than UE portion of iRelay2 doesn't do anything.

iRelay4 decodes iRelay3 broadcast channel, because iRelay3 *e* neighboring list dosen't contain cellID smaller than the neighboring cellID list of eNB part of iRelay 4 than UE portion of iRelay4 doesn't handoff.

iRelay1 decoded iRelay4 broadcast channel, because iRelay4 has cellID bigger than iRelay1 cellID and the neighboring list didn't contained cellID smaller than the cellID of eNB part of iRelay 1 than UE portion of iRelay1 doesn't handoff.

Figure 18D:
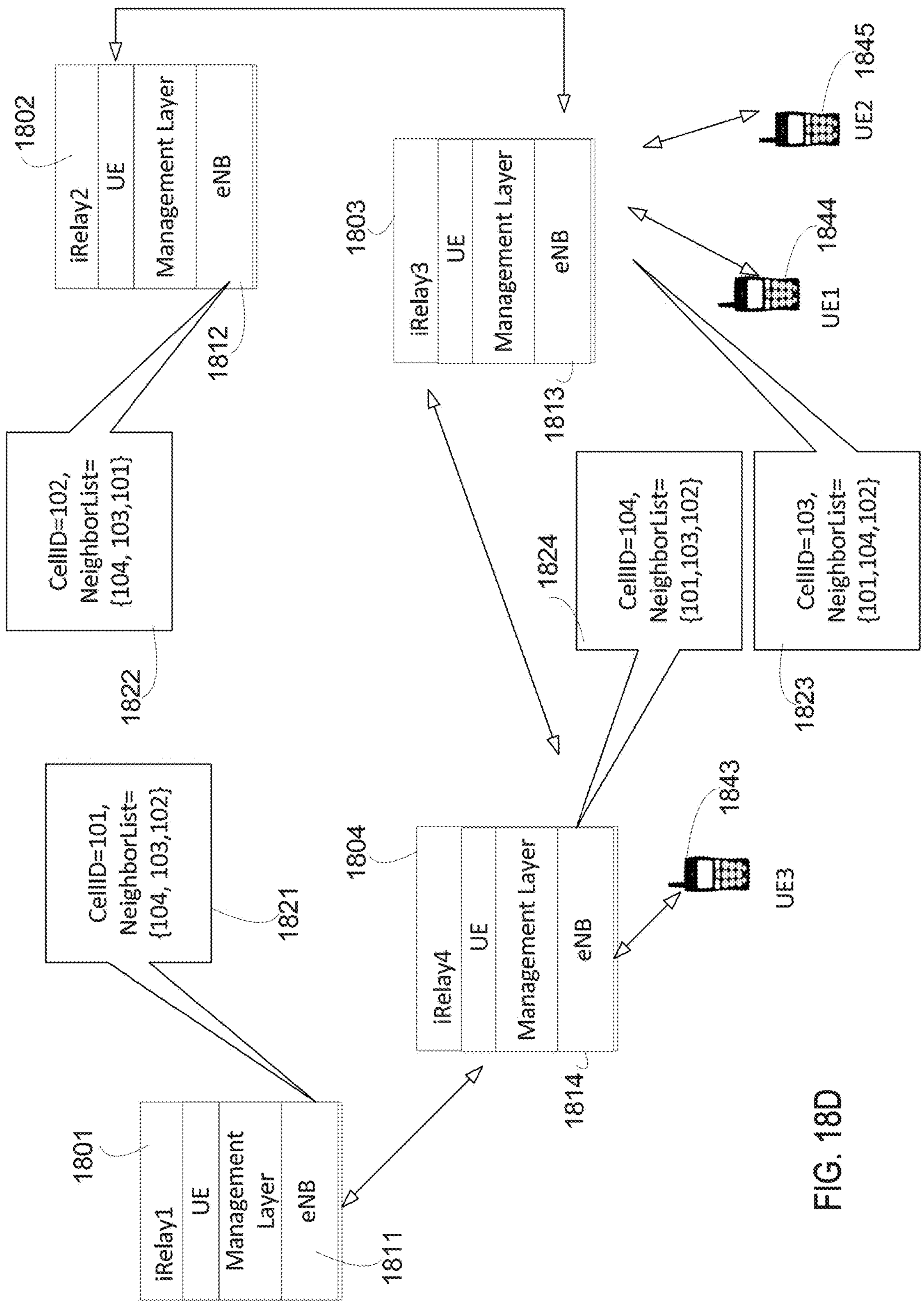

As shown in FIG. 18D, the UE portion of iRelay2 may decode iRelay3 broadcast channel, because eNB part of iRelay3 has a smaller physical cellID in its neighboring list the UE portion of iRelay2 connects to the eNB part of iRelay3.

After UE portion of iRelay 2 successfully connected to the eNB part of iRelay3, eNB part of iRelay2 broadcast the cellID of eNB part of iRelay3, iRelay4 and iRelay1 (103, 104,101) in the neighboring cell list [1822], eNB part of iRelay3 broadcasts the cellID of eNB part of iRelay1, iRelay2 and iRelay4 (101,102,104) [1823] as a neighboring cell, eNB part of iRelay4 broadcasts the cellID of eNB part of iRelay3, iRelay2 and iRelay1 (102,103,101) [1824] as a neighboring cell and eNB part of iRelay1 broadcasts the cellID of eNB part of iRelay3, iRelay2 and iRelay4 (103, 102,104) [1821] as a neighboring cell.

iRelay3 decodes iRelay2 and iRelay4 broadcast channel, because iRelay2 and iRelay4 neighboring list doesn't contain cellID smaller than the neighboring cellID list of eNB part of iRelay 3 the UE portion of iRelay3 doesn't handoff.

iRelay4 decodes iRelay3 and iRelay1 broadcast channel, because iRelay3 and iRelay1 neighboring list dosen't contain cellID smaller than the neighboring cellID list of eNB part of iRelay 4 than UE portion of iRelay4 doesn't handoff.

iRelay1 decoded iRelay4 broadcast channel, because iRelay4 has cellID bigger than iRelay1 cellID and the neighboring list didn't contained cellID smaller than the cellID of eNB part of iRelay 1 than UE portion of iRelay1 doesn't handoff.

FIGS. 19F and 19G: show topology of media session between UE1 and UE2, while UE1 is attached to iRelay1 and UE3 is attached to iRelay3 and they are having an RTP conversation through ip tunnels, connecting iRelay1-iRelay2[1915] and iRelay2-iRelay3[1916]. FIGS. 19A and 19B depict attaching to the core and initialization of packet switch media session between UE1 and UE3, UE1 and UE3 are starting the normal attach, authenticate, creates context sequence which ends by having UE1 registered to the iRelay1 packet core and UE3 registered to the iRelay3 core. In case that the UE is not registering to its home core network than the visited core network may authenticate it by forwarding the authentication to the home core network, or use local digested security key e.g. as per FIGS. 20A-C and 30. The visited network may also inform, when the connectivity is available, the home core network that the UE is visiting in the visited network in case someone will send invite message to it. After the user (UE3) is found and the invite message is sent to it, a standard PDP Context Activation including Codec and Qos negotiation, Audio\Video Path setup, Ringing and Answering that ends with UE1 and UE3 having conversation over RTP over ip tunnels [1916][1915] through iRelay2.

Figure 19C:
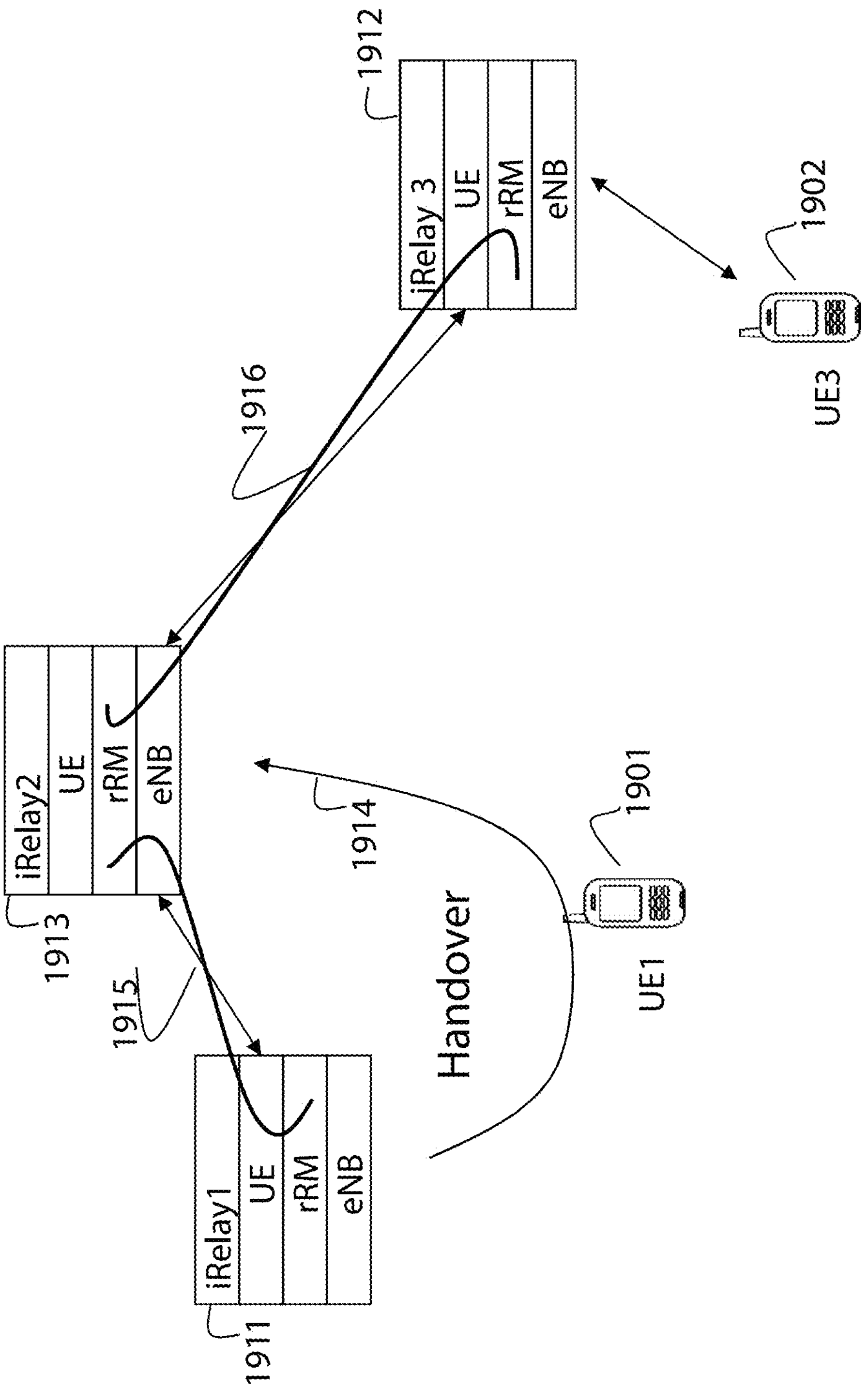
Figure 19D:
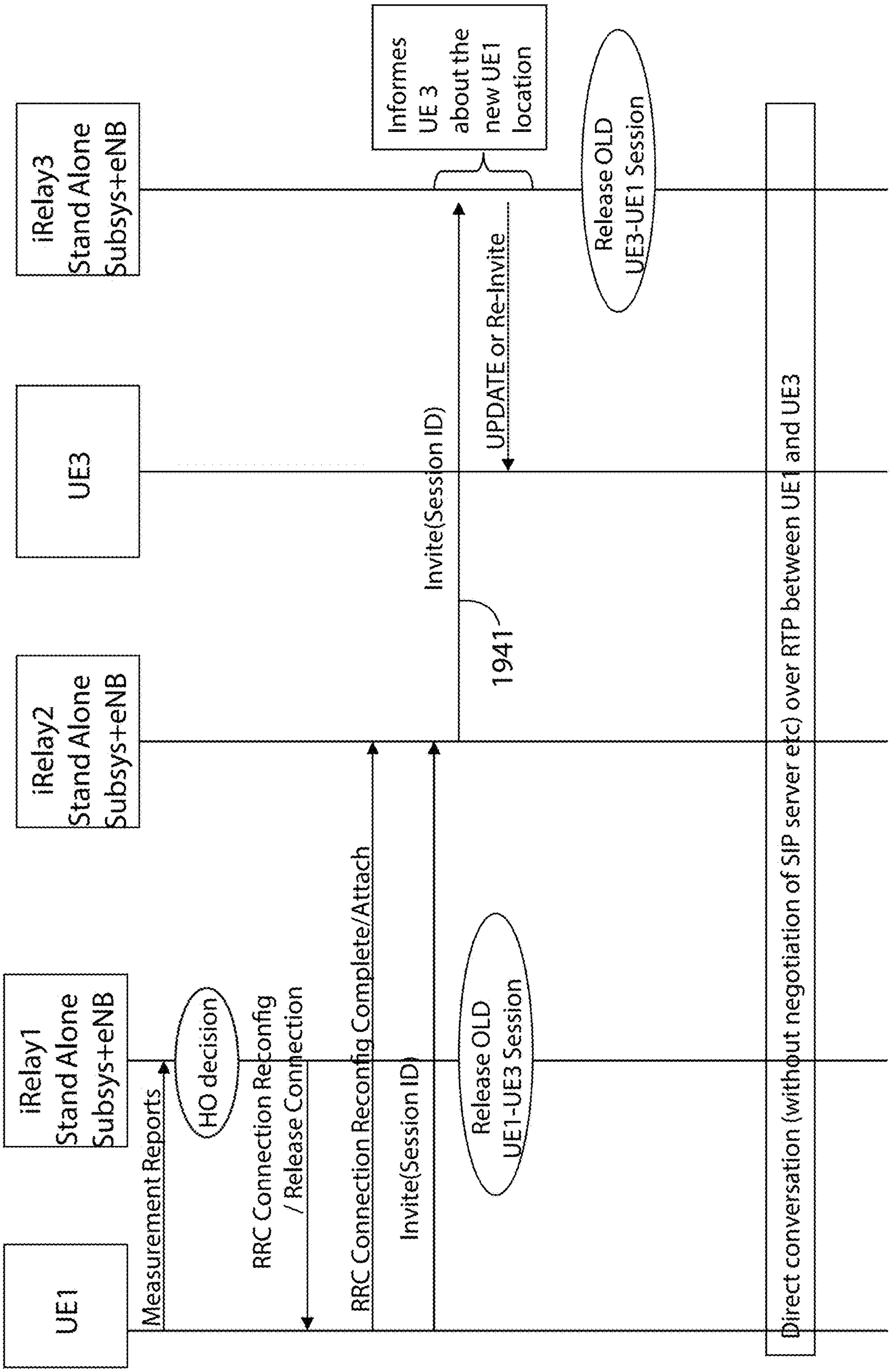

FIGS. 19C and 19D depict continuity of the media session between UE1 and UE3 after UE1 handoff from iRelay1 to iRelay2 and UE1 got new ip address from the iRelay2 stand alone core.

Figure 19E:
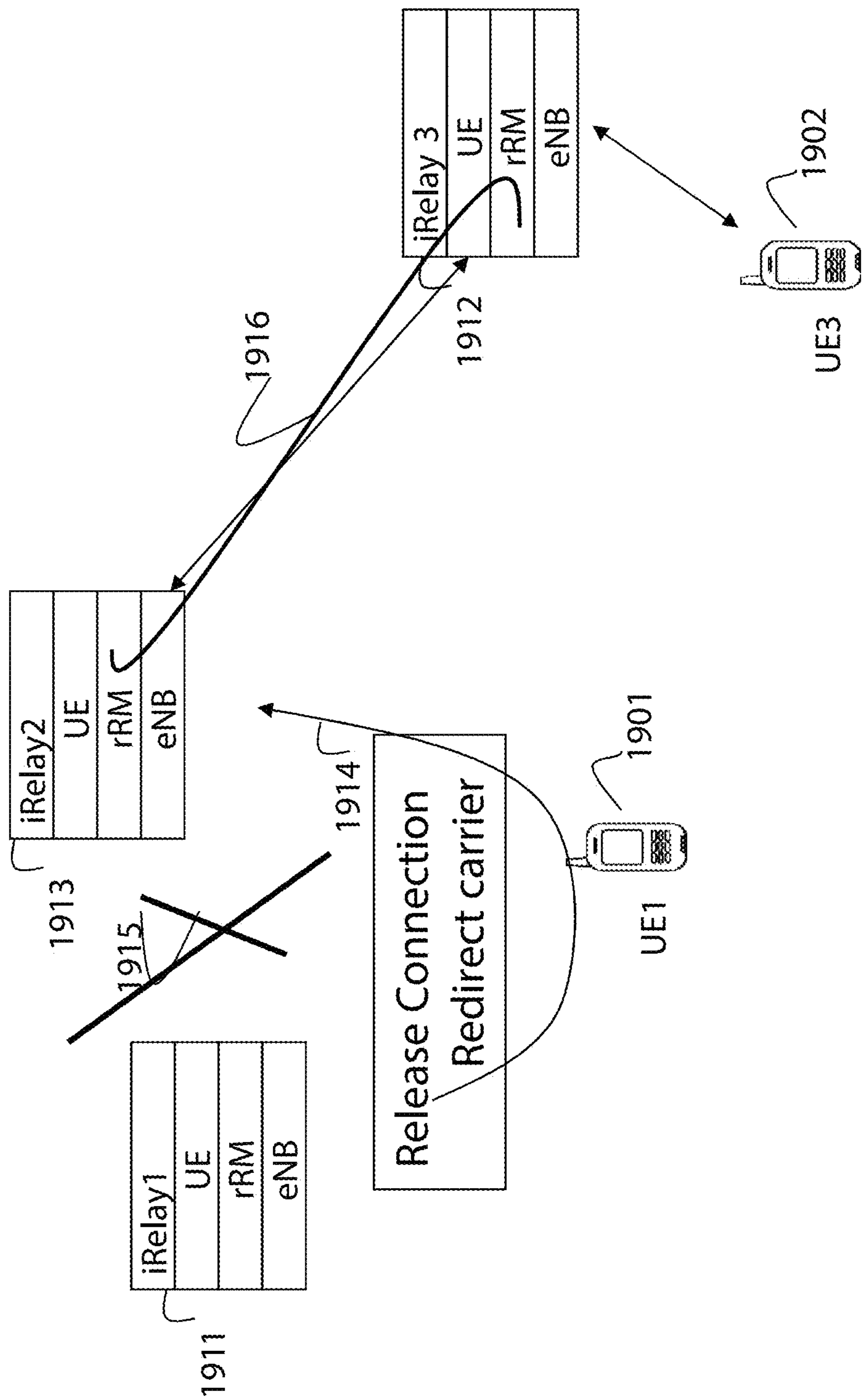
Figure 19F:
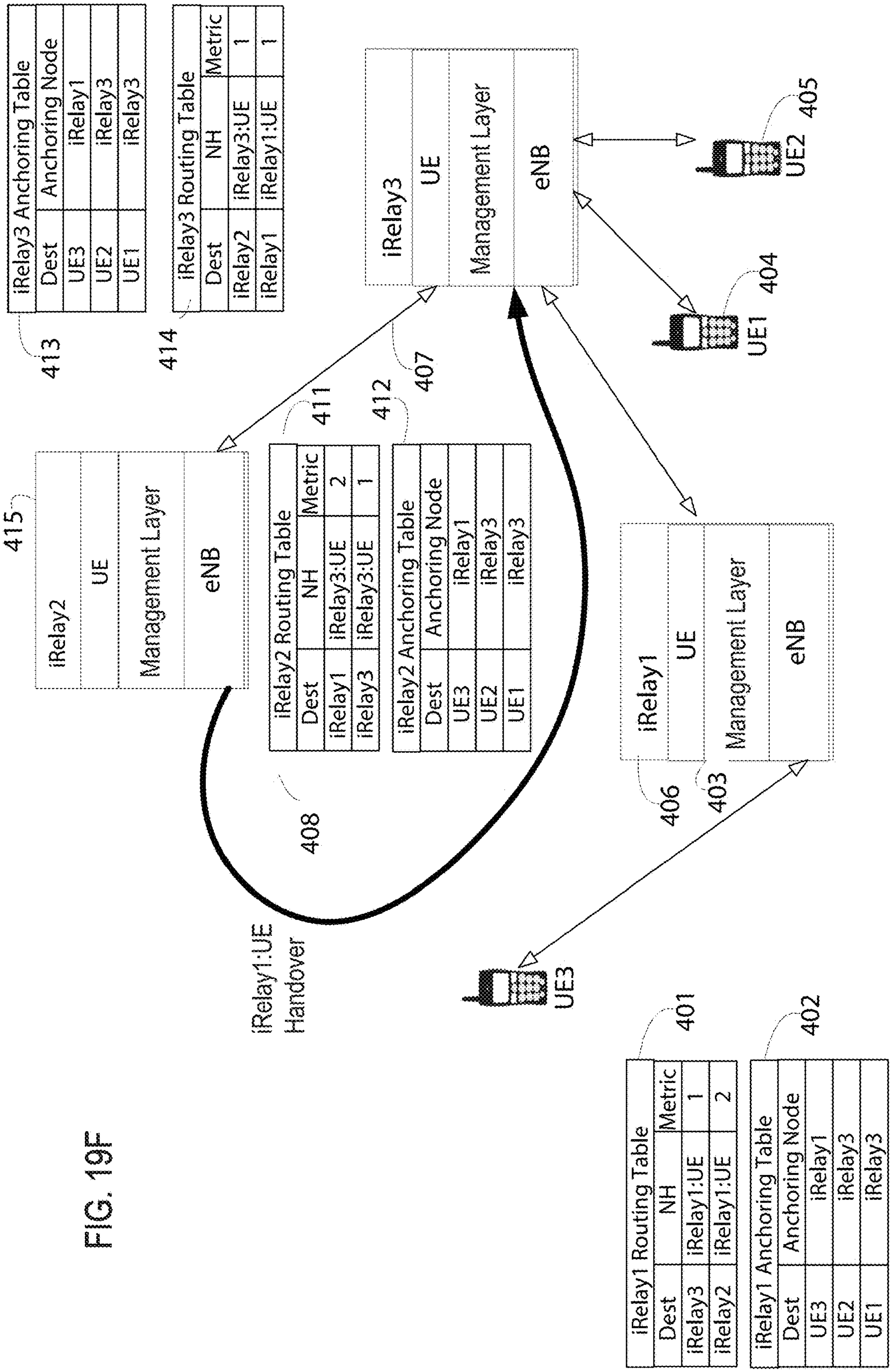
Figure 19G:
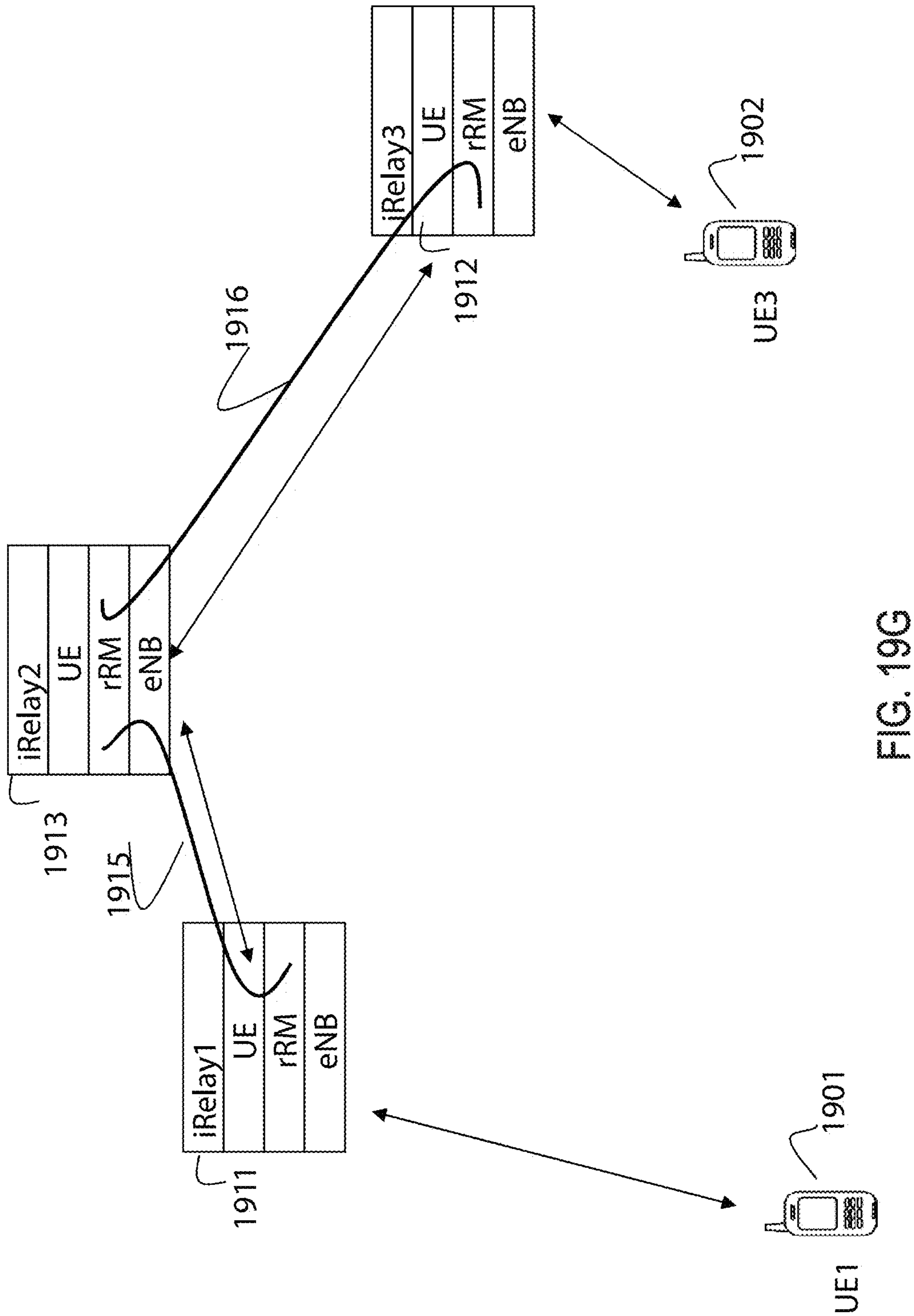

FIG. 19E depicts continuity of the media session between UE1 and UE3 after iRelay1 lost it backhauling connection, by sending disconnect message to the UE and redirect carrier message, the rest of the sequence is same as depicts in FIG. 19C.

Measurement reports are indicating that the UE is able to attach to a eNB that is connected to the rest of the network. The disconnected iRelay is not able to send a normal handover message because he lost its backhauling connection, so In order to be able to continue the session, the disconnected iRelay may send disconnect message to the UE with redirection info that will cause the UE to attach to the connected (i.e. iRelay2) iRelay node.

FIGS. 19C and 19D depict continuity of the media session between UE1 and UE3 after UE1 handoff from iRelay1 to iRelay2 and UE1 got new ip address from the iRelay2 stand alone core.

UE1 is being handoff (disconnect or handovered) to another iRelay that has backhauling access, when the UE re attaches (Attach\Conn reconfig) to the network it indicates by sending invite message [FIG. 19D, 1941] including its former session IDs, to its local stand-alone core, the local stand-alone core is able to communicate with the original designated address (iRelay3 stand alone subsystem, UE3) and it forwards the invite message to them. The designated address (UE3, iRelay3 stand alone subsystem) updates the old session with the new source UE1 address and afterwards all the peer network node are able to continue the lost session.

Figure 20A:
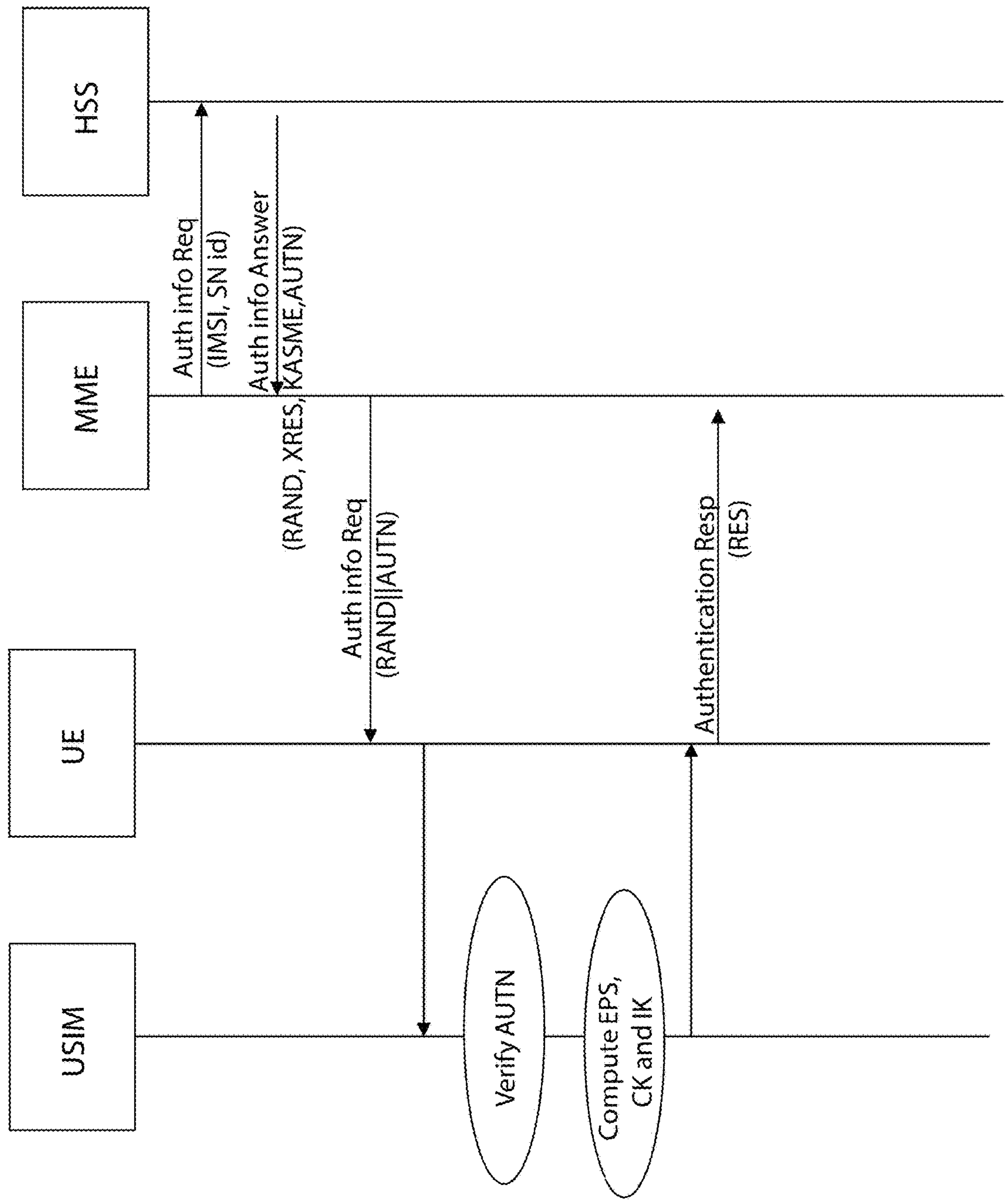

FIGS. 20A-C and 30 depict usage of digested local authentication key in order to register to visited network FIG. 20A is a prior art depiction of a conventional authentication method in LTE; other standards are similar, mutatis mutandis. After the UE sends register message to the network, the network tries to authenticate it, it starts a two sided handshake where the network is being authenticated by the UE in the Auth Req and the UE is being authenticated by the user by sending Authentication response.

Figure 20B:
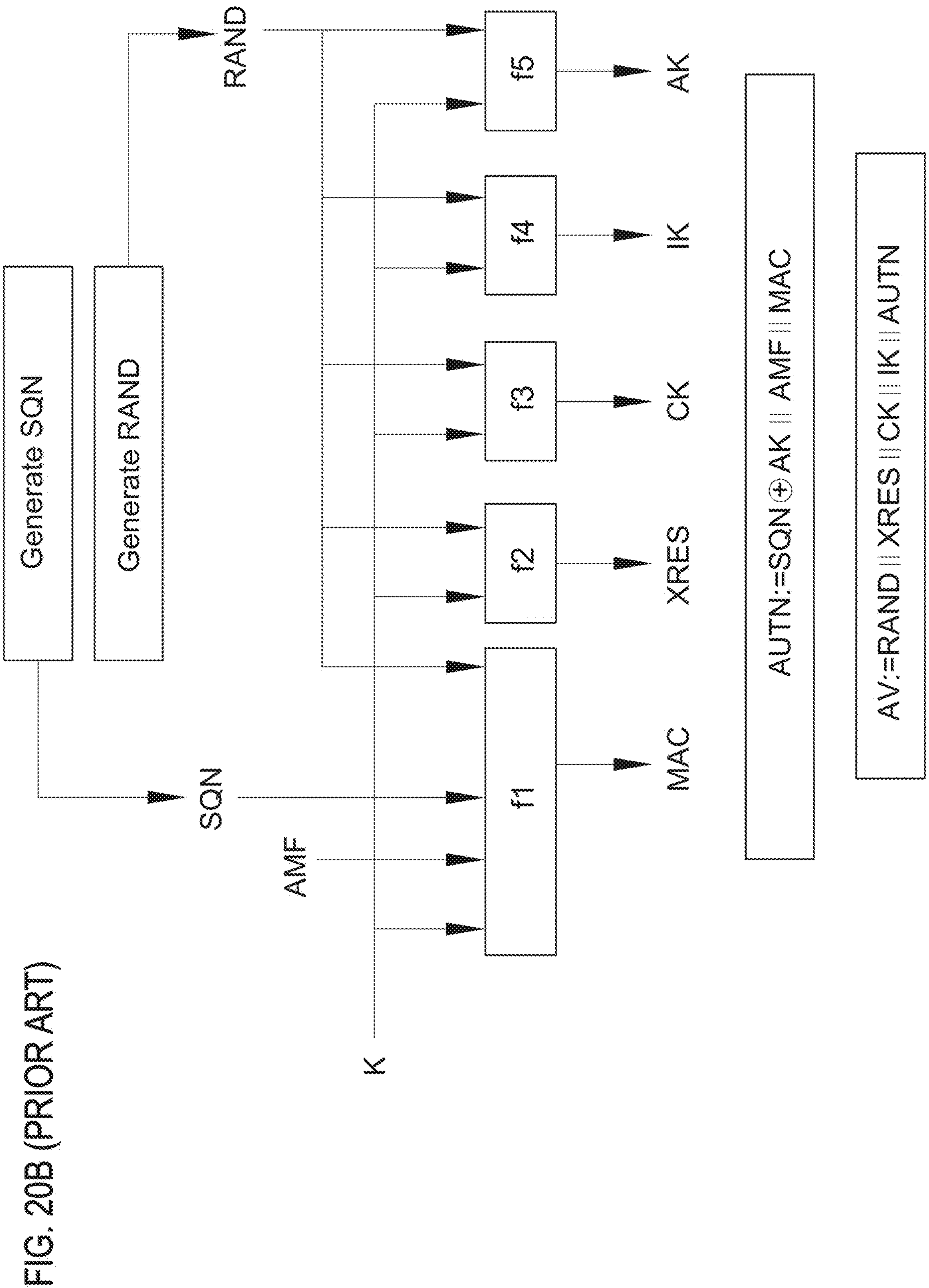
Figure 20C:
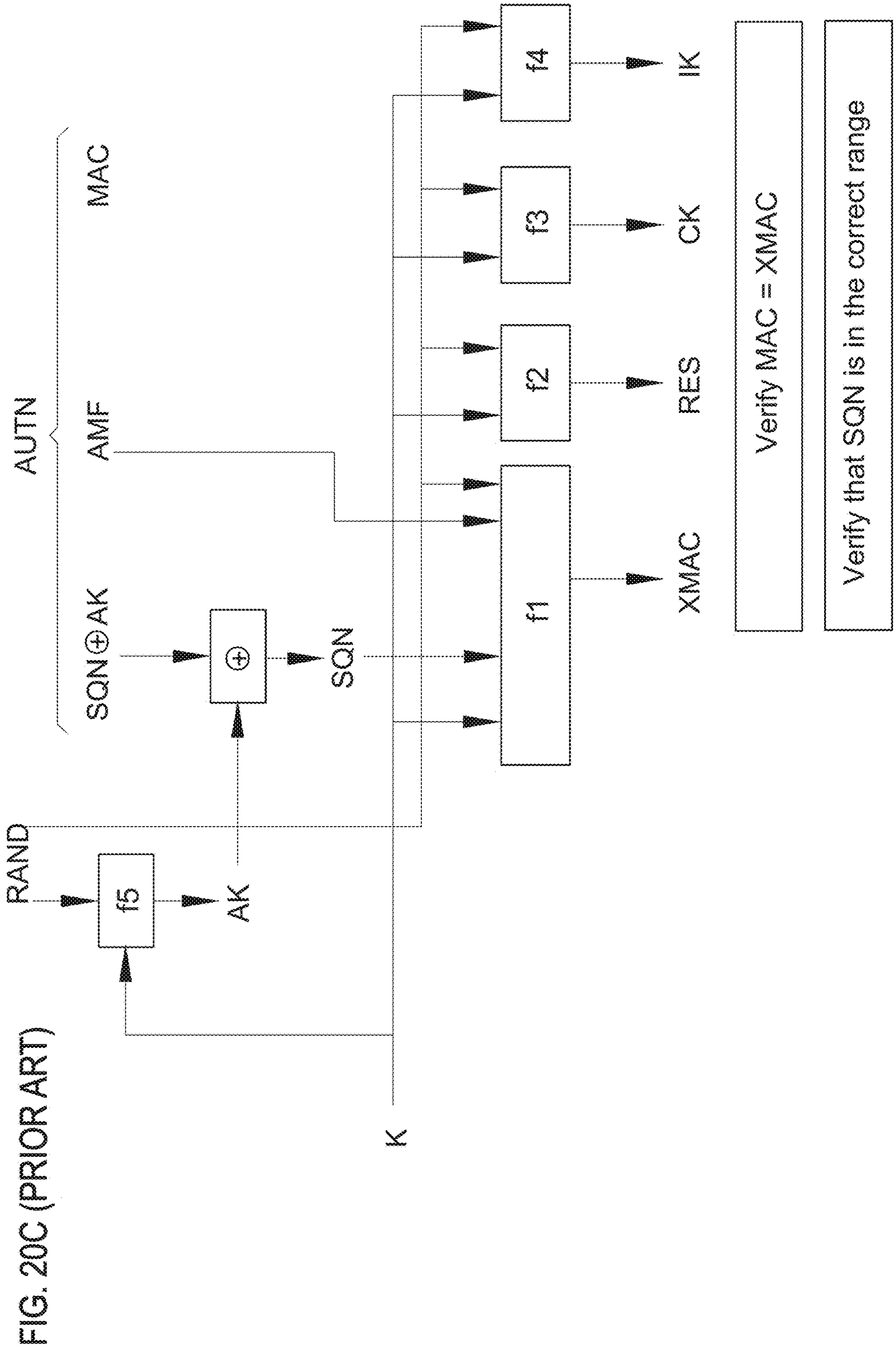
Figure 30:
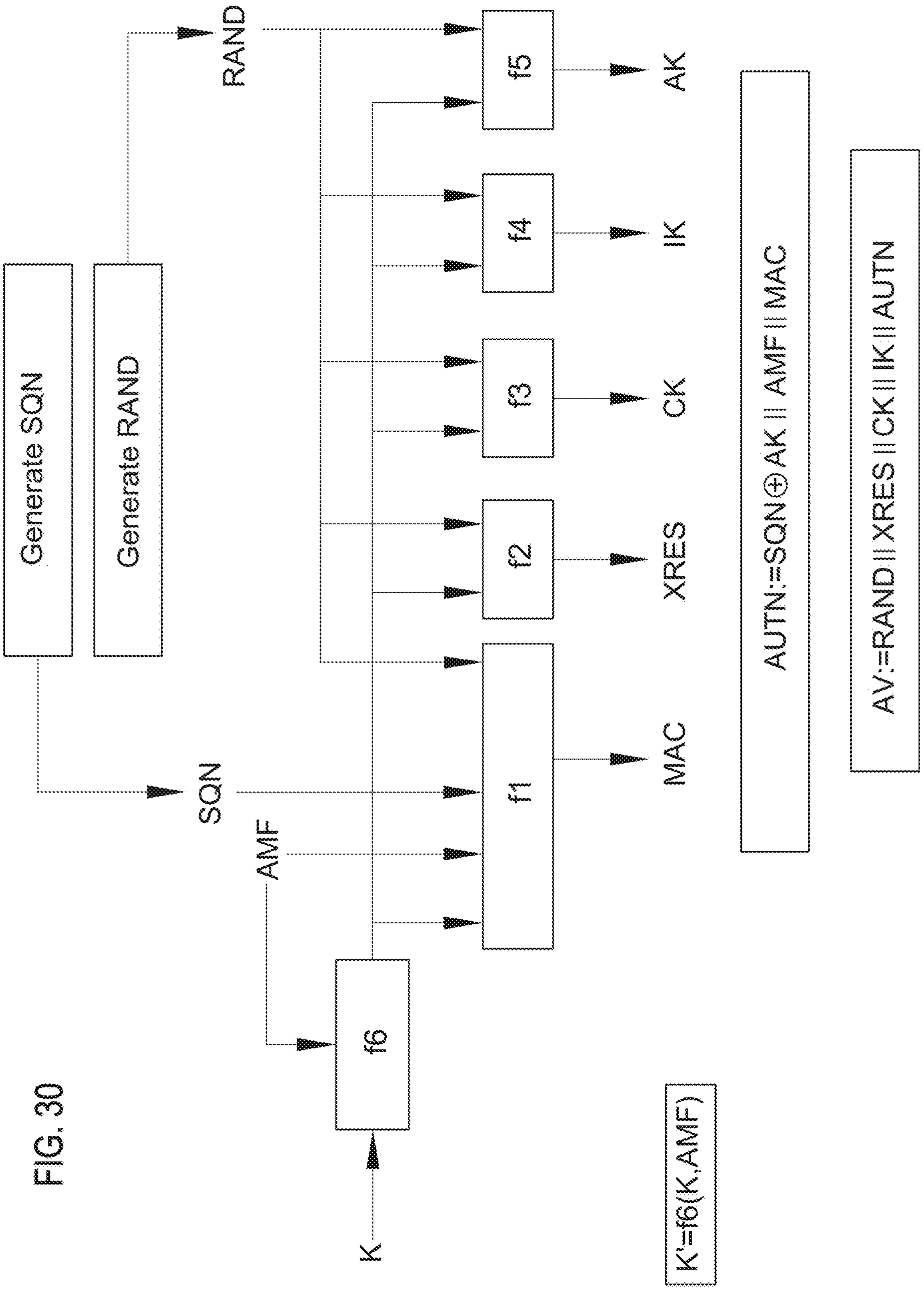

FIG. 20B is a prior art depicts authentication vector creation as implemented in the LTE standard FIG. 20C is a prior art depicts verification and RES message creation as implemented in the LTE standard FIG. 30 depicts a multiple key creation method f6 as integrated into vector creation method in LTE FIG. 30 depicts a multiple key creation method f6 as integrated into vector creation method in LTE. In the standard AMF is a 16 bit field the LSB 8 bits are kept for propietery use, it is possible to give different 8 bit for each visited stand alone iRelay network. In that case the local HSS database can store the local key K'=f6(K,local_AMF) and use it to authenticate the user. When the usim receives the RAND||AUTN, instead of using the local stored K it will use K'=f6(K,AMF) as an input for all other functions (f1-f5)

FIG. 30 also depicts the usage of the local key K' instead of the master key K that normally is stored in both SIM and HSS database.

Figure 21:
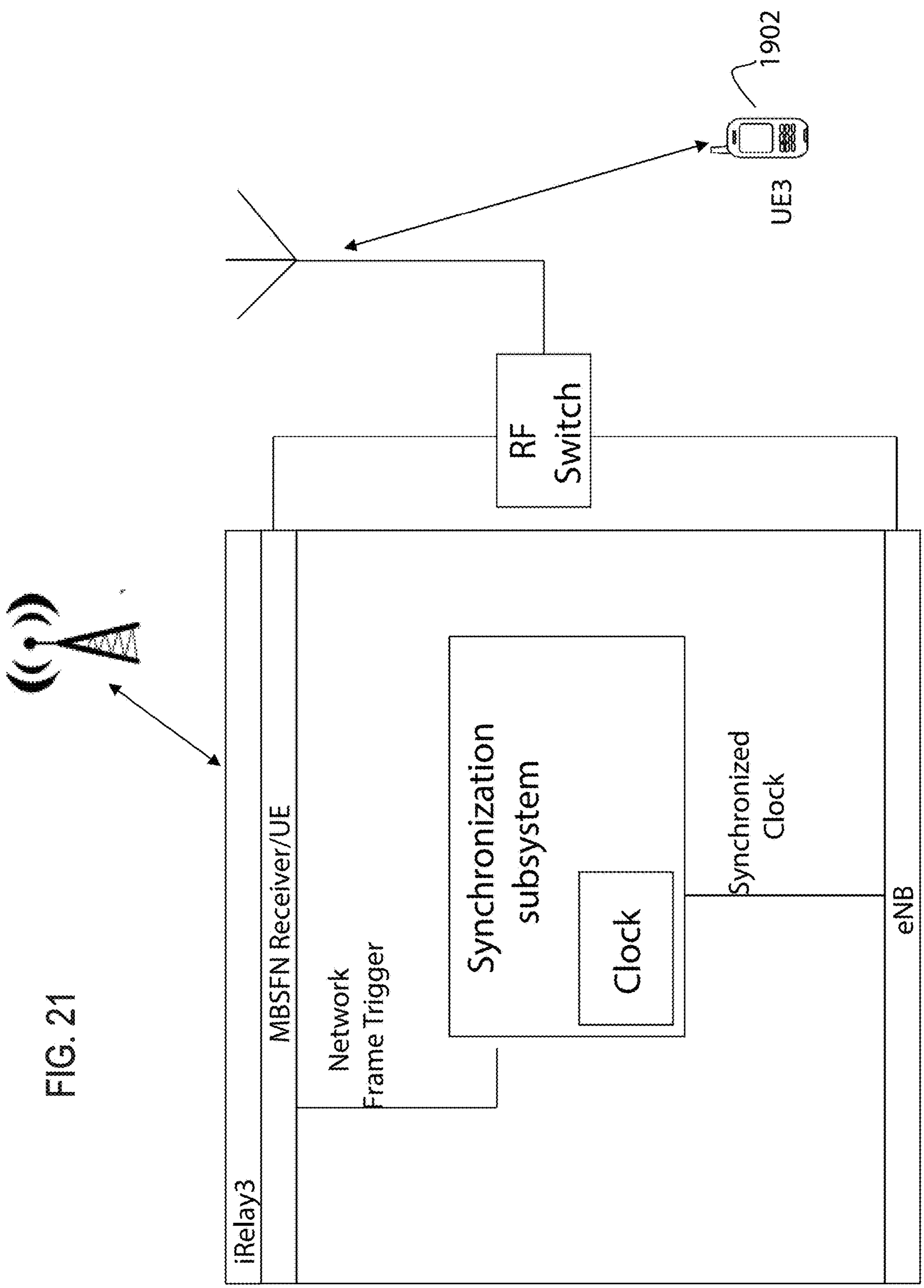

FIG. 21 depicts a method for synchronization of an iRelay to the network. Typically, the UE portion scans the network and receives the frame timing of the network, and send frame trigger that indicates the timing of the beginning of the frame to the synchronization subsystem. The synchronization subsystem than uses this trigger tick to synchronize its local clock to the timing of the network frame, in order to correlate the eNB and UE frame timings. Once the frame is correlated, the RF switch is used in order to blank the listening antenna port of the UE when the eNB is transmitting in order to avoid saturation of the receiver, and to let the receiver work at the power level of the transmitted signal level.

Figure 23:
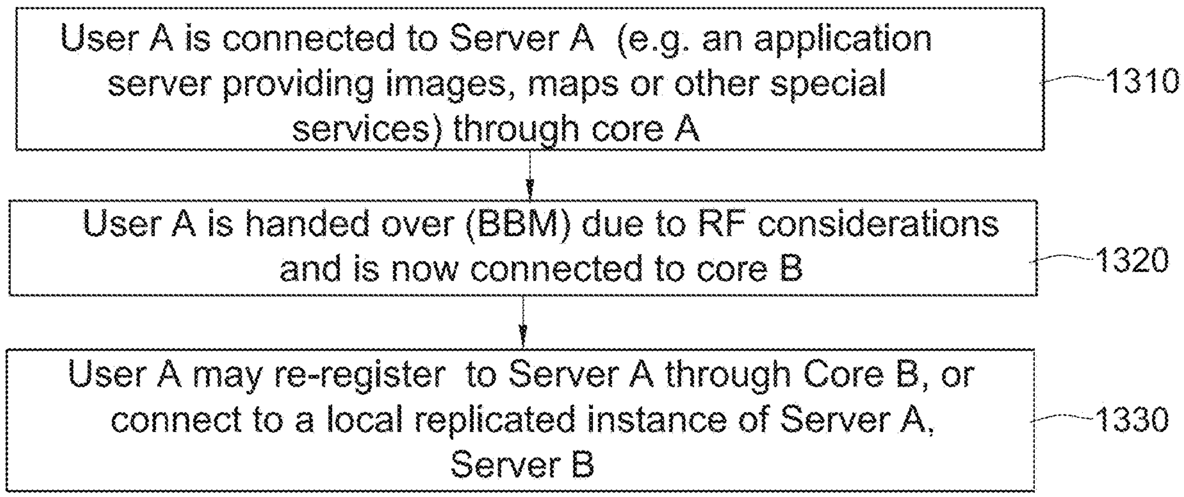
Figure 24:
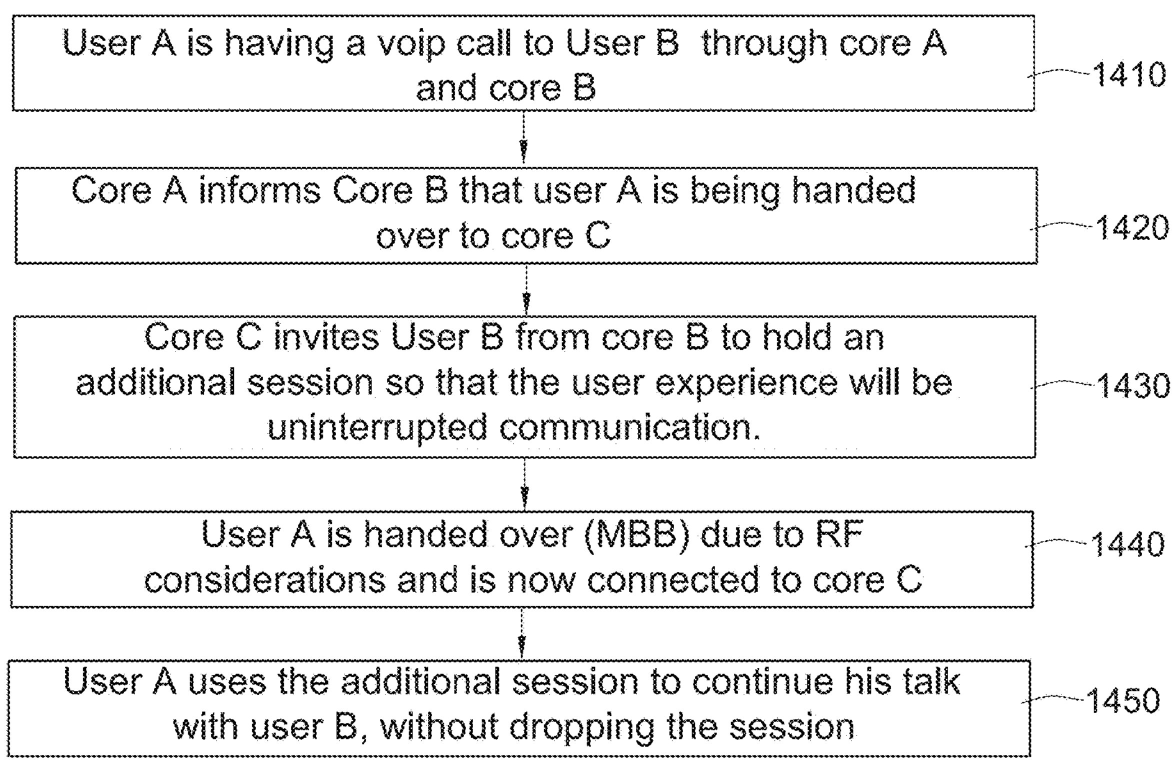

Referring now to FIGS. 23-24, a method for serving a user who is flitting between several campuses is now described. The campuses are interconnected by GRE tunnels as described above, each campus being served by a mobile core having DNS and SIP proxy, registrar forming part of the SIP architecture, application servers inter alia. Typically, the user has registered for service by an individual mobile core (e.g. appears in the mobile core's anchoring tables), but currently is outside of the area served by that core hence has no direct over-the-air link to any base station under the individual mobile core, is now described. It is appreciated that each mobile core typically stores a table or other form of storage, termed herein an "anchoring table" including a list of users and, for each individual user, a relay or base station under that mobile core which serves that individual user.

An example method for finding the flitting user, e.g. if s/he is sought by a caller, is as follows:

i. The user attaches to the core and receives therefrom, the DNS local address using a suitable protocol e.g. DHCP protocol ii. The local DNS of the core redirects the user to the local server's ips. The term "local" refers to the campus or mobile core to which the flitting user is generally registered as opposed to the campus which he is currently visiting.

iii. User can log-in into the local server and associates the user's mobile communication device's address (IP address e.g.) to the user record, for example User A logs in to the local server of the core and registers iv. Once the user is registered, the SIP server can inform the other SIP servers of the presence of the user in its network either proactively or reactively e.g. when queried on the user's presence by other SIP servers (e.g. when the user is required by a caller for a communication session, and cannot be found other than, say, by flooding some or all of the network with a request for his whereabouts.

The above steps I-iv are performed when the user registers to his core e.g. when his mobile communication device is turned on. The next step, v, is performed when the user is being searched for e. g. when the user is required by a caller for a communication session.

v. According to a first embodiment, reactive queries re presence of a user may flow to neighboring SIP servers (since there is a direct tunnel between each pair of cores) on a hop by hop basis over a portion of or the entire network till the user is found ("flooding"). According to a second embodiment, the reactive queries are implemented as follows: Every user gets his own default extension and home server, when he registers to his default server, for example Adi@Holon is registers to Holon which is Adi's local core. When Moshe@Netanya seeks Adi@Holon, the Netanya core goes to the Holon SIP server and finds Adi. When Adi@Holon registers to another core, say at Bat-Yam, that core then informs the Holon Core that Adi is at Bat-Yam such that when Moshe@Netanya seeks Adi@Holon, Moshe@Netanya is redirected to seek the Bat-Yam Core.

Still regarding the user flitting between mobile cores, any suitable scheme may be employed for management of the flitting user's communication session while his device is being handover; in particular, either make before break (MBB) and break before make (BBM) may be employed.

An example BBM flow is as follows (FIG. 23):

1310: User A is connected to Server A (e.g. an application server providing images, maps or other special services) through core A,

1320: User A is handed over (BBM) due to RF considerations and is now connected to core B

1330: User A may re-register to Server A through Core B, or connect to a local replicated instance of Server A, Server B.

An example MBB flow is as follows (FIG. 24):

1410: User A is having a voip call to User B through core A and core B,

1420: Core A informs Core B that user A is being handed over to core C

1430: Core C invites User B from core B to hold an additional session so that the user experience will be uninterrupted communication.

1440: User A is handed over (MBB) due to RF considerations and is now connected to core C

1450: User A uses the additional session to continue his talk with user B, without dropping the session.

Optionally, the user may be synchronized based on "diameter protocol".

The above description is not intended to be limiting; if a user e.g. supervisor S flits between several campuses, communication with that user via the mobile cores serving those campuses may be provided in any suitable manner, e.g. by any suitable use of anchoring tables e.g. as described herein with reference to FIGS. 8-11. (Example uses of the tables of FIGS. 8-11 are described in FIGS. 8, 19).

For example, a default may be defined whereby supervisor S is within the coverage of mobile core 2 (say) unless otherwise indicated. If supervisor S leave the coverage of mobile core 2, mobile core 2 is apprised of this and stores S's whereabouts such that communications to him arriving at mobile core 2 are suitably routed to him. Alternatively, flooding is used to find supervisor S by inquiring among the various mobile cores until an individual mobile core indicates that supervisor S is being served by that individual core.

It is appreciated that either of the following schemes, at least, may be employed to accommodate a user which has temporarily re-located from his "permanent" core to another, "temporary" core which is physically and logically linked:

a. Register at the temporary core and receive an IP address. Then login and register at permanent core, using current IP address. Calls can then be routed by the permanent core, to the user.

b. user registers his entry into a network. Turns on user device adjacent the "temporary" core and obtains an IP address and DNS, registers for a server application and informs the temporary server that he is a guest (also termed herein "visitor"), identifying himself as, say, adi@holon where holon is his permanent core. The permanent core will then route appropriately so as to enable communication sessions with the user.

FIG. 25 is a simplified flowchart illustration of a method for Dynamic generation of IP e.g. GRE tunnels between mobile cores including dynamic distribution of current information regarding establishment and disconnection (e.g. if one of the mobile cores moved out of range) of the tunnels to enable utilization of the tunnels in routing. The method may use the tables of FIGS. 8-11 herein. The method is useful e.g. for two campuses which desire to communicate via a third campus since they are not directly interconnected via their cellular network. The method is typically performed at the router server side.

It is appreciated that even if a mobile core has a physical link to another mobile core, it is still advantageous to establish a tunnel between the two cores, to enable the cores to fulfill their functionalities even while wandering by suitable dynamic tunnel generation.

The method is presented from the perspective of an individual mobile core which may have sought to establish a GRE (say) tunnel between itself and another, "server", core, or may have received a request e.g. attach message to establish a GRE (say) tunnel between itself and another, "client" core. Each core typically comprises an EPC (e.g.), to which a mobile station functionality of another mobile core may connect.

FIG. 25 may include some or all of the following steps, suitably ordered e.g. as shown:

1510: Wait for event (attach, update, disconnect)

1520: Switch event: If received attach message from client (local core=server) do method of FIG. 26A; If received attach message from mobile station functionality of relay (e.g. the modem has attached to a new BS and local core is serving as client) do method of FIG. 26B; If received update message do method of FIG. 26C; If received disconnect event from modem or socket do method of FIG. 26D.

FIG. 26A (LOCAL CORE=SERVER) may include some or all of the following steps, suitably ordered e.g. as shown:

1605: receive "tunnel generation" message typically including routing table and metric from client

1610: Create ip tunnel e.g. GRE-standard tunnel; give tunnel a local address [address of self router] and remote address [address of client indicated in the attach message]

1615: Set up the ip tunnel

1620: Send ack message typically including local routing table+per-line time stamps+metrics to the client which sent the attach message

1625: dynamically build and distribute expanded routing table, e.g. by using OSPF protocol or by performing method of FIGS. 26D, 27. Implementation may for example be based on:

tools.ietf.org/html/rfc5614/

FIG. 26B (LOCAL CORE=CLIENT) may include some or all of the following steps, suitably ordered e.g. as shown:

1630: receive attach message typically including routing table and metric e.g. from mobile station functionality, e.g. if modem has just attached to a base station

1635: Send "tunnel generation" message, typically including modem ip of server core to which it is desired to establish a tunnel, and routing table with per-line time stamp+metrics, to stationary core (e.g. EPC router—to functionality therewithin known to local client core to possess ip tunnel generation functionality)

1640: when ack message received from server core, set up ip tunnel and add address of the tunnel to local routing table

1645: dynamically build and distribute expanded routing table e.g. by using OSPF protocol or by performing method of FIG. 27

FIG. 26C may include some or all of the following steps, suitably ordered e.g. as shown:

1650: receive update message including routing table typically with per-line time stamp+metrics

1655: Merge new routing table into current routing table; typically merge in only content whose time-stamp is newer than the relevant line in the routing table

1660: run dijkstra like algorithm over current routing table+metrics to compute expanded routing table

1665: Update routing table+metrics accordingly and send updates message including the new routing table+timestamp to neighbors e.g. those nodes which are 1 hop away other than the neighbor which sent the update message FIG. 26D may include some or all of the following steps, suitably ordered e.g. as shown:

1670: receive disconnect event from client core (modem) or server core (socket) at remote end of ip tunnel linked to local mobile core

1675: Close local end of ip tunnel that has been linking local mobile core to modem or socket which sent disconnect event

1680: Remove all networks using ip tunnel's link (e.g. all lines in which next hop=that ip tunnel) from the routing table including metrics and send updates message including the new routing table+timestamp to the neighbors FIG. 27 may include some or all of the following steps, suitably ordered e.g. as shown:

1710: Add the new link (tunnel) to local routing table typically with a time-stamp

1720: merge content (routing table with time stamps+metrics e.g.) of just-received (attach or ack) message into local routing table; typically merge in only content whose time-stamp is newer than the relevant line in the routing table

1730: run dijkstra like algorithm over merged routing table+metrics to compute expanded routing table typically having more lines, each with time-stamp; each line of expanded routing table indicates how possible source-destination pair can communicate, including, when appropriate, via existing tunnels

1740: replace local routing table with expanded routing table

1750: send update message including expanded routing table to neighbors (e.g. all nodes one hop away other than neighbor which sent just-received message).

Tunnel use: Use of a GRE tunnel path by an individual core is now described. Generally, each core stores pre-defined routing rules, that define for each destination what is the next hop (NH). The routing rules typically differentiate between:

a. local network nodes (eNB, SSP-GW, application server . . . ) which are directly connected,
b. mobile station network (MS, rUE, UE), in which case next hop=NH=p-GW, and
c. external networks such as: internet through external ISP network in which case NH=another router; or such as another core that is being routed over an ip tunnel in which case NH=tunnel.

To use a particular ip tunnel, when a packet is routed thereover, an ip tunnel is added and the two end points of the tunnel are stored as the starting source and address points. Core A can then be routed to Core B in a multihop manner using several tunnels according to the routing rules. For example, router 743 in FIG. 10 may add a header indicating the IP addresses of the tunnel endpoints, to the packet.

Figure 28:
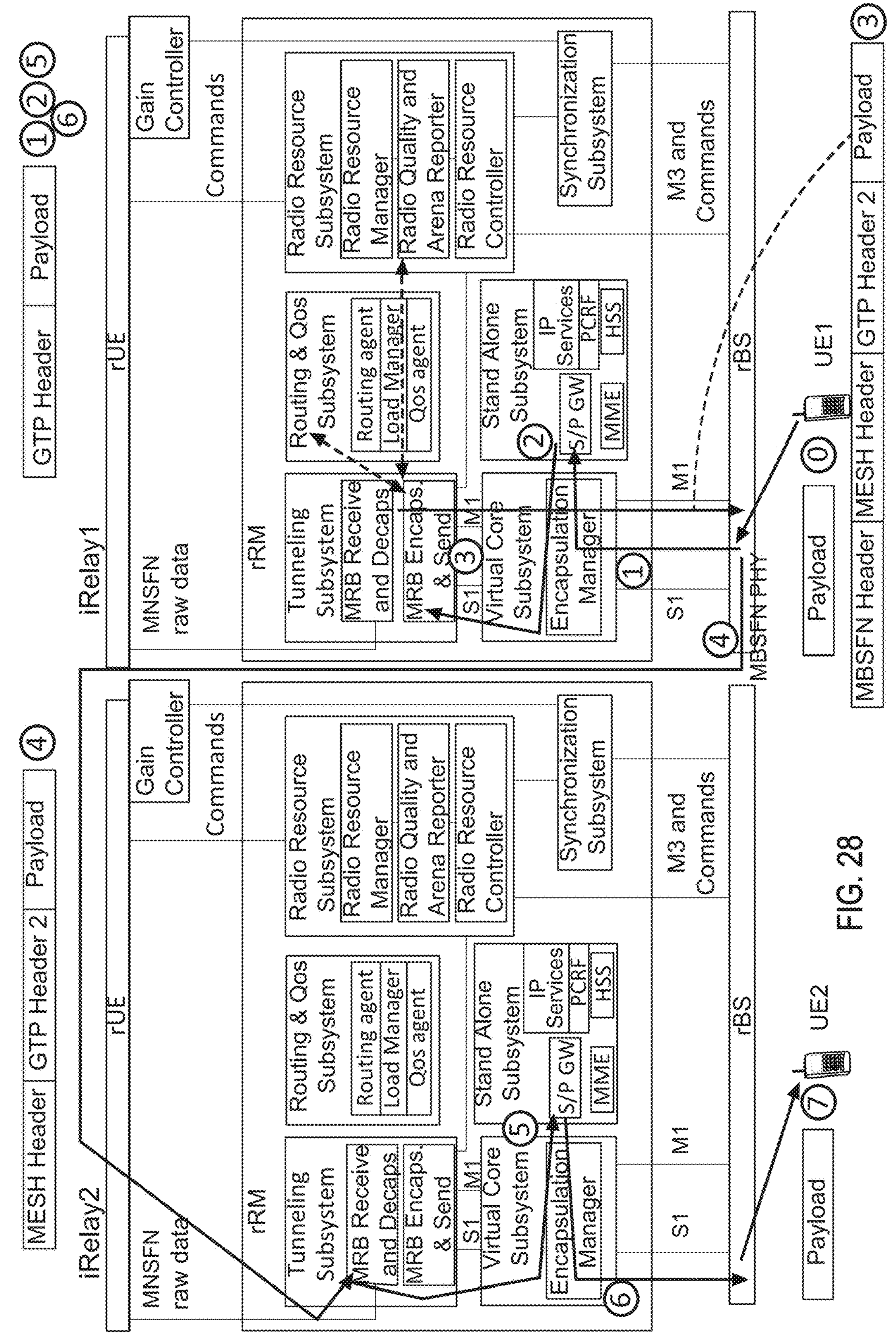

FIG. 28 is another example of using mbsfn channels in order to build cellular mesh network, over ip tunnels. UE1 may send payload data, having the source destination as the UE1 ip address and destination ip address as UE2, which is attached to another base station, resides in iRelay2.

In the embodiment of FIG. 28, the packet goes through the stand alone subsystem [2] to the tunneling subsystem. The tunneling subsystem, by negotiating with the routing subsystem and radio resource subsystem, encapsulates the packet with 2 ip headers, the first for the mesh network tunneling (e.g. source subsystem, destination subsystem) and the second is for the compatibility with the MBSFN standard (e.g. which MBSFN channel to use). The packet is received by the rBS decapsulated from the header that was relevant to the MBSFN transmitting and transmitted[4]. The UE collocated to relay2 receives the packet and forwards it to the encapsulation subsystem. The encapsulation subsystem looks at the header; if the designated address is from the encapsulation subsystem's network, the encapsulation subsystem decapsulates this and forwards the decapsulated information to the standalone subsystem [5]. Otherwise the encapsulation subsystem tries by negotiating with the routing service to forward the packet to the relevant designated address by forwarding the packet on another MBSFN channel. The stand alone subsystem forwards the packet to the rBS [6], which sends the packet on to the designated address, UE2.

Figure 29:
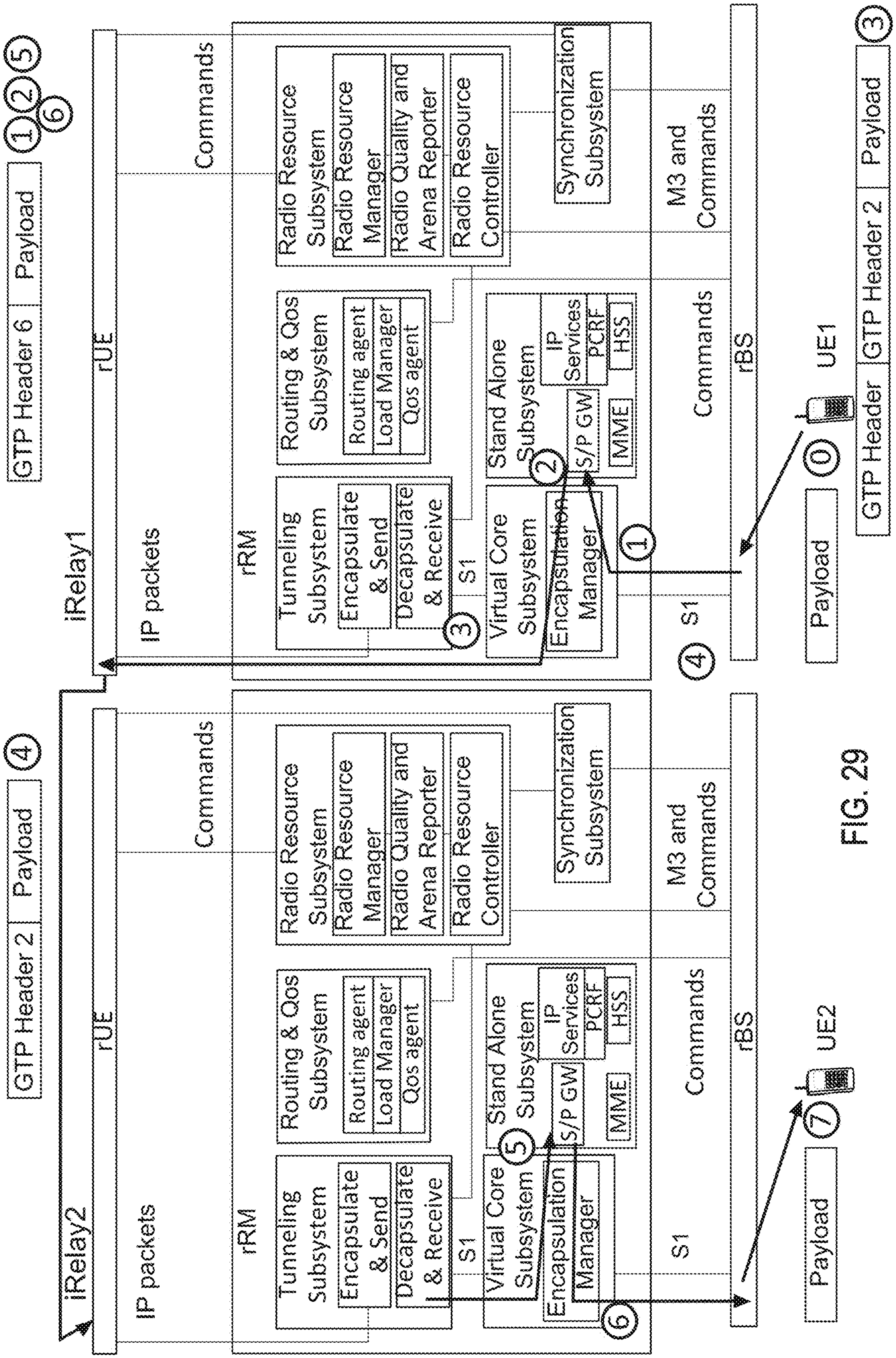

FIG. 29 is another example of using ip tunnels in order to build cellular mesh network, over ip tunnels. UE1 may send payload data, having the source destination as the UE1 ip address and destination ip address, as UE2 which is attached to another base station resides in iRelay2. The packet goes through the stand alone subsystem [2], to the tunneling subsystem. The tunneling subsystem, by negotiating with the routing subsystem, adds a mesh tunneling header and forwards the packet to the rUE[3]. The rUE forwards the packet to its serving base station. The serving base station forwards the packet to its collocated tunneling subsystem through its local stand alone subsystem. The encapsulation subsystem looks at the header to determine if the designated address is from its network. If so, the encapsulation subsystem decapsulates and forwards the decapsulated information to the standalone subsystem [5]. Otherwise the encapsulation subsystem tries by negotiating with the routing service to forward the packet to the relevant designated address by forwarding the packet on the next hop to its serving base station through the local rUE or local base station to a child rUE.

The embodiments shown herein are not dependent on any specific protocol. For example, the embodiments may or may not be based on 3GPP, may or may not employ DNS, the standard Domain Name System, to translate domain names to IP addresses, may of may not employ MBSFN as a broadcast channel, may or may not utilize physical uplink shared channels (PUSCH), may or may not reside over an individual OSI layer e.g. data link and/or network layers, and so on.

It is appreciated that each moving core, typically, is also a relay, having all the functions of a relay, plus additional special core functions.

Methods depicted herein by flowcharts may comprise some or all of the illustrated steps, suitably ordered e.g. as illustrated.

It is appreciated that terminology such as “mandatory”, “required”, “need” and “must” refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered “view” or client centered “view”, or “view” from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. “e.g.” is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A method for building a cellular mesh network, the method comprising building a network over ip tunnels, including:

sending payload data from a first mobile station associated with a first inverse relay to a second mobile station attached to another base station which resides in a second inverse relay, the payload data, having a source comprising the first mobile station's ip address and a destination ip address comprising the second mobile station, thereby to define a package;

adding to the packet, a mesh tunneling header which includes a designated address, responsive to a negotiation with a first routing subsystem also associated with the first mobile station;

the packet is forwarded, through a first stand alone subsystem associated with the first mobile station, to a first mobile station functionality;

the first mobile station functionality forwards the packet to the first mobile station functionality's serving base station;

the first mobile station functionality's serving base station forwards the packet to a tunneling subsystem via the tunneling subsystem's local stand alone subsystem;

the tunneling subsystem including an encapsulation subsystem, associated with the second mobile station, and wherein the encapsulation subsystem is configured to look at the mesh tunneling header to determine whether or not said designated address is from the encapsulation subsystem's network, and wherein if said designated address is from the encapsulation subsystem's network, the encapsulation subsystem decapsulates the packet, thereby to yield de-capsulated information, and forwards the de-capsulated information to said local standalone subsystem which is associated with the second mobile station; and if said designated address is not from the encapsulation subsystem's network, the encapsulation subsystem tries, by negotiating with a routing service, to forward the packet to the designated address by forwarding the packet on the next hop to its serving base station through a local node to a child mobile station functionality.

2. A system for building a cellular mesh network, comprising at least one hardware processor configured to carry out the operations of building a network over ip tunnels, including:

sending payload data from a first mobile station associated with a first inverse relay to a second mobile station attached to another base station which resides in a second inverse relay, the payload data, having a source comprising the first mobile station's ip address and a destination ip address comprising the second mobile station, thereby to define a package;

adding to the packet, a mesh tunneling header which includes a designated address, responsive to a negotiation with a first routing subsystem also associated with the first mobile station;

the packet is forwarded, through a first stand alone subsystem associated with the first mobile station, to a first mobile station functionality;

the first mobile station functionality forwards the packet to the first mobile station functionality's serving base station;

the first mobile station functionality's serving base station forwards the packet to a tunneling subsystem via the tunneling subsystem's local stand alone subsystem;

the tunneling subsystem including an encapsulation subsystem, associated with the second mobile station, and wherein the encapsulation subsystem is configured to look at the mesh tunneling header to determine whether or not said designated address is from the encapsulation subsystem's network, and wherein if said designated address is from the encapsulation subsystem's network, the encapsulation subsystem decapsulates the packet, thereby to yield de-capsulated information, and forwards the de-capsulated information to said local standalone subsystem which is associated with the second mobile station; and if said designated address is not from the encapsulation subsystem's network, the encapsulation subsystem tries, by negotiating with a routing service, to forward the packet to the designated address by forwarding the packet on the next hop to its serving base station through a local node to a child mobile station functionality.

3. A system according to claim 2 wherein said network comprises an Evolved Packet Core.

4. A system according to claim 2 where the network comprises a relay network, with an EPC (Evolved Packet Core) and tunneling, which enables handover between relays.

5. A system according to claim 2 where the network comprises a relay network, with an EPC (Evolved Packet Core) and tunneling, which enables handover between cores.

6. A system according to claim 2 wherein a User A, connected to a Server A through a core A re-registers to Server A through a Core other than core A, to which User A is handed over.

7. A system according to claim 2 wherein a User A, connected to a Server A through a core A, connects to a local replicated instance of Server A.

8. A system according to claim 2 which uses a Time Division algorithm for mesh MAC (media access control).

9. A system according to claim 2 wherein a mesh routing protocol is used.

10. A system according to claim 2 wherein at least one mobile station communicates with a server, rather than only communicating directly with other user equipment.

11. A system according to claim 2 wherein the local node comprises a mobile station functionality.

12. A system according to claim 2 wherein the local node comprises a local base station.

13. A system according to claim 1 which includes automatic network rebuilding functionality.

14. A system according to claim 2 wherein said network comprises a cellular MESH network configured both to work standalone and to forward to another system when there is a connection thereto.

* * * * *